United States Patent
Kurs et al.

(10) Patent No.: US 9,842,688 B2
(45) Date of Patent: Dec. 12, 2017

(54) RESONATOR BALANCING IN WIRELESS POWER TRANSFER SYSTEMS

(71) Applicant: WiTricity Corporation, Watertown, MA (US)

(72) Inventors: Andre B. Kurs, Chestnut Hill, MA (US); Guillaume Lestoquoy, Cambridge, MA (US); Morris P. Kesler, Bedford, MA (US)

(73) Assignee: WiTricity Corporation, Watertown, MA (US)

( * ) Notice: Subject to any disclaimer, the term of this patent is extended or adjusted under 35 U.S.C. 154(b) by 225 days.

(21) Appl. No.: 14/794,714

(22) Filed: Jul. 8, 2015

(65) Prior Publication Data

US 2016/0012967 A1 Jan. 14, 2016

Related U.S. Application Data

(60) Provisional application No. 62/022,133, filed on Jul. 8, 2014, provisional application No. 62/051,647, filed on Sep. 17, 2014.

(51) Int. Cl.
*H01F 5/00* (2006.01)
*H01F 38/14* (2006.01)
(Continued)

(52) U.S. Cl.
CPC .......... *H01F 38/14* (2013.01); *B60L 11/182* (2013.01); *H01F 5/00* (2013.01); *H01F 27/00* (2013.01);
(Continued)

(58) Field of Classification Search
CPC . H01F 5/00; H01F 37/00; H01F 38/00; H01F 27/00–27/42
(Continued)

(56) References Cited

U.S. PATENT DOCUMENTS

| 645,576 A | 3/1900 | Telsa |
| 649,621 A | 5/1900 | Tesla |

(Continued)

FOREIGN PATENT DOCUMENTS

| CA | 142352 | 8/1912 |
| CN | 102239633 | 11/2011 |

(Continued)

OTHER PUBLICATIONS

International Preliminary Report on Patentability for International Application Serial No. PCT/US2015/039612 dated Jan. 19, 2017.
(Continued)

*Primary Examiner* — Tuyen Nguyen
(74) *Attorney, Agent, or Firm* — Fish & Richardson P.C.

(57) ABSTRACT

The disclosure features systems for wireless power transfer that include a resonator featuring a coil with at least two windings and at least one inductor having an inductance value, where the at least one inductor is connected in series to at least one of the windings, and where the inductance value is selected so that when the coil carries a current during operation of the system, the at least one inductor maintains a distribution of current flows among the at least two windings such that for each of the at least two windings, an actual current flow in the winding differs from a target current flow for the winding by 10% or less.

10 Claims, 76 Drawing Sheets

(51) Int. Cl.

| | | |
|---|---|---|
| H01F 27/00 | (2006.01) | |
| H01F 27/28 | (2006.01) | |
| H02J 5/00 | (2016.01) | |
| B60L 11/18 | (2006.01) | |
| H02J 50/12 | (2016.01) | |

(52) U.S. Cl.
CPC ......... *H01F 27/28* (2013.01); *H01F 27/2823* (2013.01); *H01F 27/2871* (2013.01); *H02J 5/005* (2013.01); *H02J 50/12* (2016.02); *B60L 2210/10* (2013.01); *B60L 2210/30* (2013.01); *B60L 2210/40* (2013.01); *B60L 2270/147* (2013.01); *H01F 2005/006* (2013.01); *Y02T 10/7005* (2013.01); *Y02T 10/7072* (2013.01); *Y02T 10/7216* (2013.01); *Y02T 10/7241* (2013.01); *Y02T 90/122* (2013.01); *Y02T 90/127* (2013.01); *Y02T 90/14* (2013.01)

(58) Field of Classification Search
USPC ................ 336/65, 200, 232 PE; 307/104
See application file for complete search history.

(56) References Cited

U.S. PATENT DOCUMENTS

| | | |
|---|---|---|
| 787,412 A | 4/1905 | Tesla |
| 1,119,732 A | 12/1914 | Tesla |
| 2,133,494 A | 10/1938 | Waters |
| 3,517,350 A | 6/1970 | Beaver |
| 3,535,543 A | 10/1970 | Dailey |
| 3,780,425 A | 12/1973 | Penn et al. |
| 3,871,176 A | 3/1975 | Schukei |
| 4,088,999 A | 5/1978 | Fletcher et al. |
| 4,095,998 A | 6/1978 | Hanson |
| 4,180,795 A | 12/1979 | Matsuda et al. |
| 4,280,129 A | 7/1981 | Wells |
| 4,450,431 A | 5/1984 | Hochstein |
| 4,588,978 A | 5/1986 | Allen |
| 5,027,709 A | 7/1991 | Slagle |
| 5,033,295 A | 7/1991 | Schmid et al. |
| 5,034,658 A | 7/1991 | Hierig et al. |
| 5,053,774 A | 10/1991 | Schuermann et al. |
| 5,070,293 A | 12/1991 | Ishii et al. |
| 5,118,997 A | 6/1992 | El-Hamamsy |
| 5,216,402 A | 6/1993 | Carosa |
| 5,229,652 A | 7/1993 | Hough |
| 5,287,112 A | 2/1994 | Schuermann |
| 5,341,083 A | 8/1994 | Klontz et al. |
| 5,367,242 A | 11/1994 | Hulman |
| 5,374,930 A | 12/1994 | Schuermann |
| 5,408,209 A | 4/1995 | Tanzer et al. |
| 5,437,057 A | 7/1995 | Richley et al. |
| 5,455,467 A | 10/1995 | Young et al. |
| 5,493,691 A | 2/1996 | Barrett |
| 5,522,856 A | 6/1996 | Reineman |
| 5,528,113 A | 6/1996 | Boys et al. |
| 5,541,604 A | 7/1996 | Meier |
| 5,550,452 A | 8/1996 | Shirai et al. |
| 5,565,763 A | 10/1996 | Arrendale et al. |
| 5,630,835 A | 5/1997 | Brownlee |
| 5,697,956 A | 12/1997 | Bornzin |
| 5,703,461 A | 12/1997 | Minoshima et al. |
| 5,703,573 A | 12/1997 | Fujimoto et al. |
| 5,710,413 A | 1/1998 | King et al. |
| 5,742,471 A | 4/1998 | Barbee, Jr. et al. |
| 5,821,728 A | 10/1998 | Sshwind |
| 5,821,731 A | 10/1998 | Kuki et al. |
| 5,864,323 A | 1/1999 | Berthon |
| 5,898,579 A | 4/1999 | Boys et al. |
| 5,903,134 A | 5/1999 | Takeuchi |
| 5,923,544 A | 7/1999 | Urano |
| 5,940,509 A | 8/1999 | Jovanovich et al. |
| 5,957,956 A | 9/1999 | Kroll et al. |
| 5,959,245 A | 9/1999 | Moe et al. |
| 5,986,895 A | 11/1999 | Stewart et al. |
| 5,993,996 A | 11/1999 | Firsich |
| 5,999,308 A | 12/1999 | Nelson et al. |
| 6,012,659 A | 1/2000 | Nakazawa et al. |
| 6,047,214 A | 4/2000 | Mueller et al. |
| 6,066,163 A | 5/2000 | John |
| 6,067,473 A | 5/2000 | Greeninger et al. |
| 6,108,579 A | 8/2000 | Snell et al. |
| 6,127,799 A | 10/2000 | Krishnan |
| 6,176,433 B1 | 1/2001 | Uesaka et al. |
| 6,184,651 B1 | 2/2001 | Fernandez et al. |
| 6,207,887 B1 | 3/2001 | Bass et al. |
| 6,232,841 B1 | 5/2001 | Bartlett et al. |
| 6,238,387 B1 | 5/2001 | Miller, III |
| 6,252,762 B1 | 6/2001 | Amatucci |
| 6,436,299 B1 | 8/2002 | Baarman et al. |
| 6,450,946 B1 | 9/2002 | Forsell |
| 6,452,465 B1 | 9/2002 | Brown et al. |
| 6,459,218 B2 | 10/2002 | Boys et al. |
| 6,473,028 B1 | 10/2002 | Luc |
| 6,483,202 B1 | 11/2002 | Boys |
| 6,515,878 B1 | 2/2003 | Meins et al. |
| 6,535,133 B2 | 3/2003 | Gohara |
| 6,561,975 B1 | 5/2003 | Pool et al. |
| 6,563,425 B2 | 5/2003 | Nicholson et al. |
| 6,597,076 B2 | 7/2003 | Scheible et al. |
| 6,609,023 B1 | 8/2003 | Fischell et al. |
| 6,631,072 B1 | 10/2003 | Paul et al. |
| 6,650,227 B1 | 11/2003 | Bradin |
| 6,664,770 B1 | 12/2003 | Bartels |
| 6,673,250 B2 | 1/2004 | Kuennen et al. |
| 6,683,256 B2 | 1/2004 | Kao |
| 6,696,647 B2 | 2/2004 | Ono et al. |
| 6,703,921 B1 | 3/2004 | Wuidart et al. |
| 6,731,071 B2 | 5/2004 | Baarman |
| 6,749,119 B2 | 6/2004 | Scheible et al. |
| 6,772,011 B2 | 8/2004 | Dolgin |
| 6,798,716 B1 | 9/2004 | Charych |
| 6,803,744 B1 | 10/2004 | Sabo |
| 6,806,649 B2 | 10/2004 | Mollema et al. |
| 6,812,645 B2 | 11/2004 | Baarman |
| 6,825,620 B2 | 11/2004 | Kuennen et al. |
| 6,831,417 B2 | 12/2004 | Baarman |
| 6,839,035 B1 | 1/2005 | Addonisio et al. |
| 6,844,702 B2 | 1/2005 | Giannopoulos et al. |
| 6,856,291 B2 | 2/2005 | Mickle et al. |
| 6,858,970 B2 | 2/2005 | Malkin et al. |
| 6,906,495 B2 | 6/2005 | Cheng et al. |
| 6,917,163 B2 | 7/2005 | Baarman |
| 6,917,431 B2 | 7/2005 | Soljacic et al. |
| 6,937,130 B2 | 8/2005 | Scheible et al. |
| 6,960,968 B2 | 11/2005 | Odendaal et al. |
| 6,961,619 B2 | 11/2005 | Casey |
| 6,967,462 B1 | 11/2005 | Landis |
| 6,975,198 B2 | 12/2005 | Baarman |
| 6,988,026 B2 | 1/2006 | Breed et al. |
| 7,027,311 B2 | 4/2006 | Vanderelli et al. |
| 7,035,076 B1 | 4/2006 | Stevenson |
| 7,042,196 B2 | 5/2006 | Ka-Lai et al. |
| 7,069,064 B2 | 6/2006 | Govorgian et al. |
| 7,084,605 B2 | 8/2006 | Mickle et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,127,293 B2 | 10/2006 | MacDonald |
| 7,132,918 B2 | 11/2006 | Baarman et al. |
| 7,147,604 B1 | 12/2006 | Allen et al. |
| 7,180,248 B2 | 2/2007 | Kuennen et al. |
| 7,191,007 B2 | 3/2007 | Desai et al. |
| 7,193,418 B2 | 3/2007 | Freytag |
| D541,322 S | 4/2007 | Garrett et al. |
| 7,212,414 B2 | 5/2007 | Baarman |
| 7,233,137 B2 | 6/2007 | Nakamura et al. |
| D545,855 S | 7/2007 | Garrett et al. |
| 7,239,110 B2 | 7/2007 | Cheng et al. |
| 7,248,017 B2 | 7/2007 | Cheng et al. |
| 7,251,527 B2 | 7/2007 | Lyden |
| 7,288,918 B2 | 10/2007 | DiStefano |
| 7,340,304 B2 | 3/2008 | MacDonald |

(56) References Cited

U.S. PATENT DOCUMENTS

| | | |
|---|---|---|
| 7,375,492 B2 | 5/2008 | Calhoon et al. |
| 7,375,493 B2 | 5/2008 | Calhoon et al. |
| 7,378,817 B2 | 5/2008 | Calhoon et al. |
| 7,382,636 B2 | 6/2008 | Baarman et al. |
| 7,385,357 B2 | 6/2008 | Kuennen et al. |
| 7,443,135 B2 | 10/2008 | Cho |
| 7,462,951 B1 | 12/2008 | Baarman |
| 7,466,213 B2 | 12/2008 | Lobl et al. |
| 7,471,062 B2 | 12/2008 | Bruning |
| 7,474,058 B2 | 1/2009 | Baarman |
| 7,492,247 B2 | 2/2009 | Schmidt et al. |
| 7,514,818 B2 | 4/2009 | Abe et al. |
| 7,518,267 B2 | 4/2009 | Baarman |
| 7,521,890 B2 | 4/2009 | Lee et al. |
| 7,525,283 B2 | 4/2009 | Cheng et al. |
| 7,545,337 B2 | 6/2009 | Guenther |
| 7,554,316 B2 | 6/2009 | Stevens et al. |
| 7,599,743 B2 | 10/2009 | Hassler, Jr. et al. |
| 7,615,936 B2 | 11/2009 | Baarman et al. |
| 7,639,514 B2 | 12/2009 | Baarman |
| 7,741,734 B2 | 6/2010 | Joannopoulos et al. |
| 7,795,708 B2 | 9/2010 | Katti |
| 7,825,543 B2 | 11/2010 | Karalis et al. |
| 7,825,544 B2 | 11/2010 | Jansen et al. |
| 7,835,417 B2 | 11/2010 | Heideman et al. |
| 7,843,288 B2 | 11/2010 | Lee et al. |
| 7,844,306 B2 | 11/2010 | Shearer et al. |
| 7,863,859 B2 | 1/2011 | Soar |
| 7,880,337 B2 | 2/2011 | Farkas |
| 7,884,697 B2 | 2/2011 | Wei et al. |
| 7,885,050 B2 | 2/2011 | Lee |
| 7,919,886 B2 | 4/2011 | Tanaka |
| 7,923,870 B2 | 4/2011 | Jin |
| 7,932,798 B2 | 4/2011 | Tolle et al. |
| 7,948,209 B2 | 5/2011 | Jung |
| 7,952,322 B2 | 5/2011 | Partovi et al. |
| 7,963,941 B2 | 6/2011 | Wilk |
| 7,969,045 B2 | 6/2011 | Schmidt et al. |
| 7,994,880 B2 | 8/2011 | Chen et al. |
| 7,999,506 B1 | 8/2011 | Hollar et al. |
| 8,022,576 B2 | 9/2011 | Joannopoulos et al. |
| 8,035,255 B2 | 10/2011 | Kurs et al. |
| 8,076,800 B2 | 12/2011 | Joannopoulos et al. |
| 8,076,801 B2 | 12/2011 | Karalis et al. |
| 8,084,889 B2 | 12/2011 | Joannopoulos et al. |
| 8,097,983 B2 | 1/2012 | Karalis et al. |
| 8,106,539 B2 | 1/2012 | Schatz et al. |
| 8,115,448 B2 | 2/2012 | John |
| 8,131,378 B2 | 3/2012 | Greenberg et al. |
| 8,178,995 B2 | 5/2012 | Amano et al. |
| 8,193,769 B2 | 6/2012 | Azancot et al. |
| 8,212,414 B2 | 7/2012 | Howard et al. |
| 8,260,200 B2 | 9/2012 | Shimizu et al. |
| 8,304,935 B2 | 11/2012 | Karalis et al. |
| 8,324,759 B2 | 12/2012 | Karalis et al. |
| 8,334,620 B2 | 12/2012 | Park et al. |
| 8,362,651 B2 | 1/2013 | Hamam et al. |
| 8,395,282 B2 | 3/2013 | Joannopoulos et al. |
| 8,395,283 B2 | 3/2013 | Joannopoulos et al. |
| 8,400,017 B2 | 3/2013 | Kurs et al. |
| 8,400,018 B2 | 3/2013 | Joannopoulos et al. |
| 8,400,019 B2 | 3/2013 | Joannopoulos et al. |
| 8,400,020 B2 | 3/2013 | Joannopoulos et al. |
| 8,400,021 B2 | 3/2013 | Joannopoulos et al. |
| 8,400,022 B2 | 3/2013 | Joannopoulos et al. |
| 8,400,023 B2 | 3/2013 | Joannopoulos et al. |
| 8,400,024 B2 | 3/2013 | Joannopoulos et al. |
| 8,410,636 B2 | 4/2013 | Kurs et al. |
| 8,441,154 B2 | 5/2013 | Karalis et al. |
| 8,457,547 B2 | 6/2013 | Meskens |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,461,817 B2 | 6/2013 | Martin et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,157 B2 | 7/2013 | Cook et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Karalis et al. |
| 8,629,578 B2 | 1/2014 | Kurs et al. |
| 8,643,326 B2 | 2/2014 | Campanella et al. |
| 2002/0032471 A1 | 3/2002 | Loftin et al. |
| 2002/0105343 A1 | 8/2002 | Scheible et al. |
| 2002/0118004 A1 | 8/2002 | Scheible et al. |
| 2002/0130642 A1 | 9/2002 | Ettes et al. |
| 2002/0167294 A1 | 11/2002 | Odaohhara |
| 2003/0038641 A1 | 2/2003 | Scheible |
| 2003/0062794 A1 | 4/2003 | Scheible et al. |
| 2003/0062980 A1 | 4/2003 | Scheible et al. |
| 2003/0071034 A1 | 4/2003 | Thompson et al. |
| 2003/0124050 A1 | 7/2003 | Yadav et al. |
| 2003/0126948 A1 | 7/2003 | Yadav et al. |
| 2003/0160590 A1 | 8/2003 | Schaefer et al. |
| 2003/0199778 A1 | 10/2003 | Mickle et al. |
| 2003/0214255 A1 | 11/2003 | Baarman et al. |
| 2004/0000974 A1 | 1/2004 | Odenaal et al. |
| 2004/0026998 A1 | 2/2004 | Henriott et al. |
| 2004/0100338 A1 | 5/2004 | Clark |
| 2004/0113847 A1 | 6/2004 | Qi et al. |
| 2004/0130425 A1 | 7/2004 | Dayan et al. |
| 2004/0130915 A1 | 7/2004 | Baarman |
| 2004/0130916 A1 | 7/2004 | Baarman |
| 2004/0142733 A1 | 7/2004 | Parise |
| 2004/0150934 A1 | 8/2004 | Baarman |
| 2004/0189246 A1 | 9/2004 | Bulai et al. |
| 2004/0201361 A1 | 10/2004 | Koh et al. |
| 2004/0222751 A1 | 11/2004 | Mollema et al. |
| 2004/0227057 A1 | 11/2004 | Tuominen et al. |
| 2004/0232845 A1 | 11/2004 | Baarman et al. |
| 2004/0233043 A1 | 11/2004 | Yazawa et al. |
| 2004/0267501 A1 | 12/2004 | Freed et al. |
| 2005/0007067 A1 | 1/2005 | Baarman et al. |
| 2005/0021134 A1 | 1/2005 | Opie |
| 2005/0027192 A1 | 2/2005 | Govari et al. |
| 2005/0033382 A1 | 2/2005 | Single |
| 2005/0085873 A1 | 4/2005 | Gord et al. |
| 2005/0093475 A1 | 5/2005 | Kuennen et al. |
| 2005/0104064 A1 | 5/2005 | Hegarty et al. |
| 2005/0104453 A1 | 5/2005 | Vanderelli et al. |
| 2005/0116650 A1 | 6/2005 | Baarman |
| 2005/0116683 A1 | 6/2005 | Cheng et al. |
| 2005/0122058 A1 | 6/2005 | Baarman et al. |
| 2005/0122059 A1 | 6/2005 | Baarman et al. |
| 2005/0125093 A1 | 6/2005 | Kikuchi et al. |
| 2005/0127849 A1 | 6/2005 | Baarman et al. |
| 2005/0127850 A1 | 6/2005 | Baarman et al. |
| 2005/0127866 A1 | 6/2005 | Hamilton et al. |
| 2005/0135122 A1 | 6/2005 | Cheng et al. |
| 2005/0140482 A1 | 6/2005 | Cheng et al. |
| 2005/0151511 A1 | 7/2005 | Chary |
| 2005/0156560 A1 | 7/2005 | Shimaoka et al. |
| 2005/0189945 A1 | 9/2005 | Reiderman |
| 2005/0194926 A1 | 9/2005 | DiStefano |
| 2005/0253152 A1 | 11/2005 | Klimov et al. |
| 2005/0288739 A1 | 12/2005 | Hassler, Jr. et al. |
| 2005/0288740 A1 | 12/2005 | Hassler, Jr. et al. |
| 2005/0288741 A1 | 12/2005 | Hassler, Jr. et al. |
| 2005/0288742 A1 | 12/2005 | Giordano et al. |
| 2006/0001509 A1 | 1/2006 | Gibbs |
| 2006/0010902 A1 | 1/2006 | Trinh et al. |
| 2006/0022636 A1 | 2/2006 | Xian et al. |
| 2006/0053296 A1 | 3/2006 | Busboom et al. |
| 2006/0061323 A1 | 3/2006 | Cheng et al. |
| 2006/0066443 A1 | 3/2006 | Hall |
| 2006/0090956 A1 | 5/2006 | Peshkovskiy et al. |

(56) References Cited

U.S. PATENT DOCUMENTS

| | | |
|---|---|---|
| 2006/0132045 A1 | 6/2006 | Baarman |
| 2006/0164866 A1 | 7/2006 | Vanderelli et al. |
| 2006/0181242 A1 | 8/2006 | Freed et al. |
| 2006/0184209 A1 | 8/2006 | John et al. |
| 2006/0184210 A1 | 8/2006 | Singhal et al. |
| 2006/0185809 A1 | 8/2006 | Elfrink et al. |
| 2006/0199620 A1 | 9/2006 | Greene et al. |
| 2006/0202665 A1 | 9/2006 | Hsu |
| 2006/0205381 A1 | 9/2006 | Beart et al. |
| 2006/0214626 A1 | 9/2006 | Nilson et al. |
| 2006/0219448 A1 | 10/2006 | Grieve et al. |
| 2006/0238365 A1 | 10/2006 | Vecchione et al. |
| 2006/0270440 A1 | 11/2006 | Shearer et al. |
| 2006/0281435 A1 | 12/2006 | Shearer et al. |
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarman et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |

(56) References Cited

U.S. PATENT DOCUMENTS

| | | |
|---|---|---|
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0009057 A1* | 1/2011 | Saunamaki ............ H02J 7/025 455/41.1 |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |

(56) References Cited

U.S. PATENT DOCUMENTS

| | | |
|---|---|---|
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Capanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069442 A1* | 3/2013 | Kim ................... H02J 5/005 307/104 |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1 | 1/2014 | McCauley et al. |
| 2014/0070764 A1 | 3/2014 | Keeling |
| 2014/0111151 A1 | 4/2014 | Keeling et al. |
| 2014/0302782 A1* | 10/2014 | Raab ................... H04B 5/0037 455/41.1 |
| 2015/0180240 A1* | 6/2015 | Kwon ................... H02J 5/005 307/104 |
| 2015/0280451 A1* | 10/2015 | Takeda ................... H02J 5/005 307/104 |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |

(56) References Cited

FOREIGN PATENT DOCUMENTS

| KR | 10-2011-0050920 | 5/2011 |
|----|----|----|
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |
| WO | WO 2004/073177 | 8/2004 |
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Intel CTO Says Gap between Humans, Machines Will Close by 2050", *Intel News Release*, (See intel.com/ . . . /20080821comp.htm?iid=S . . . ) (Printed Nov. 6, 2009).
"Physics Update, Unwired Energy", *Physics Today*, pp. 26, (Jan. 2007) (See http://arxiv.org/abs/physics/0611063.).
"In pictures: A year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).
Berardelli, P., "Outlets Are Out", ScienceNow Daily News, Science Now, http://sciencenow.sciencemag.org/ cgi/content/full/2006/1114/2, (Nov. 14, 2006) 2 pages.
Biever, C., "Evanescent coupling' could power gadgets wirelessly", NewScientistsTech.com, http://www. newscientisttech.com/article.ns?id=dn1 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http://lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", *IEEE Transactions on Industrial Electronics*, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, A., "Recharging the Wireless Way—Even physicists forget to recharge their cell phones sometimes.", PC Magazine, ABC News Internet Ventures, (Dec. 12, 2006) 1 page.
Chinaview, , "Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pp./live/articles/technology/technology.html?in_article_id=4 . . . ), (Jun. 7, 2007) 3 pages.

(56) References Cited

OTHER PUBLICATIONS

Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant",*IEEE*, pp. 1965-1970 (2003).
Ferris, David, "How Wireless Charging Will Make Life Simpler (and Greener)", Forbes (See forbes.com/sites/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.
Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www.telegraph.co.uk/news/main.jhtml?xml=/news/2007/06/07/nwirelessl 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Information for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).

Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
InfoTech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Pelinittivity Dielectric Material for Microwave Communication Systems", *Proceedings of IEEE Tencon—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).
Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—No wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 μn wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging — the future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-32 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.

(56) References Cited

OTHER PUBLICATIONS

Press Release, "The world's first sheet-type wireless power transmission system: Will a socket be replaced by e-wall?",Public Relations Office, School of Engineering, University of Tokyo, Japan,Dec. 12, 2006,4 pages.
PressTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).
Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems-1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, (Oct. 30-Nov. 2, 1997) 4 pages.
Zierhofer, Clemens M. et al., "High-Efficiency Coupling-Insensitive Transcutaneous Power and Data Transmission via an Inductive Link", *IEEE Transactions on Biomedical Engineering*, vol. 37, No. 7, pp. 716-722 (Jul. 1990).
International Search Report and Written Opinion of the International Searching Authority for International Application No. PCT/US2015/039612 dated Oct. 14, 2015 (9 pages).

* cited by examiner

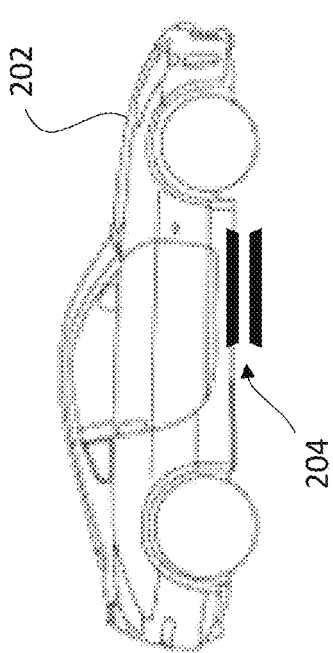
FIG. 2A
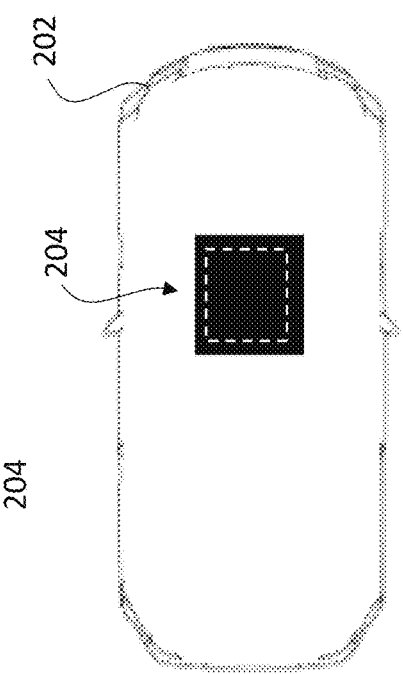
FIG. 2B
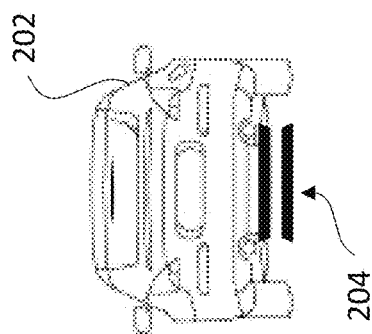
FIG. 2C
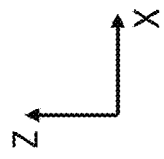
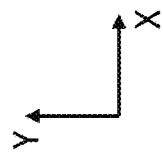
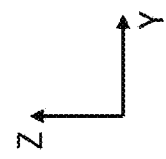

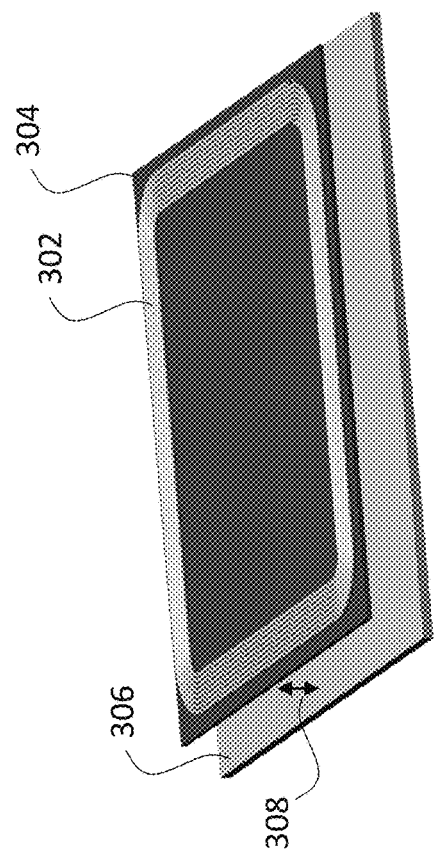
FIG. 3B
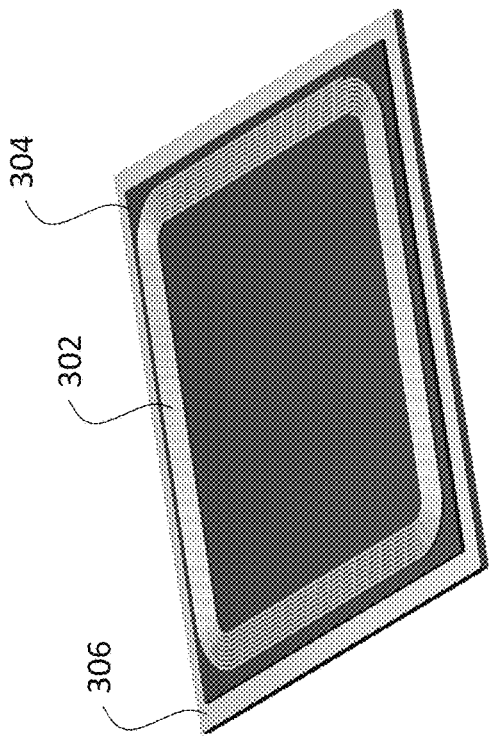
FIG. 3A
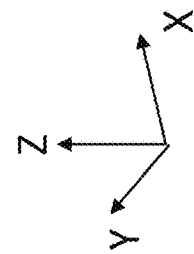

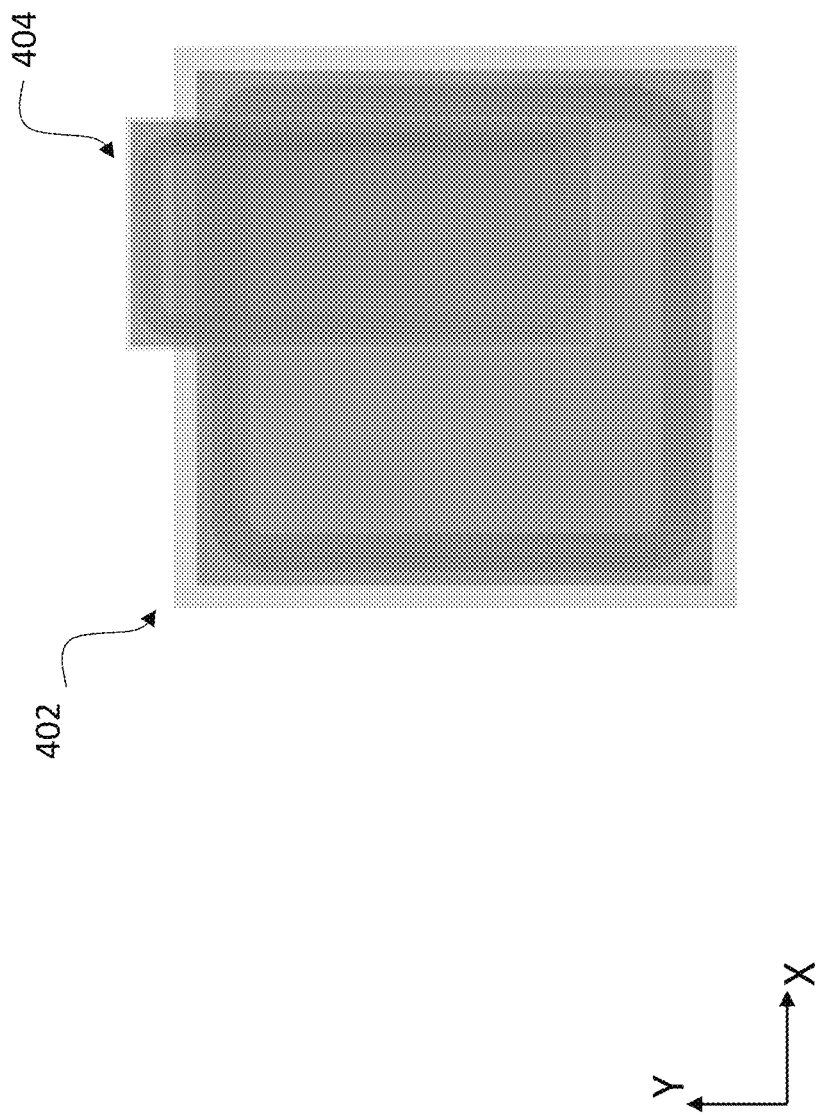

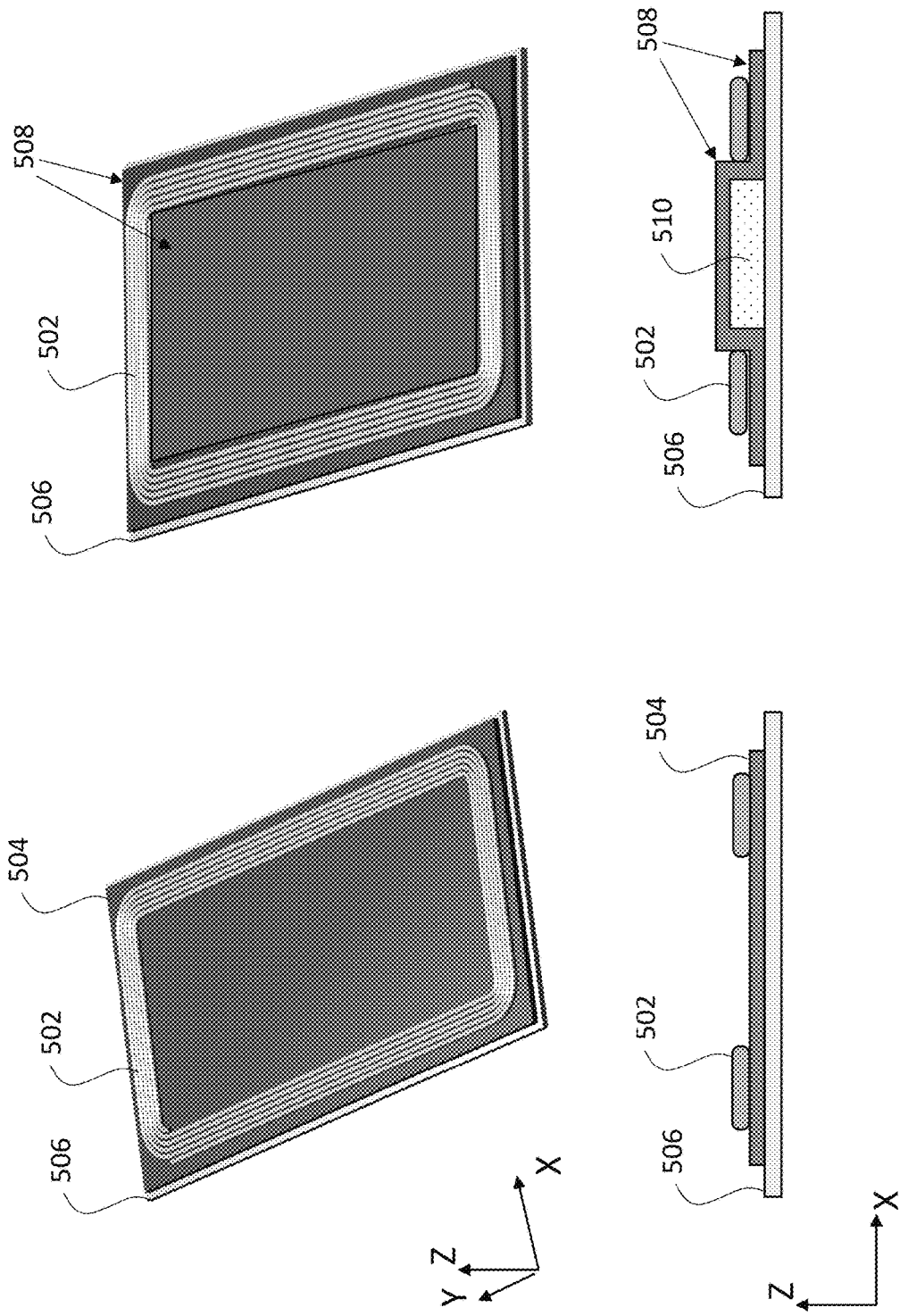

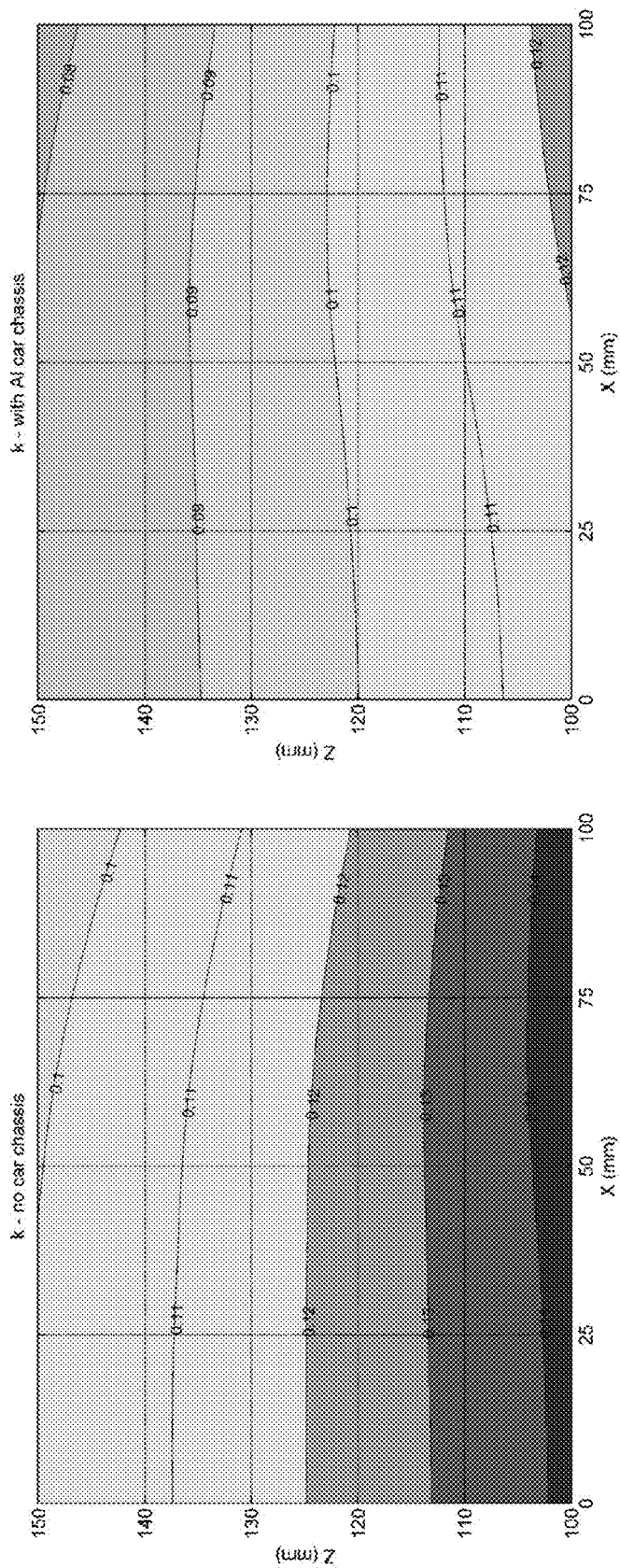
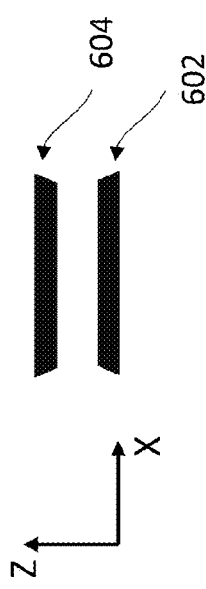
FIG. 6B
FIG. 6A

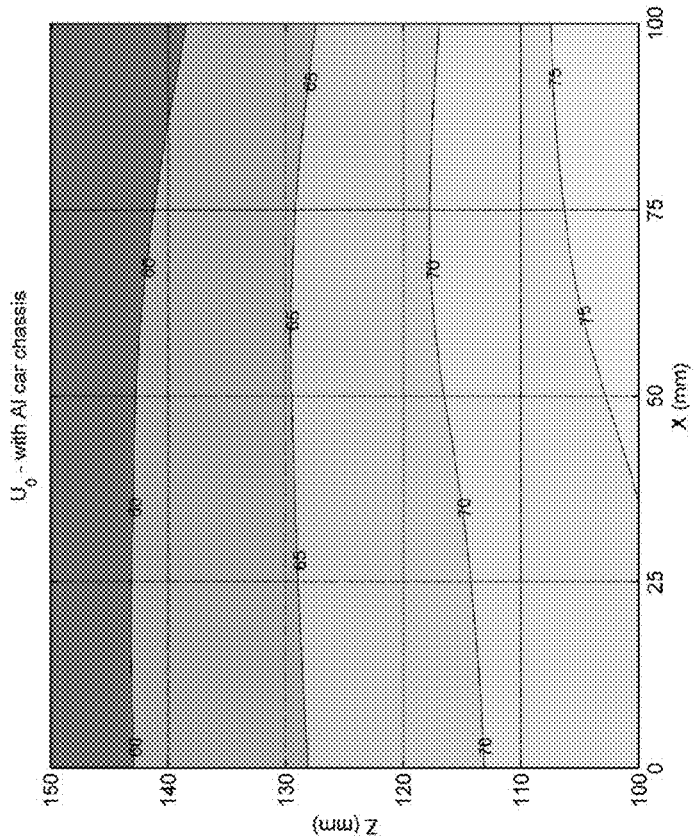
FIG. 7B
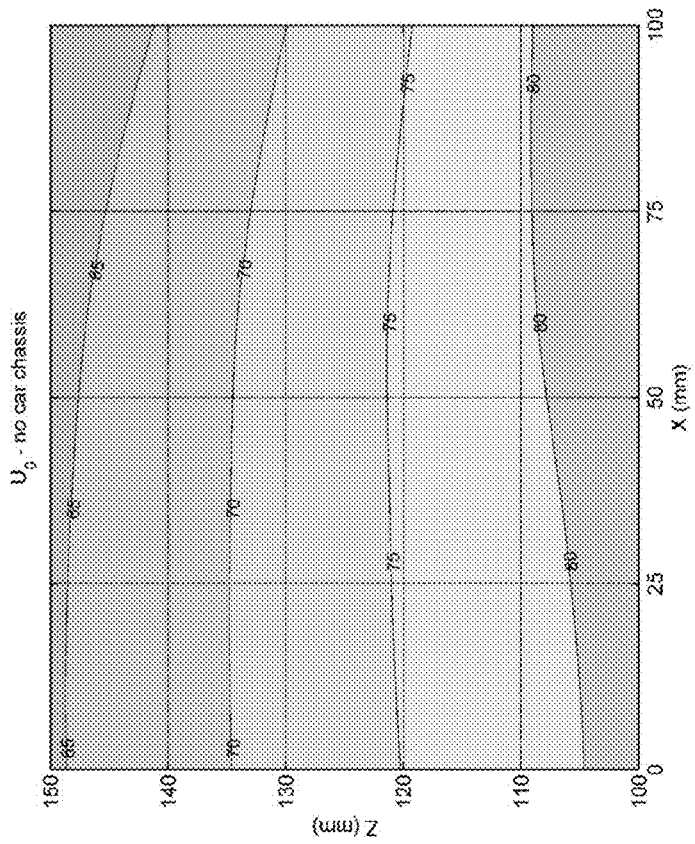
FIG. 7A
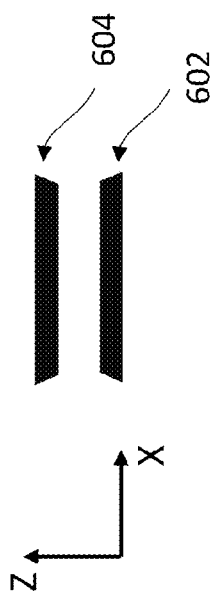

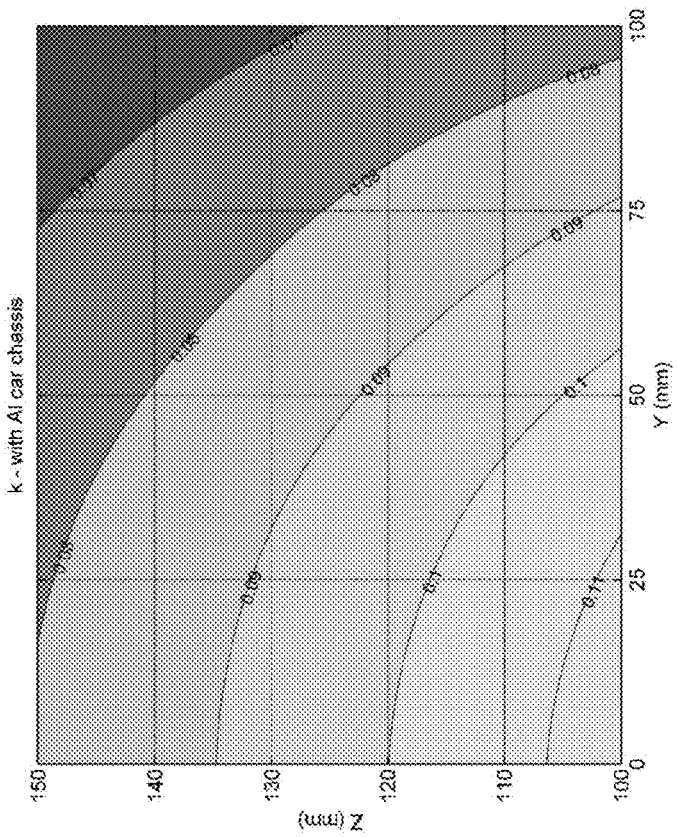
FIG. 8B
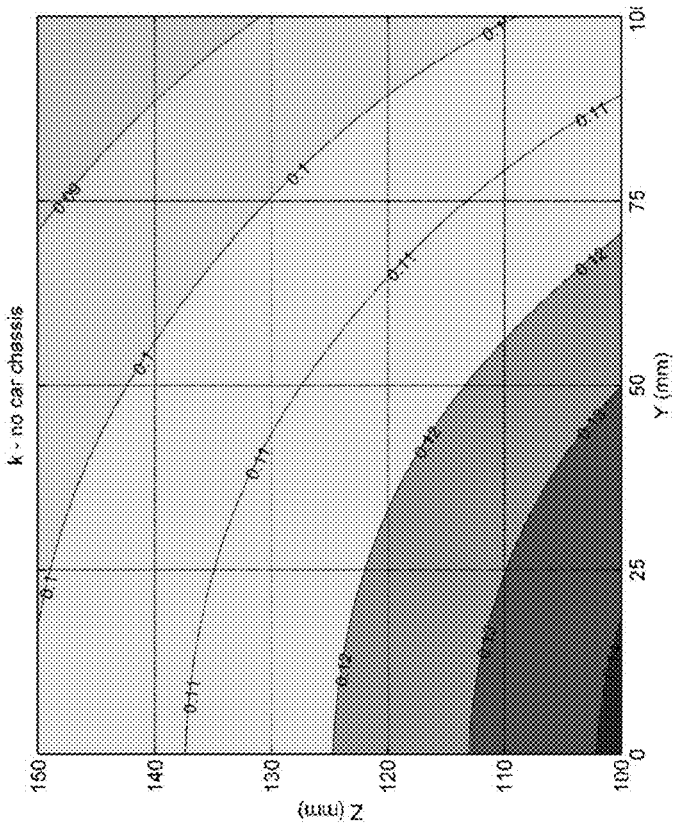
FIG. 8A
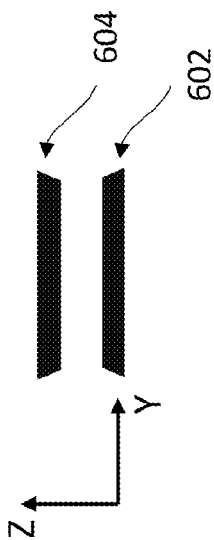

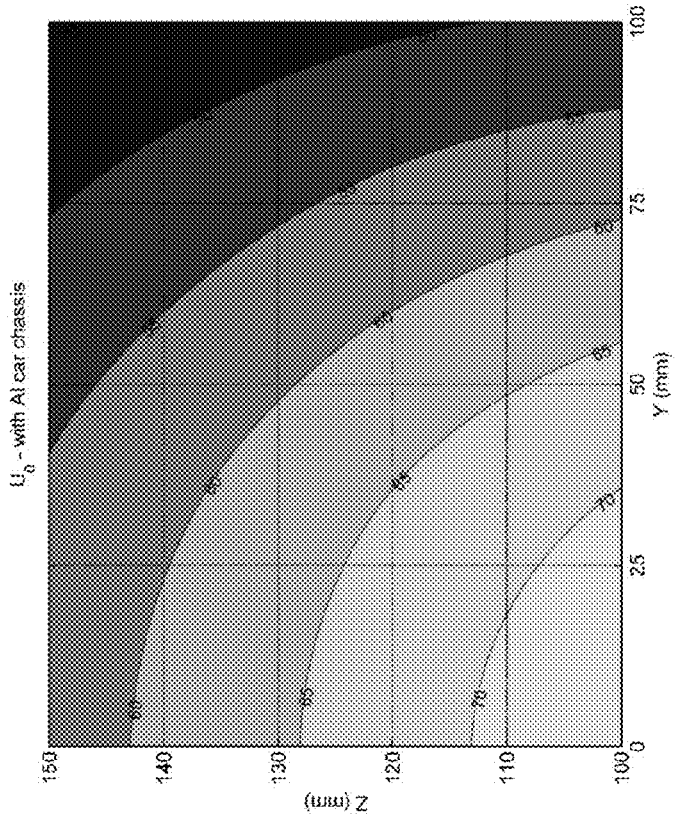
FIG. 9B
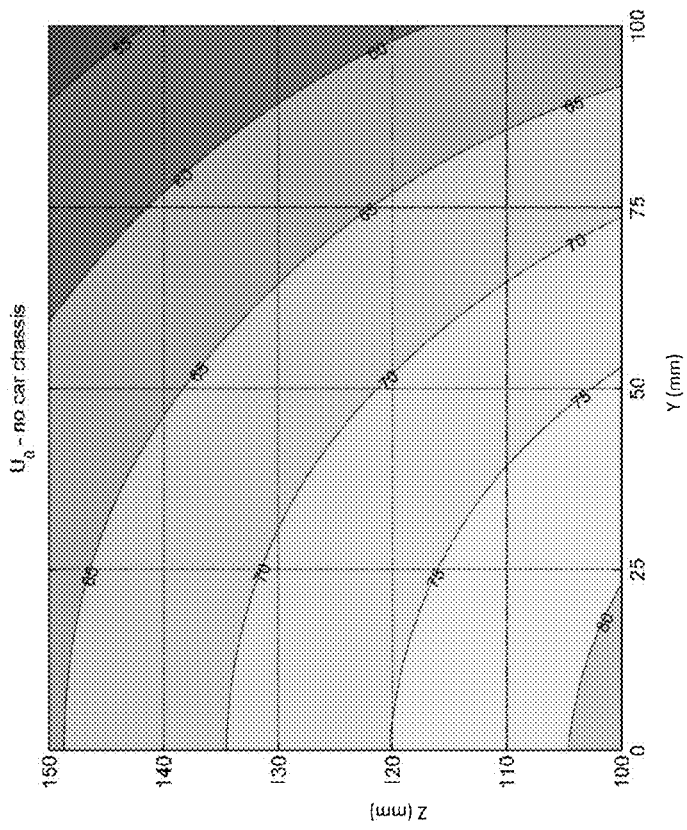
FIG. 9A
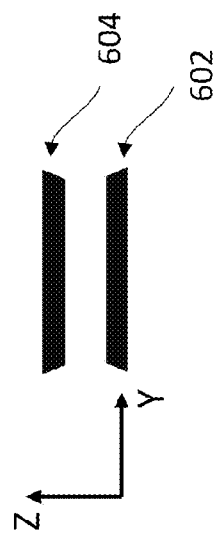

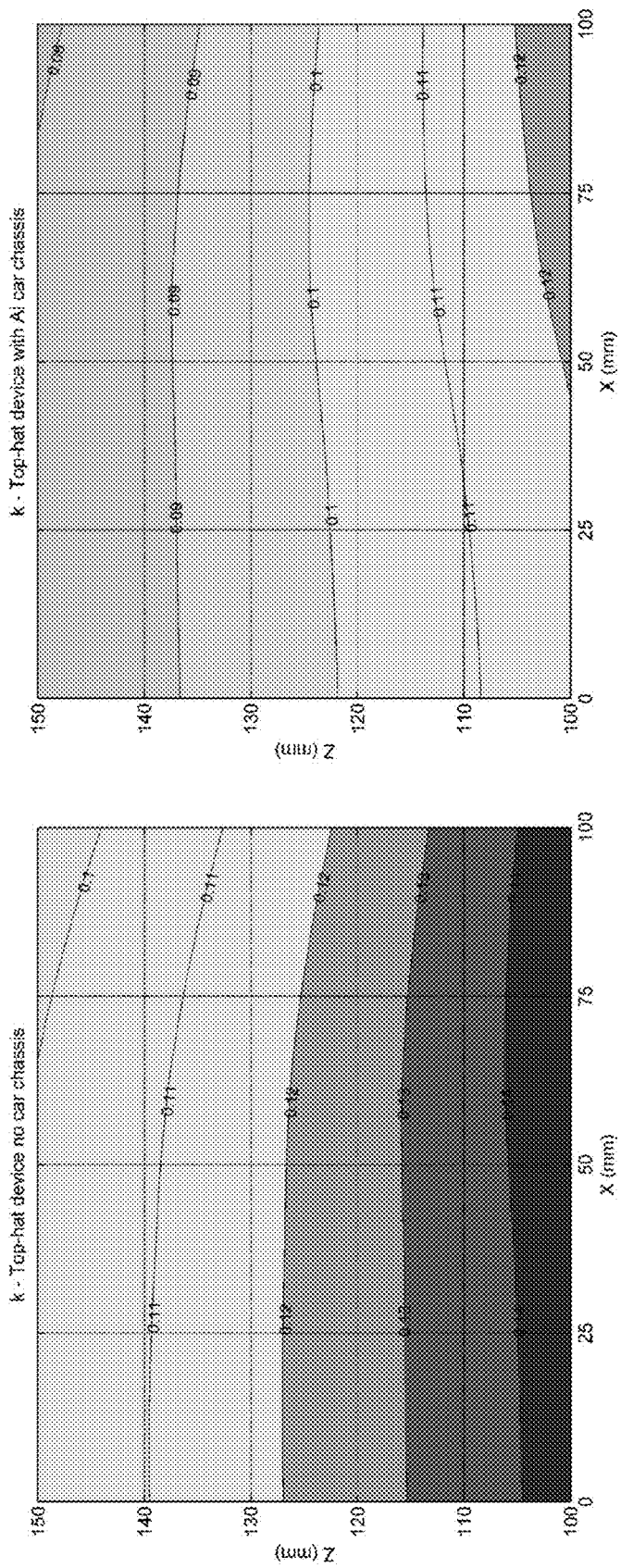
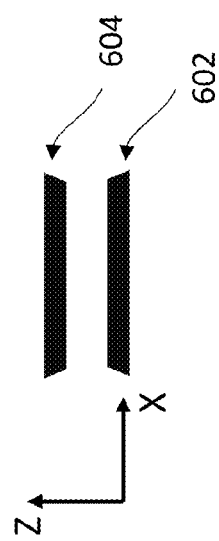
FIG. 10B
FIG. 10A

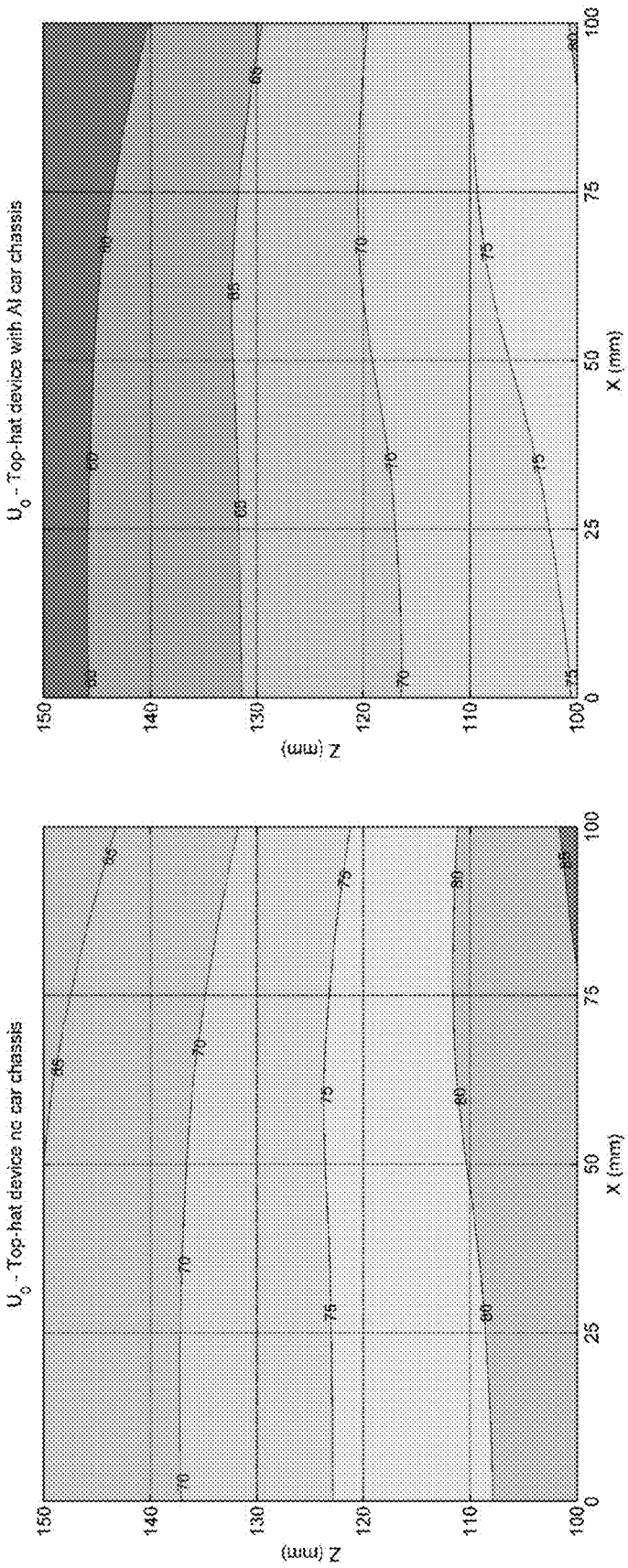
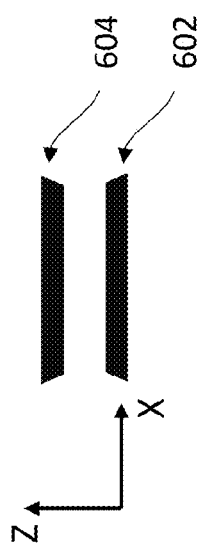
FIG. 11B
FIG. 11A

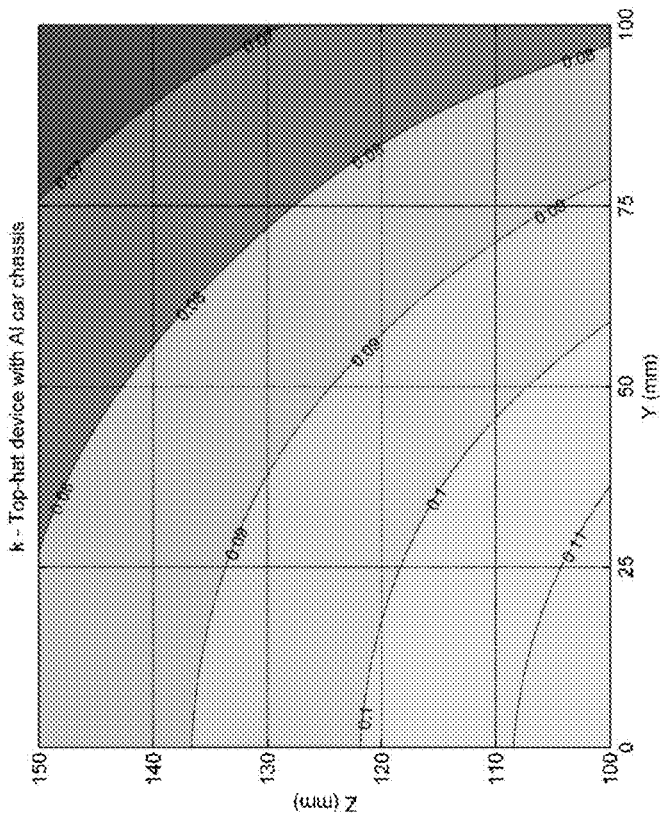
FIG. 12B
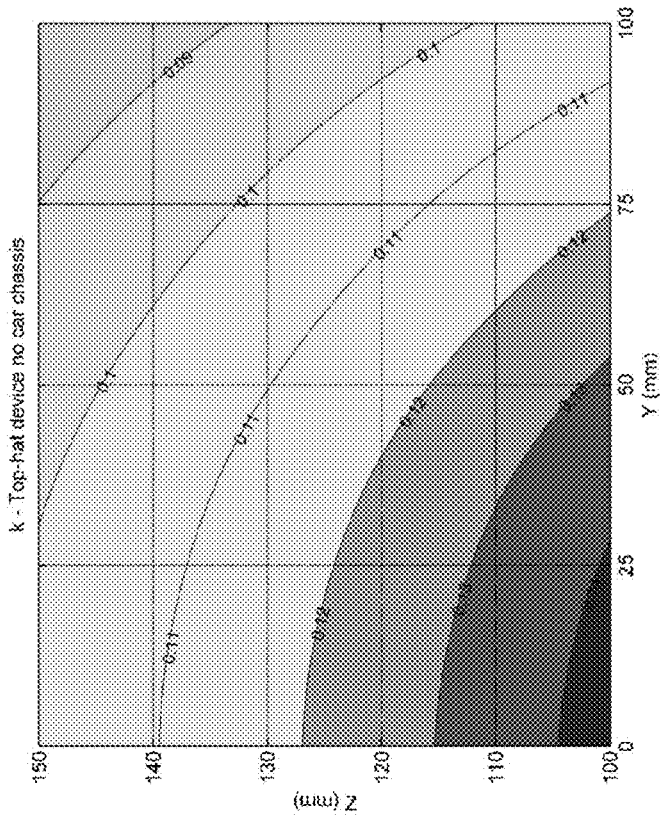
FIG. 12A
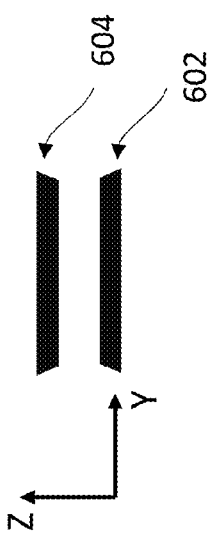

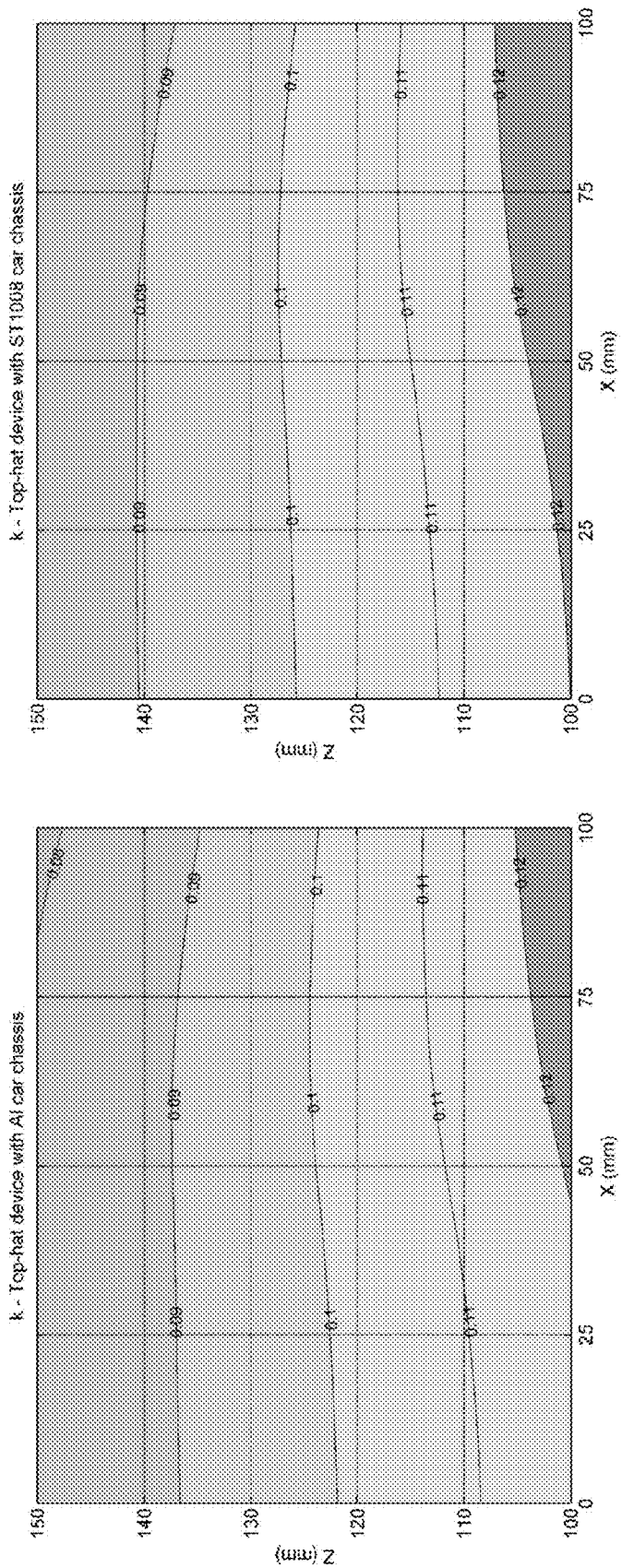
FIG. 14B
FIG. 14A
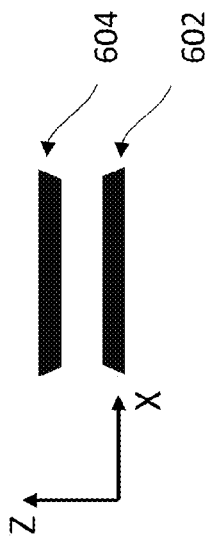

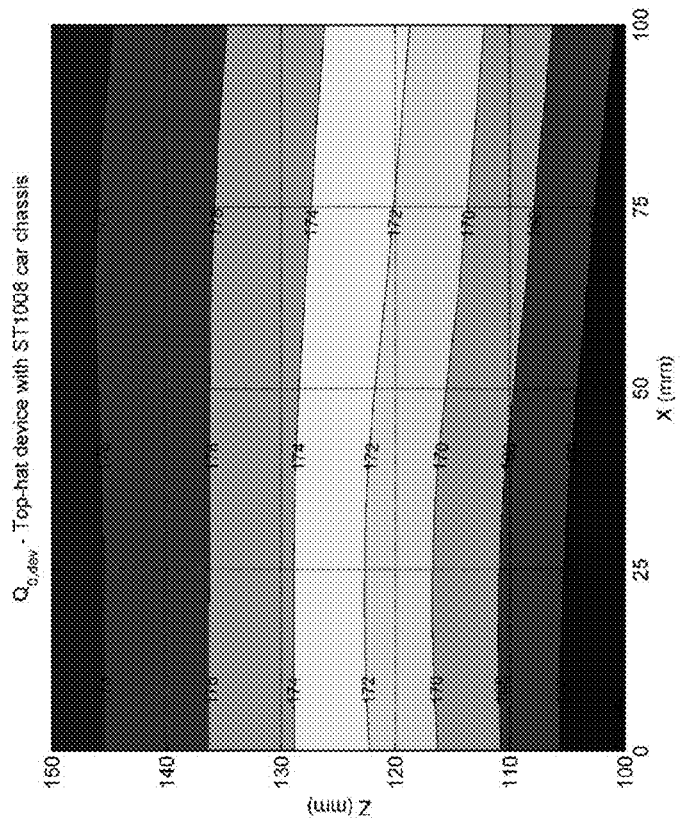
FIG. 15B
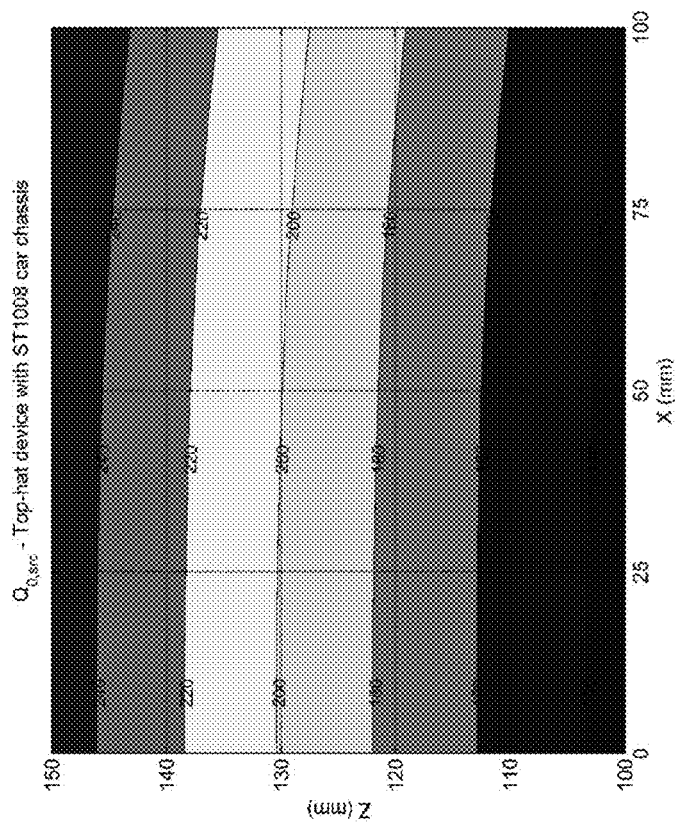
FIG. 15A
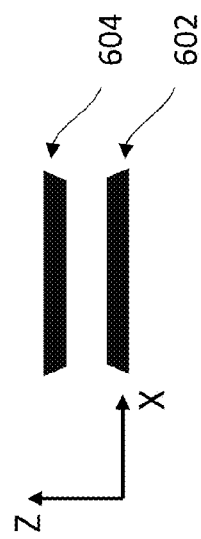

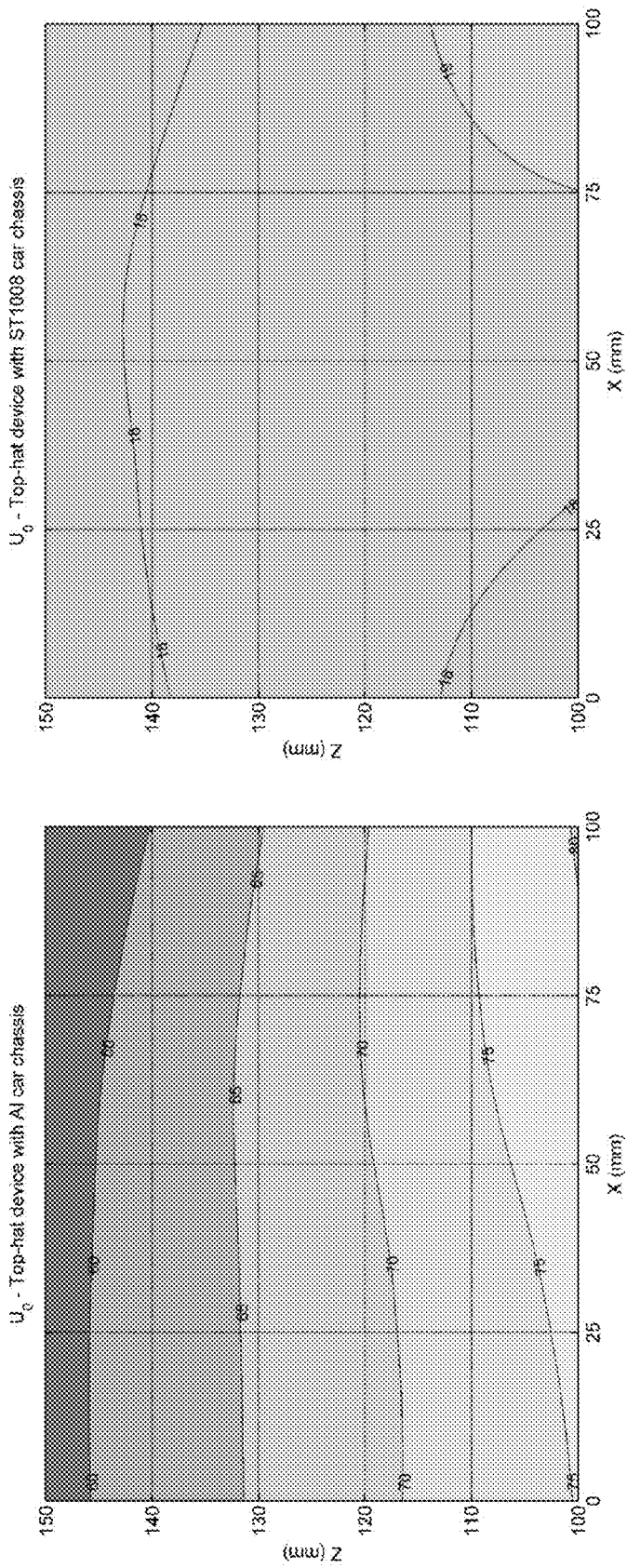
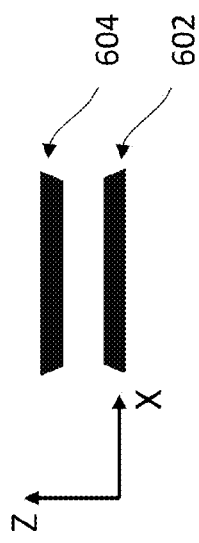
FIG. 16B
FIG. 16A

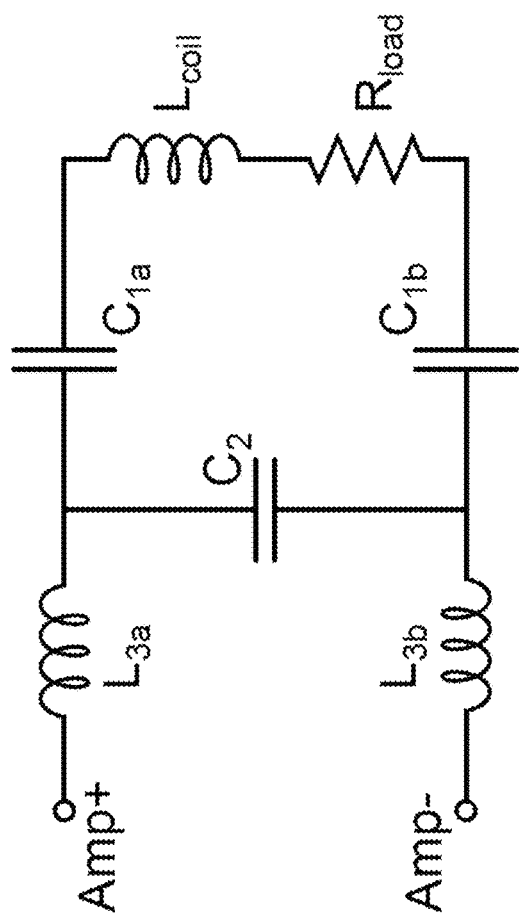
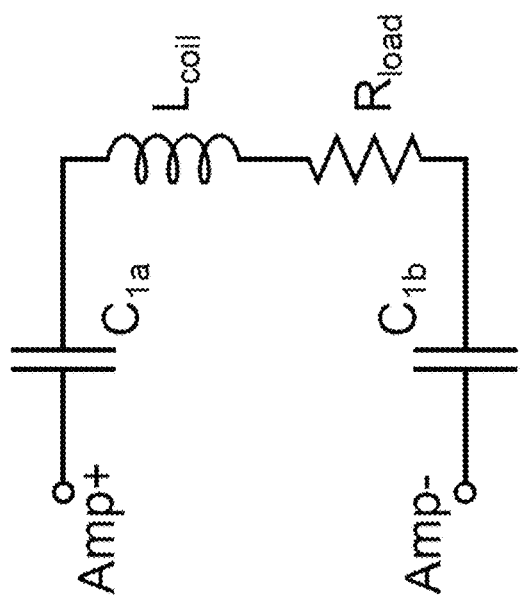
FIG. 17A
FIG. 17B

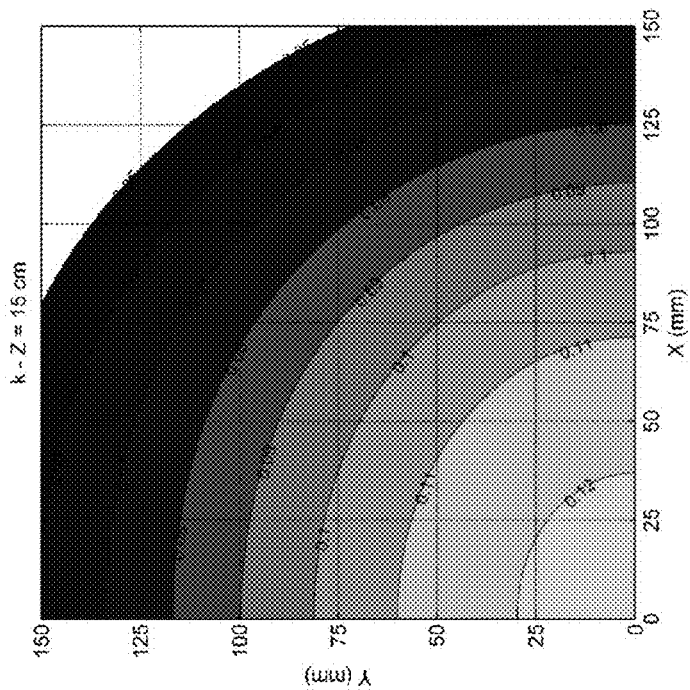
FIG. 33B
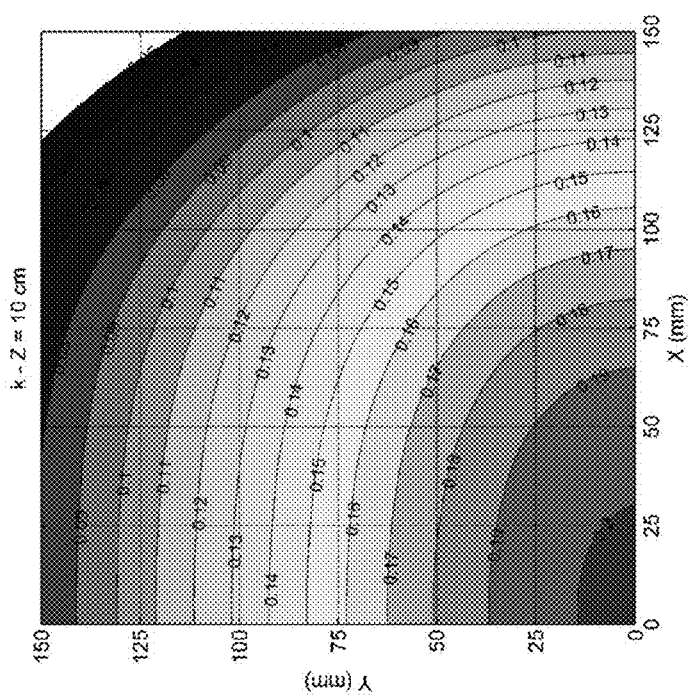
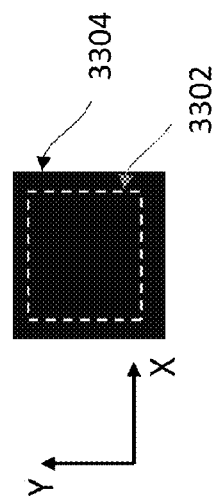
FIG. 33A

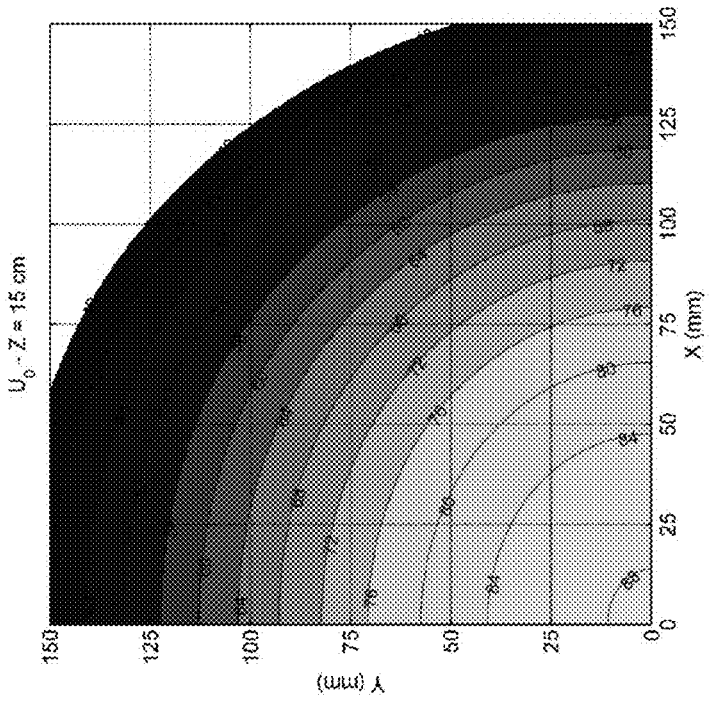
FIG. 34B
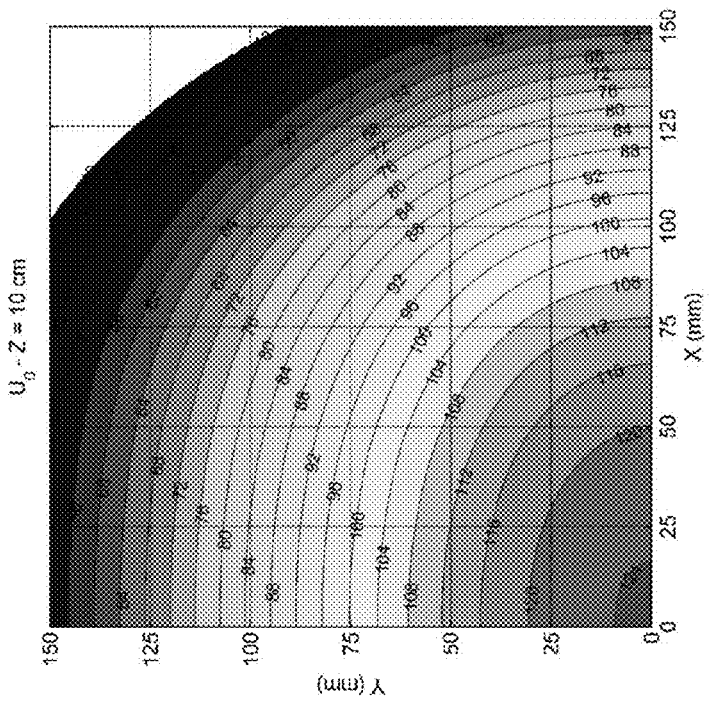
FIG. 34A
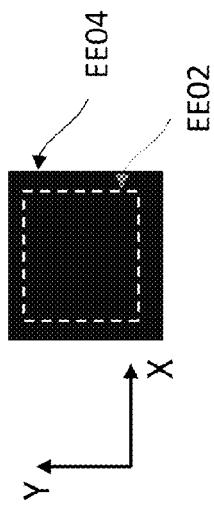

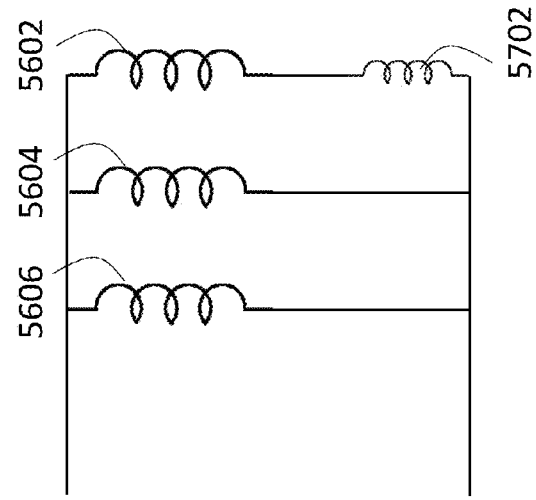
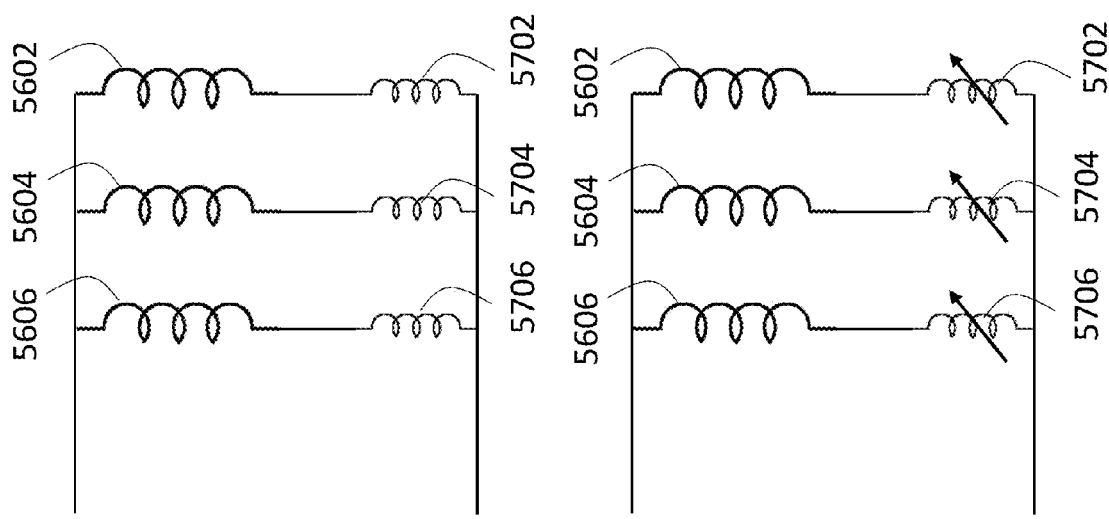
FIG. 57A
FIG. 57B
FIG. 57C

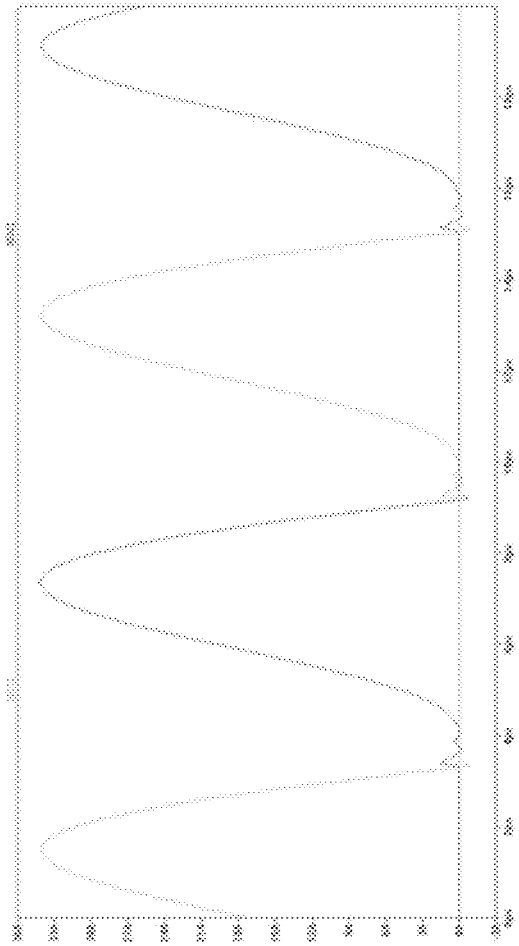
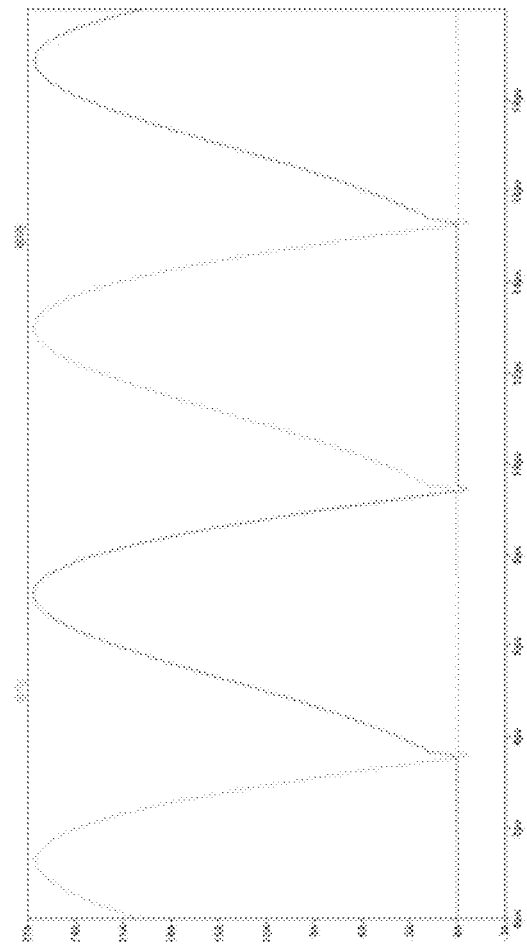

RESONATOR BALANCING IN WIRELESS POWER TRANSFER SYSTEMS

CROSS-REFERENCE TO RELATED APPLICATIONS

This application claims priority to U.S. Provisional Patent Application No. 62/022,133, filed on Jul. 8, 2014, and to U.S. Provisional Patent Application No. 62/051,647, filed on Sep. 17, 2014, the entire contents of each of which are incorporated herein by reference.

TECHNICAL FIELD

This disclosure relates to wireless power transfer systems and methods.

BACKGROUND

Energy can be transferred from a power source to a receiving device using a variety of known techniques such as radiative (far-field) techniques. For example, radiative techniques using low-directionality antennas can transfer a small portion of the supplied radiated power, namely, that portion in the direction of, and overlapping with, the receiving device used for pick up. In this example, most of the energy is radiated away in directions other than the direction of the receiving device, and typically the transferred energy is insufficient to power or charge the receiving device. In another example of radiative techniques, directional antennas are used to confine and preferentially direct the radiated energy towards the receiving device. In this case, an uninterruptible line-of-sight and potentially complicated tracking and steering mechanisms are used.

Another approach is to use non-radiative (near-field) techniques. For example, techniques known as traditional induction schemes do not (intentionally) radiate power, but use an oscillating current passing through a primary coil, to generate an oscillating magnetic near-field that induces currents in a near-by receiving or secondary coil. Traditional induction schemes can transfer modest to large amounts of power over very short distances. In these schemes, the offset tolerances between the power source and the receiving device are very small. Electric transformers and proximity chargers use these traditional induction schemes.

SUMMARY

In general, in a first aspect, the disclosure features systems for wireless power transfer that include: a resonator including a coil with at least two windings, each of the at least two windings featuring a plurality of loops formed by a conductive material and extending in a plane, where corresponding portions of each of the at least two windings are oriented in parallel, where at least one of the windings has a length that differs from a length of another one of the windings, and where the at least two windings are electrically connected in parallel; and at least one inductor having an inductance value, where the at least one inductor is connected in series to at least one of the windings, and where the inductance value is selected so that when the coil carries a current during operation of the system, the at least one inductor maintains a distribution of current flows among the at least two windings such that for each of the at least two windings, an actual current flow in the winding differs from a target current flow for the winding by 10% or less.

Embodiments of the systems can include any one or more of the following features.

The at least one inductor can include an adjustable inductance value. Corresponding portions of each of the at least two windings can be oriented in parallel along at least 80% of a length of at least one of the windings. The loops of each winding can be interleaved. The loops of each winding can be concentric and form a spiral.

The systems can include an electronic processor coupled to the at least two windings and configured to control electrical currents in each of the windings based on the target current flows for the at least two windings. The electronic processor can be configured to control electrical currents in each of the windings by: determining a target inductance value for the at least one inductor based on a figure of merit related to the target current flows; and adjusting the inductance value of the at least one inductor to match the target inductance value. The electronic processor can be configured to determine the target inductance value by: (i) for each one of the windings, determining a self-inductance value of the one winding based on a measurement of inductance of the one winding when it is electrically disconnected from all other windings, and determining a plurality of cross-inductance values of the one winding, where each cross-inductance value is based on a measurement of inductance of the one winding when it is electrically disconnected from another one of the windings; (ii) determining the target current flows for each of the windings based on the self-inductance values and the cross-inductance values; and (iii) determining the target inductance value based on the target current flows for each of the windings. The electronic processor can be configured to determine the target current flows by: constructing an inductance matrix based on the self-inductance values and the cross-inductance values of each of the windings; calculating an adjusted inductance matrix by adding to the inductance matrix an inductance modification matrix comprising elements that correspond to changes in inductance of each of the windings due to the at least one inductor; calculating an inverse matrix of the adjusted inductance matrix; and determining the target current flows based on the inverse matrix. The inductance modification matrix can be a diagonal matrix, and diagonal elements of the inductance modification matrix can be inductance values of respective members of the at least one inductor connected to the windings.

In another aspect, the disclosure features methods that include: controlling electrical currents in each of at least two windings of a resonator coil for wireless power transfer, where each of the at least two windings includes a plurality of loops formed by a conductive material and extending in a plane, where corresponding portions of each of the at least two windings are oriented in parallel, where at least one of the windings has a length that differs from a length of another one of the windings, where the at least two windings are electrically connected in parallel, and where at least one inductor having an inductance value is connected in series to at least one of the windings; and maintaining a distribution of current flows among the at least two windings when the coil carries a current such that for each of the at least two windings, an actual current flow in the winding differs from a target current flow for the winding by 10% or less.

Embodiments of the methods can include any one or more of the following features.

Corresponding portions of each of the at least two windings can be oriented in parallel along at least 80% of a length of at least one of the windings. The loops of each winding can be interleaved. The loops of each winding can be concentric and form a spiral.

The methods can include controlling electrical currents in each of the windings to maintain the distribution of current flows by: determining a target inductance value for the at least one inductor based on a figure of merit related to the target current flows; and adjusting the inductance value of the at least one inductor to match the target inductance value. The methods can include determining the target inductance value by: (i) for each one of the windings, determining a self-inductance value of the one winding based on a measurement of inductance of the one winding when it is electrically disconnected from all other windings, and determining a plurality of cross-inductance values of the one winding, where each cross-inductance value is based on a measurement of inductance of the one winding when it is electrically disconnected from another one of the windings; (ii) determining the target current flows for each of the windings based on the self-inductance values and the cross-inductance values; and (iii) determining the target inductance value based on the target current flows for each of the windings.

The methods can include determining the target current flows by: constructing an inductance matrix based on the self-inductance values and the cross-inductance values of each of the windings; calculating an adjusted inductance matrix by adding to the inductance matrix an inductance modification matrix featuring elements that correspond to changes in inductance of each of the windings due to the at least one inductor; calculating an inverse matrix of the adjusted inductance matrix; and determining the target current flows based on the inverse matrix. The inductance modification matrix can be a diagonal matrix, and diagonal elements of the inductance modification matrix can be inductance values of respective members of the at least one inductor connected to the windings.

In a further aspect, the disclosure features resonator coils for wireless power transfer that include a member formed of magnetic material and at least two windings electrically connected in parallel, each of the at least two windings featuring a plurality of loops formed by a conductive material, where the loops of each of the at least two windings are interleaved so that corresponding portions of each of the at least two windings are oriented in parallel along at least 80% of a length of at least one of the windings, and where each one winding of the at least two windings spatially overlaps at least one other winding at one or more points along a length of the one winding.

Embodiments of the coils can include any one or more of the following features.

The loops of each winding can be oriented in a plane. The loops of all windings can be oriented in a common plane. The loops of each winding can be concentric and can form a spiral. The loops of all windings can form a concentric spiral of loops.

The coils can include at least one inductor having an adjustable inductance connected in series to at least one of the windings. The coils can include at least one inductor having an adjustable inductance connected in series to each of the at least two windings. Each one winding of the at least two windings can spatially overlap each of the other windings at one or more points along the length of the one winding. For each one winding, the points at which the one winding overlaps the at least some of the other windings can be equally spaced along a circumference of the one winding.

The at least two windings can include n windings, each one winding of the n windings can spatially overlap each of the other n−1 windings along the length of the one winding, and each one winding of the n windings can include n−1 points of overlap with the other windings, each one of the points corresponding to overlap of the one winding with a different one of the other windings. The quantity n can be greater than two (e.g., greater than three).

The at least two windings can include n windings, and at least one winding of the n windings can include more than n−1 points of overlap with the other windings so that the at least one winding spatially overlaps at least some of the other n−1 windings more than once. The at least two windings can include n windings, and at least one winding of the n windings can include fewer than n−1 points of overlap with the other windings so that the at least one winding does not spatially overlap all of the other n−1 windings.

Embodiments of the systems, methods, and coils can also include any of the other features disclosed herein, including features disclosed in connection with different embodiments, in any combination as appropriate.

Unless otherwise defined, all technical and scientific terms used herein have the same meaning as commonly understood by one of ordinary skill in the art to which this disclosure belongs. In case of conflict with publications, patent applications, patents, and other references mentioned or incorporated herein by reference, the present disclosure, including definitions, will control. Any of the features described above may be used, alone or in combination, without departing from the scope of this disclosure. Other features, objects, and advantages of the systems and methods disclosed herein will be apparent from the following detailed description and figures.

DESCRIPTION OF DRAWINGS

FIGS. 2A-2C are schematic diagrams of a wireless power transfer system integrated into a vehicle.

FIGS. 3A and 3B are schematic diagrams showing a source resonator coil in proximity to a magnetic material.

FIG. 4 is a schematic diagram of a source resonator.

FIGS. 5A and 5B are schematic diagrams of devices configured to wirelessly receiver power.

FIGS. 6A and 6B are plots showing measurements of coupling k between a source resonator and a receiver resonator as a function of relative displacement of the resonators.

FIGS. 7A and 7B are plots showing figure-of-merit as a function of relative displacement between source and receiver resonators.

FIGS. 8A and 8B are plots showing measurements of coupling k as a function of relative displacement between source and receiver resonators.

FIGS. 9A and 9B are plots showing figure-of-merit as a function of relative displacement between source and receiver resonators.

FIGS. 10A and 10B are plots showing measurements of coupling k between a source resonator and a receiver resonator as a function of relative displacement of the resonators.

FIGS. 11A and 11B are plots showing figure-of-merit as a function of relative displacement between source and receiver resonators.

FIGS. 12A and 12B are plots showing measurements of coupling k between a source resonator and a receiver resonator as a function of relative displacement of the resonators.

FIGS. 14A and 14B are plots showing measurements of coupling k between a source resonator and a receiver resonator as a function of relative displacement of the resonators.

FIGS. 15A and 15B are plots showing quality factor as a function of relative displacement between source and receiver resonators.

FIGS. 16A and 16B are plots showing figure-of-merit as a function of relative displacement between source and receiver resonators.

FIGS. 17A and 17B are schematic diagrams of impedance matching networks.

FIGS. 33A and 33B are plots of coupling between source and device resonators as a function of offset between the resonators.

FIGS. 34A and 34B are plots of figure-of-merit for a wireless power transfer system as a function of offset between source and device resonators.

FIGS. 57A and 57B are schematic diagrams showing inductors connected in series with parallel windings of a coil.

FIG. 57C is a schematic diagram of a single inductor connected in series with one of several parallel windings of a coil.

FIGS. 64A and 64B are plots of peak current through the diodes of a rectifier in an impedance matching network.

DETAILED DESCRIPTION

The wireless power transfer systems disclosed herein use one or more source resonators to generate oscillating magnetic fields. The oscillating magnetic fields are captured by, and induce electrical currents and voltages in, one or more receiving resonators. The receiving resonators can be coupled to loads, and the electrical currents and voltages can be used to drive the loads to do useful work. The receiving resonators can also act as relay resonators, further transmitting power wirelessly by generating additional oscillating magnetic fields.

Wireless power transfer systems can be integrated into a variety of devices and used for a wide range of power-demanding applications. For example, such systems can be integrated into electric vehicles and used to power and/or charge the vehicles. Such systems can also be used to power electronic devices, including fixed and portable devices, and can be integrated into a diverse range of structures including furniture (e.g., desks, tables) and structural features (e.g., floors, walls, columns, streets). The systems can provide power in quantities that range from very small amounts to significant quantities for high-power applications. For example, the systems disclosed herein may provide power greater than 1 kW, 3 kW, 5 kW, 10 kW, 20 kW, 50 kW, or more from one or more source resonators to one or more receiving resonators connected to electrical devices.

Introduction

Figure 1A:
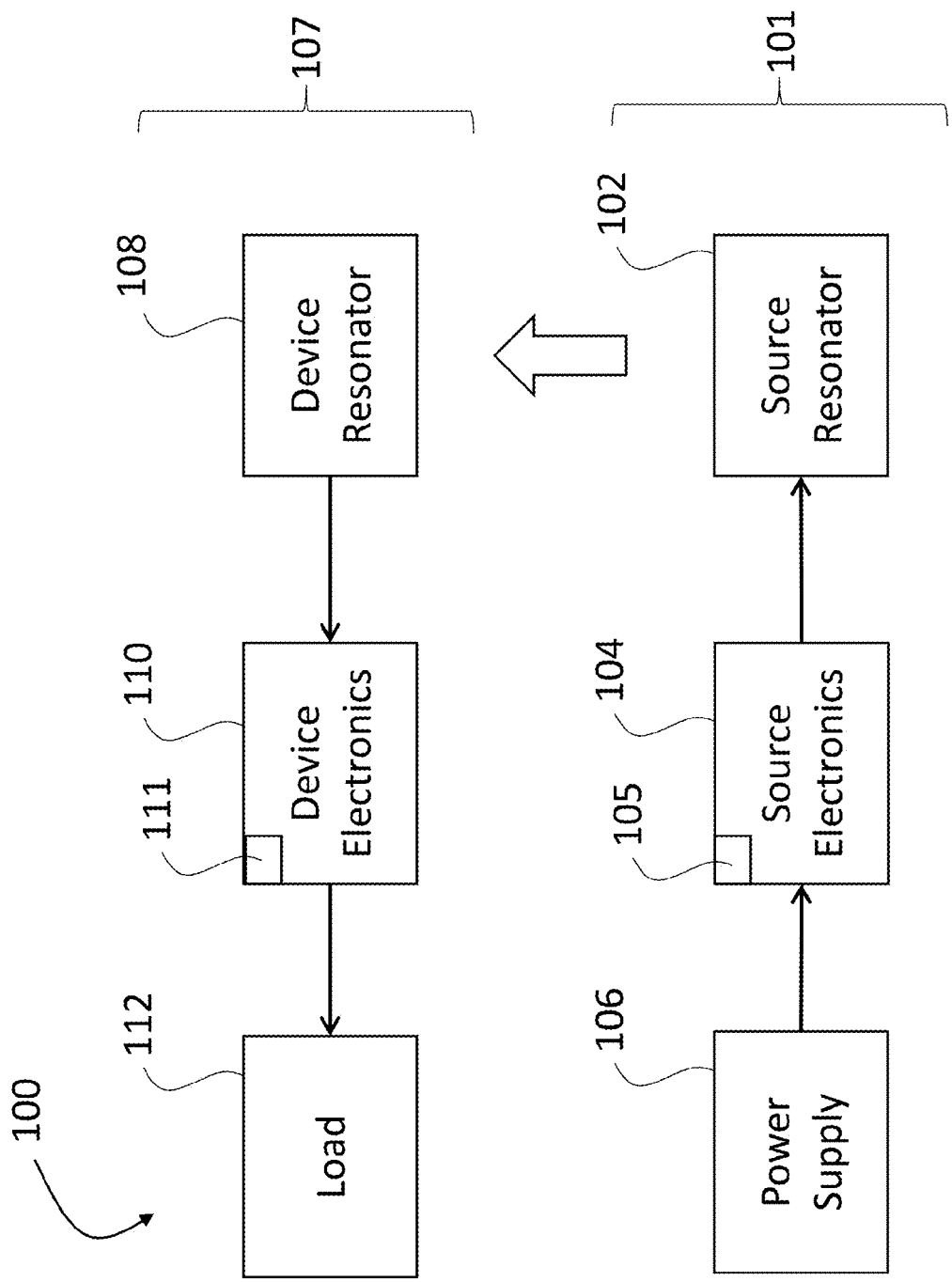
FIG. 1A is a schematic diagram of an embodiment of a wireless power transfer system.

FIG. 1A shows a schematic diagram of an embodiment of a wireless power transfer system 100 that includes a wireless power source 101 and device 107. Wireless power source 101 includes a source resonator 102 coupled to source electronics 104, which are connected to a power supply 106. Source electronics 104 can include a variety of components including an AC/DC converter, an amplifier, and an impedance matching network. Power supply 106 can include one or more of AC mains, solar panels, and one or more batteries. Not all of the components of power source 101 need to be present for operation, and in some embodiments, certain components shown in FIG. 1A can be integrated (source electronics 104 and power supply 106 can be integrated into a single component, for example).

Device 107 includes a device resonator 108 coupled to device electronics 110 to provide power to a load 112. Device electronics 110 can include a variety of components, such as a rectifier and/or an impedance matching network. Load 112 generally corresponds to any of a variety of power-dissipating electrical components, such as a battery and/or an electromechanical device. Not all of the components of device 107 need to be present for operation, and in some embodiments, certain components shown in FIG. 1A can be integrated (device electronics 110 and load 112 can be integrated into a single component, for example).

Source electronics 104 and device electronics 110 can each include one or more electronic processors (processors 105 and 111, respectively). Electronic processors 105 and 111 can perform a variety of monitoring, computation, and control functions. For example, as will be described in more detail subsequently, processors 105 and/or 111 can measure electrical parameters of various system components (by directing suitable control signals to various sensors), calculate various performance-related metrics and attributes based on measurement signals received from the sensors, and transmit control signals to various system components based on the calculated metrics and attributes. In general, processors 105 and 111 can be configured to perform any of the monitoring, computational, and control functions disclosed herein. In addition, or as an alternative, source electronics 104 and/or device electronics 111 can include dedicated electrical circuits (e.g., application-specific integrated circuits) and logic units (e.g., programmable logic arrays) that can be configured to perform any one or more of these functions.

Processors 105 and/or 111 can be coupled to one or more components of system 100 in various configurations. In some embodiments, processors 105 and/or 111 are coupled to system components via a direct electrical connection. In certain embodiments, processors 105 and/or 111 are coupled to system components via wireless communication (e.g., radio-frequency, Bluetooth communication). The coupling between the processors and the system components can be different for different system components. For example, processor 105 can be directly connected to power supply 106 and source resonator 102, and coupled wirelessly to device resonator 108 and/or device electronics 110.

Additional aspects and features of wireless power transfer systems are disclosed, for example, in the following, the entire contents of each of which are incorporated herein by reference: U.S. Patent Application Publication No. 2012/0119569; U.S. Patent Application Publication No. 2015/0051750; U.S. Pat. No. 8,772,973; U.S. Patent Application Publication No. 2010/0277121; and U.S. Pat. No. 8,598,743.

In some embodiments, processor 105 can direct power supply 106 to provide power to source resonator 102. For example, processor 105 can increase the power output of power supply 106, thereby increasing the power delivered to source resonator 102. The power output can be delivered at an operating frequency corresponding to a frequency of the oscillating magnetic field that is generated by source resonator 102.

In certain embodiments, processor 105 (and/or processor 111) can tune a resonant frequency of source resonator 102 and/or a resonant frequency of device resonator 108. By tuning resonant frequencies of the source and device resonators relative to the operating frequency of power supply 106, the efficiency of power transfer from power supply 106 to load 112 can be controlled. For example, processor 105 (and/or processor 111) can tune the resonant frequencies of source resonator 102 and/or device resonator 108 to be substantially the same (e.g., within 0.5%, within 1%, within 2%) to increase the efficiency of power transfer.

In some embodiments, processors 105 and/or 111 can tune the resonant frequencies by adjusting capacitance values of components in source resonator 102 and/or source electronics 104. Resonant frequencies can also be tuned by adjusting capacitance values of components in device resonator 108 and/or device electronics 110. For example, to tune the resonance frequency of source resonator 102, processor 105 can adjust a capacitance of a capacitor connected to a coil in source resonator 102. The adjustment can be based on a measurement of the resonance frequency by processor 105 and/or based on a communication signal transmitted from source resonator 102 and/or device resonator 108 to processor 105 (e.g., transmitted wirelessly). In certain embodiments, processor 105 can tune the resonant frequency of source resonator 102 to be substantially the same (e.g., within 0.5%, within 1%, within 2%) as the operating frequency of power supply 106. In some embodiments, processor 105 can tune the resonant frequency of source resonator 102 to be different from the operating frequency by 7% to 13% (e.g., 10% to 15%, 13% to 19%). Similar considerations apply to the tuning of the resonance frequency of device resonator 108 (e.g., by processor 111 and/or processor 105).

In some embodiments, processors 105 and/or 111 can control an impedance matching network in system 100 to adjust impedance matching conditions in the system, and thereby control the efficiency of power transfer. For example, processor 105 can tune the capacitance of capacitors or networks of capacitors in an impedance matching network connected between power supply 106 and source resonator 102 (e.g., as part of source electronics 104). Alternatively, or in addition, processor 105 can tune the inductance of inductors or networks of inductors in an impedance matching network. The optimum impedance conditions can be calculated by processor 105 and/or can be received from an external device.

Similarly, in certain embodiments, processor 111 can control impedance matching conditions by tuning the capacitance and/or inductance of capacitors and/or inductors, respectively, in an impedance matching network connected between device resonator 108 and load 112 (e.g., as part of device electronics 110). Additional aspects of frequency tuning and impedance matching networks are disclosed, for example, in U.S. Patent Application Publication No. 2015/0051750, the entire contents of which are incorporated herein by reference.

In this disclosure, "wireless energy transfer" from one coil (e.g., a resonator coil) to another coil (e.g., another resonator coil) refers to transferring energy to do useful work (e.g., electrical work, mechanical work, etc.) such as powering electronic devices, vehicles, lighting a light bulb or charging batteries. Similarly, "wireless power transfer" from one coil (e.g., resonator coil) to another resonator (e.g., another resonator coil) refers to transferring power to do useful work (e.g., electrical work, mechanical work, etc.) such as powering electronic devices, vehicles, lighting a light bulb or charging batteries. Both wireless energy transfer and wireless power transfer refer to the transfer (or equivalently, the transmission) of energy to provide operating power that would otherwise be provided through a wired connection to a power source, such as a connection to a main voltage source. With the above understanding, the expressions "wireless energy transfer" and "wireless power transfer" are used interchangeably in this disclosure. It should also be understood that, "wireless power transfer" and "wireless energy transfer" can be accompanied by the transfer of information; that is, information can be transferred via an electromagnetic signal along with the energy or power to do useful work.

Figure 1B:
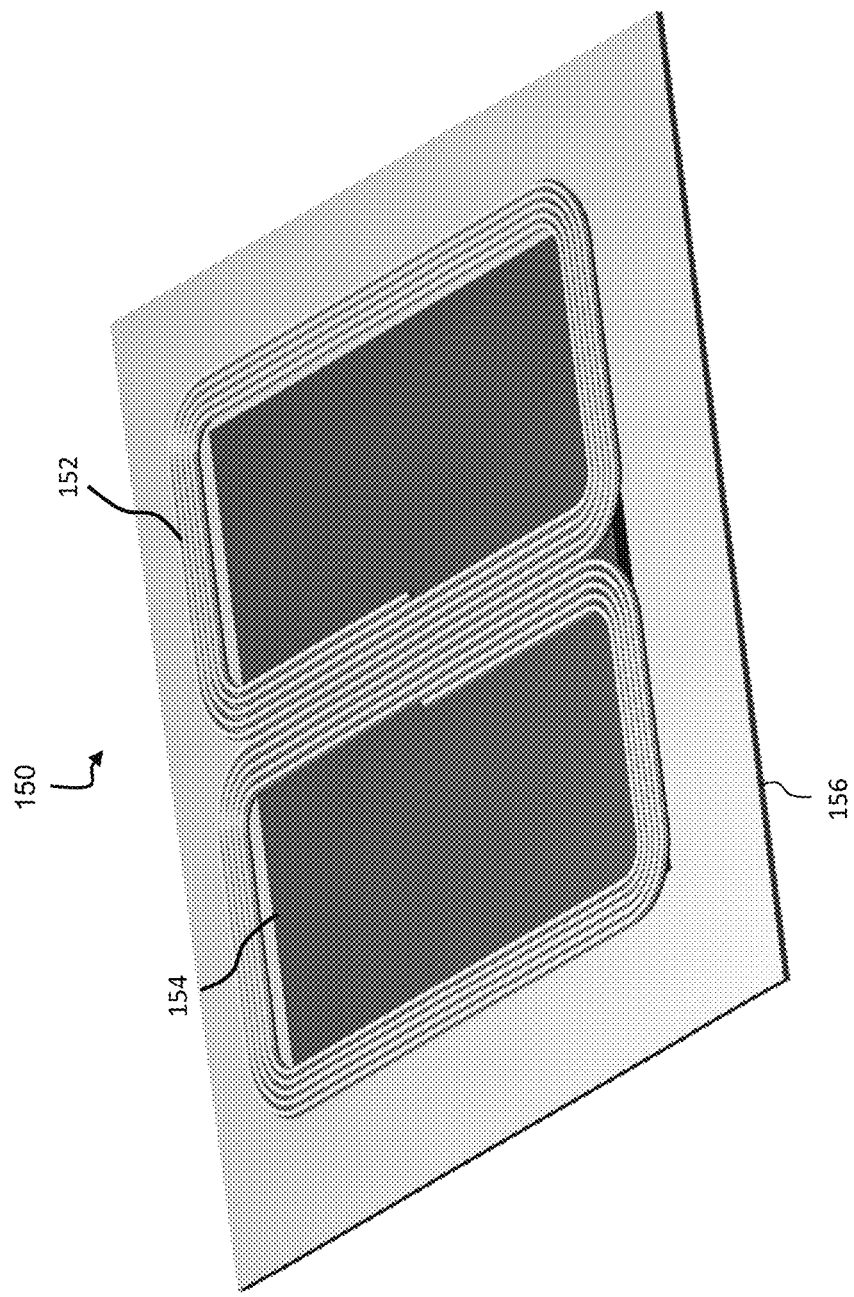
FIG. 1B is a schematic diagram of a resonator for wireless power transfer.

FIG. 1B is a schematic diagram showing a portion of a resonator 150 used for wireless power transfer. Resonator 150 includes a coil 152, a magnetic member 154, and a shield 156. Coil 152 includes one or more loops and can be connected to one or more capacitors and/or inductors, as well as other electrical components (not shown). Coil 152 is formed of one or more conductive materials, such as copper, silver, gold, and Litz wire. As an example, Litz wire can be used for operation at frequencies of lower than 1 MHz (e.g., 85 kHz). In certain embodiments, the coil 210 can be formed of a solid core wire, or one or more conducting layers (e.g., copper layers) formed on a printed circuit board (PCB). For example, solid core wire or conducting layers can be used at operation frequencies of 1 MHz or higher.

Magnetic member 154 is positioned between coil 152 and shield 154. That is, in FIG. 1A, coil 152 is positioned on one side of magnetic member 154 and shield 156 is positioned on the opposite side of magnetic member 156. In general, magnetic member 154 guides magnetic flux induced by current flowing in the loops of coil 152. The presence of magnetic member 154 can lead to an increase in the magnetic flux density generated by coil 152 in a region adjacent to coil 152 (i.e., in a plane above or below the plane of coil 152) when oscillating electrical currents circulate in coil 152, relative to the flux density in the absence of magnetic member 154.

In some embodiments, magnetic member 154 can include one or more magnetic elements formed from magnetic materials such as manganese-zinc (MnZn) and/or nickel-zinc (NiZn) ferrites. When member 154 is formed from multiple magnetic elements, the gaps between elements (not shown in FIG. 1B) can be filled with a dielectric material such as an adhesive.

While magnetic materials are generally available in small sizes, some applications for wireless power transfer utilize magnetic members with a large areal size. For example, a car battery charging application may use magnetic members of large areal size (e.g., 30 cm×30 cm) to transfer high power of 1 kW or more (e.g., 2 kW or more, 3 kW or more, 5 kW or more, 6 kW or more). Magnetic members featuring a single monolithic piece of material can be utilized when such a piece of material is available. However, it can be difficult and/or expensive to manufacture a monolithic piece of magnetic material such as MnZn or NiZn ferrites with a large areal size (e.g., 30 cm×30 cm) for high power transfer. Moreover, MnZn and NiZn ferrites can be brittle, and accordingly, large-area pieces of these materials can be highly susceptible to breakage.

To overcome such difficulties, ferrite materials can be manufactured in pieces of small areal size (e.g., 5 cm×5cm), and several such pieces can be joined together to form a larger combined magnetic member. The smaller magnetic elements can behave functionally in a collective manner very similar to a larger magnetic member when they are joined. In certain embodiments, the multiple magnetic elements can be contained in a holder made from thermally conducting and electrically insulating materials (e.g., plastic, Teflon®, aluminum oxide, aluminum nitride, etc.)

Shield 156, which generally corresponds to a sheet of electrically conductive material, is typically positioned in proximity to coil 152. Shield 156 can be formed from one or more conductive materials, which can be the same as, or different from, the conductive materials used to form coil 152. For example, shield 156 can be formed from a sheet of a material such as copper, silver, gold, iron, steel, nickel and/or aluminum. Shield 156 acts to shield coil 152 from loss-inducing objects (e.g., metallic objects). Further, in some embodiments, shield 156 can increase coupling of resonator 150 to another resonator by guiding magnetic field lines in the vicinity of the resonator. For example, energy loss from aberrant coupling to loss-inducing objects can be reduced by using shield 156 to guide magnetic field lines away from the loss-inducing objects.

FIGS. 2A-2C are schematic diagrams showing a wireless power transfer system 204 integrated into a vehicle 202. FIG. 2A shows a side view of vehicle 202 in the X-Z coordinate plane, FIG. 2B shows a top view of vehicle 202 in the X-Y coordinate plane, and FIG. 2C shows a front view of vehicle 202 in the Y-Z coordinate plane. For purposes of the following discussion, the X-axis corresponds to the "front-to-back" direction of the vehicle, the Y-axis corresponds to the "side-to-side" direction of the vehicle, and the Z-axis corresponds to the "top-to-bottom" direction of the vehicle.

For wireless power transfer in vehicle applications, source and device resonators can be relatively large to accommodate significant power transfer between the resonators. In some embodiments, for example, the source resonator can have a maximum dimension in the X-Y plane of 30 cm or more (e.g., 40 cm or more, 50 cm or more, 60 cm or more, 70 cm or more, 80 cm or more, 90 cm or more, 100 cm or more). In certain embodiments, the device resonator can have a maximum dimension in the X-Y plane of 20 cm or more (e.g., 30 cm or more, 40 cm or more, 50 cm or more, 60 cm or more, 70 cm or more, 80 cm or more, 90 cm or more, 100 cm or more). In some embodiments, a maximum dimension of the source resonator can be smaller than a maximum dimension of the device resonator by 10 cm or more (e.g., by 15 cm or more, by 20 cm or more, by 30 cm or more).

The source and device resonator can each have a variety of different cross-sectional shapes, including square, rectangular, circular, elliptical, and more generally, regular polygonal. In certain embodiments, the resonators can have different shapes. For example, the source resonator can have a square cross-sectional shape, while the device resonator can have a rectangular cross-sectional shape.

The resonators (e.g., source resonators, receiving resonators, repeater resonators) used in the wireless power transfer systems disclosed herein can have a resonant frequency $f=\omega/2\pi$, an intrinsic loss rate $\Gamma$, and a Q-factor $Q=\omega/(2\Gamma)$ (also referred as "intrinsic" Q-factor in this disclosure), where $\omega$ is the angular resonant frequency. The resonant frequency f of a source or receiver resonator is typically determined by the resonator's capacitance and inductance values.

In some embodiments, any one of a source, receiver, and/or repeater resonator can have a Q-factor that is a high Q-factor where Q>100 (e.g., Q>100, Q>200, Q>300, Q>500, Q>1000). For example, wireless power transfer systems can include a power source having one or more source resonators, and at least one of the source resonators can have a Q-factor of $Q_1$>100 (e.g., $Q_1$>100, $Q_1$>200, $Q_1$>300, $Q_1$>500, $Q_1$>1000). The wireless power transfer system can include a power receiver having one or more receiver resonators, and at least one of the receiver resonators can have a Q-factor of $Q_2$>100 (e.g., $Q_2$>100, $Q_2$>200, $Q_2$>300, $Q_2$>500, $Q_2$>1000). The system can include at least one repeater resonator having a Q-factor of $Q_3$>100 (e.g., $Q_3$>100, $Q_3$>200, $Q_3$>300, $Q_3$>500, $Q_3$>1000).

Utilizing high Q-factor resonators can lead to large energy coupling between some or all of the resonators in a wireless power transfer system. The high Q factors can lead to strong coupling between resonators such that the "coupling time" between the resonators is shorter than the "loss time" of the resonators. As a consequence, energy can be transferred efficiently between resonators at a faster rate than the energy loss rate due to losses (e.g., heating loss, radiative loss) of the resonators. In certain embodiments, a geometric mean, $\sqrt{Q_iQ_j}$ can be larger than 100 (e.g., $\sqrt{Q_iQ_j}$>200, $\sqrt{Q_iQ_j}$>300, $\sqrt{Q_iQ_j}$>500, $\sqrt{Q_iQ_j}$>1000) where i and j refer to a pair of source-receiver resonators, source-repeater resonators, or repeater-receiver resonators (e.g., i=1, j=2, or i=1, j=3, or i=2, j=3.) Additional aspects of high-Q resonators are described, for example, in U.S. Pat. No. 8,461,719, the entire contents of which are incorporated herein by reference.

Resonator Configurations

The extent of coupling and the efficiency of wireless power transfer between two resonators in a wireless power transfer system depends upon a wide variety of different structural features of the resonators. As such, different resonator configurations achieve different power transfer efficiencies and rates; and thus, different configurations are suitable for different types of power transfer applications. In the following sections, a number of different resonator configurations are shown, and the effect of different structural features on wireless power transfer performance will be discussed.

In some embodiments, a resonator coil can be offset from a conductive shield (e.g., an aluminum shield) to decrease losses and increase coupling to another resonator. FIGS. 3A-3B are schematic diagrams showing a source resonator coil 302 in proximity to a magnetic material 304, with a gap between magnetic material 304 and a conductive shield 306. In FIG. 3A, there is no gap between magnetic material 304 and shield 306. In FIG. 3B, there is a 40 mm gap 308 between magnetic material 304 and shield 306 (an aluminum shield). For a source resonator of dimensions 60 cm by 60 cm in the X-Y plane, and offset in the Z-direction from a device resonator of size 25 cm by 50 cm (not shown in FIGS. 3A-3B), with the offset from the device resonator defined by the set of coordinates (X,Y,Z)=(0,0,15) cm, a coupling rate k is measured to be approximately 0.077 for source resonator 302 shown in FIG. 3A, and approximately 0.083 for source resonator 302 shown in FIG. 3B.

In general, the thickness of magnetic material 304 in proximity to (or even attached to) a resonator can be varied to adjust the coupling k to another resonator. Table 1 summarizes measurements of coupling rate k for a wireless transfer system that includes a source resonator coil 402 of size 60 cm by 60 cm in the X-Y plane, as shown in FIG. 4, with an offset defined by the set of coordinates (X,Y,Z)=(10,10,150) cm from a device resonator coil 404 of size 25 cm by 50 cm in the X-Y plane. The source resonator coil and magnetic material are spaced from the aluminum shield by a gap of 40 mm, as in FIG. 3B discussed previously. Measurements of k are taken for a source resonator coil 402 having different thicknesses of magnetic material (e.g., "ferrite"), and under conditions when a vehicle chassis is present and not present.

TABLE 1

| Presence of Vehicle Chassis | Ferrite thickness | Coupling k |
|---|---|---|
| Chassis present | 5 mm | 0.060 |
| Chassis not present | 5 mm | 0.075 |
| Chassis not present | 12 mm | 0.083 |

In some embodiments, a device configured to receive power wirelessly can be house both a device resonator and device electronics an integrated manner. FIG. 5A is a schematic diagram showing an embodiment of a device configured to wirelessly receive power in which a device resonator coil 502, a magnetic material 504, and a conductive (e.g., aluminum) shield 506 are stacked onto one another. FIG. 5B shows a schematic diagram of another embodiment of a device configured to wirelessly receive power. The device of FIG. 5B has a "top-hat" configuration, in which a center portion of magnetic material 508 is stepped in the Z-direction to form an empty region between magnetic material 508 and shield 506. Device electronics 510 are positioned within the empty region and coil 502 is wound around the stepped edges of magnetic material 508. By enclosing device electronics 510 within the device resonator as shown in FIG. 5B, the compactness of the device can be significantly increased.

The coupling k between source and receiver resonators in a vehicle wireless power transfer system depends in part on the presence and nature of the vehicle chassis in proximity to the receiver resonator. FIGS. 6A and 6B are plots that show measurements of the coupling k between a source resonator and a receiver resonator 604 as a function of relative displacement between the centers of the resonators in both the X- and Z-directions. The receiver resonator is similar to the resonator shown in FIG. 5A and the source resonator is similar to the resonator shown in FIG. 3B. The plot in FIG. 6A shows measurements of the coupling k in the absence of a vehicle chassis, while the plot in FIG. 6B shows measurements in the presence of an aluminum vehicle chassis. It is evident from FIGS. 6A and 6B that the vehicle chassis reduces the value of the coupling k by approximately 20%.

FIGS. 7A and 7B are plots showing figure-of-merit ($U_0$) measurements as a function of relative displacement between the centers of a source resonator 602 and receiver resonator 604, in the X- and Z-directions. The receiver resonator is similar to the resonator shown in FIG. 5A and the source resonator is similar to the resonator shown in FIG. 3B. The plot in FIG. 7A shows measurements of $U_0$ in the absence of a vehicle chassis, while the plot in FIG. 7B shows measurements in the presence of an aluminum vehicle chassis. In FIG. 7A, the quality factor of the source resonator is approximately 1000 while the quality factor of the receiver resonator is approximately 380. In FIG. 7B, the quality factor of the source resonator is approximately 1000, while the quality factor of the receiver resonator is approximately 460.

FIGS. 8A and 8B are plots showing measurements of the coupling k as a function of relative displacement between the centers of a source resonator 602 and a receiver resonator 604 in the Y- and Z-directions. The receiver resonator is similar to the resonator shown in FIG. 5A and the source resonator is similar to the resonator shown in FIG. 3B. The plot in FIG. 8A shows measurements of k in the absence of a vehicle chassis, while the plot in FIG. 8B shows measurements in the presence of an aluminum vehicle chassis. It is evident that the vehicle chassis reduces the coupling k by approximately 20%.

FIGS. 9A and 9B are plots showing figure-of-merit ($U_0$) measurements as a function of relative displacement between the centers of a source resonator 602 and a receiver resonator 604 in the Y- and Z-directions. The receiver resonator is similar to the resonator shown in FIG. 5A and the source resonator is similar to the resonator shown in FIG. 3B. The plot in FIG. 9A shows measurements of $U_0$ in the absence of a vehicle chassis, while the plot in FIG. 9B shows measurements in the presence of an aluminum vehicle chassis.

FIGS. 10A and 10B are plots showing measurements of the coupling k as a function of relative displacement between centers of a source resonator 602 and receiver resonator 604 in the X- and Z-directions. The receiver resonator is similar to the resonator shown in FIG. 5B (i.e., a "top hat" configuration) and the source resonator is similar to the resonator shown in FIG. 3B. The plot in FIG. 10A shows measurements of k in the absence of a vehicle chassis, while the plot in FIG. 10B shows measurements in the presence of an aluminum vehicle chassis. The measured values of k in FIGS. 10A and 10B do not differ substantially from the measured values shown in the plots of FIGS. 6A and 6B, respectively.

FIGS. 11A and 11B are plots showing figure-of-merit ($U_0$) measurements as a function of relative displacement between centers of a source resonator 602 and receiver resonator 604 in the X- and Z-directions. The receiver resonator is similar to the resonator shown in FIG. 5B (i.e., a "top hat" configuration) and the source resonator is similar to the resonator shown in FIG. 3B. The plot in FIG. 11A shows measurements of $U_0$ in the absence of a vehicle chassis, while the plot in FIG. 11B shows measurements in the presence of an aluminum vehicle chassis. The quality factor Q for the source resonator is 1000 while the quality factor Q for the receiver resonator is 450.

FIGS. 12A and 12B are plots showing measurements of the coupling k as a function of relative displacement between centers of a source resonator 602 and receiver resonator 604 in the Y- and Z-directions. The receiver resonator is similar to the resonator shown in FIG. 5B (i.e., a "top hat" configuration) and the source resonator is similar to the resonator shown in FIG. 3B. The plot in FIG. 12A shows measurements of k in the absence of a vehicle chassis, while the plot in FIG. 12B shows measurements in the presence of an aluminum vehicle chassis.

Figures 13A, 13B:
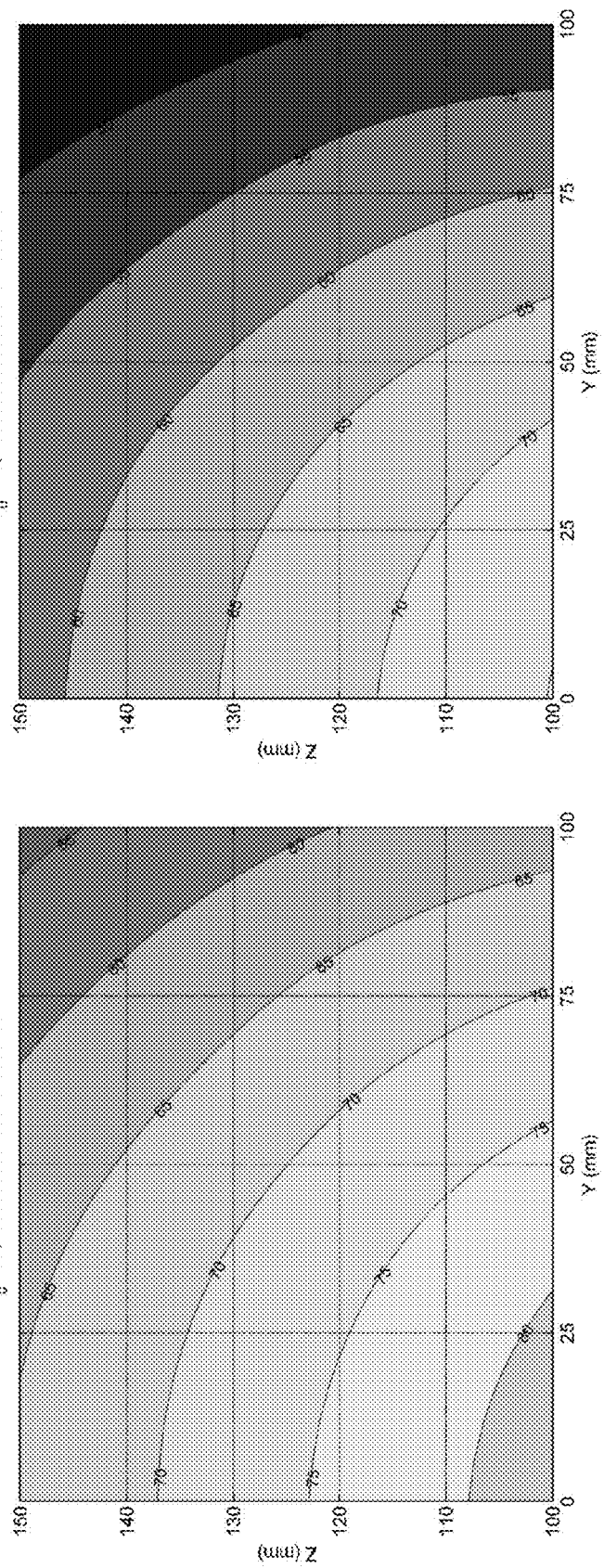
FIGS. 13A and 13B are plots showing figure-of-merit as a function of relative displacement between source and receiver resonators.

FIGS. 13A and 13B are plots showing figure-of-merit ($U_0$) measurements as a function of relative displacement between centers of a source resonator 602 and receiver resonator 604 in the Y- and Z-directions. The receiver resonator is similar to the resonator shown in FIG. 5B (i.e., a "top hat" configuration) and the source resonator is similar to the resonator shown in FIG. 3B. The plot in FIG. 13A shows measurements of $U_0$ in the absence of a vehicle chassis, while the plot in FIG. 13B shows measurements in the presence of an aluminum vehicle chassis. The quality factor Q for the source resonator is 1000 while the quality factor Q for the receiver resonator is 450.

FIGS. 14A and 14B are plots showing measurements of the coupling k as a function of relative displacement between centers of a source resonator 602 and receiver resonator 604 in the X- and Z-directions. The receiver resonator is similar to the resonator shown in FIG. 5B (i.e., a "top hat" configuration) and the source resonator is similar to the resonator shown in FIG. 3B. The plot in FIG. 14A shows measurements of k in the presence of an aluminum vehicle chassis, while the plot in FIG. 14B shows measurements of k in the presence of a steel (e.g., ST1008 steel) vehicle chassis. It is evident from FIGS. 14A and 14B that replacing the aluminum chassis with a steel chassis does not have a significant effect on the coupling k.

FIGS. 15A and 15B are plots showing measurements of the quality factor $Q_0$ as a function of relative displacement between centers of a source resonator 602 and a receiver resonator 604 in the X- and Z-directions. The receiver resonator is similar to the resonator shown in FIG. 5B (i.e., a "top hat" configuration) and the source resonator is similar to the resonator shown in FIG. 3B. The plot in FIG. 15A shows source resonator $Q_{0,src}$ measurements in the presence of a steel vehicle chassis. The plot in FIG. 15B shows receiver ("device") resonator $Q_{0,dev}$ measurements in the presence of a steel vehicle chassis. Both source resonator $Q_{0,src}$ and receiver resonator $Q_{0,dev}$ are significantly reduced compared to measured values in the presence of an aluminum vehicle chassis or no vehicle chassis.

FIGS. 16A and 16B are plots showing figure-of-merit ($U_0$) measurements as a function of relative displacement between centers of a source resonator 602 and a receiver resonator 604 in the X- and Z-directions. The receiver resonator is similar to the resonator shown in FIG. 5B (i.e., a "top hat" configuration) and the source resonator is similar to the resonator shown in FIG. 3B. The plot in FIG. 16A shows $U_0$ measurements in the presence of an aluminum vehicle chassis, while the plot in FIG. 16B shows $U_0$ measurements in the presence of a steel ("ST1008") vehicle chassis.

Figure 60B:
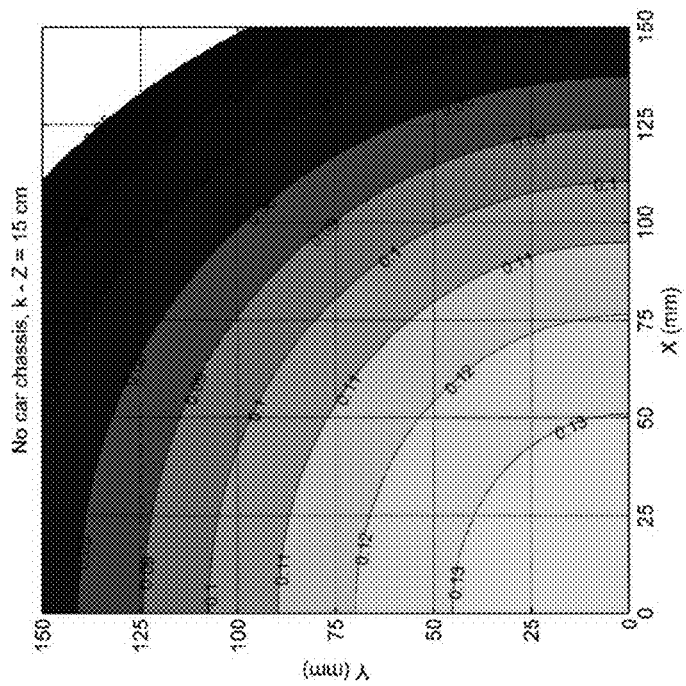
FIGS. 60A and 60B are plots showing measurements of coupling k between a source resonator and a receiver resonator as a function of relative displacement of the resonators.
Figure 60A:
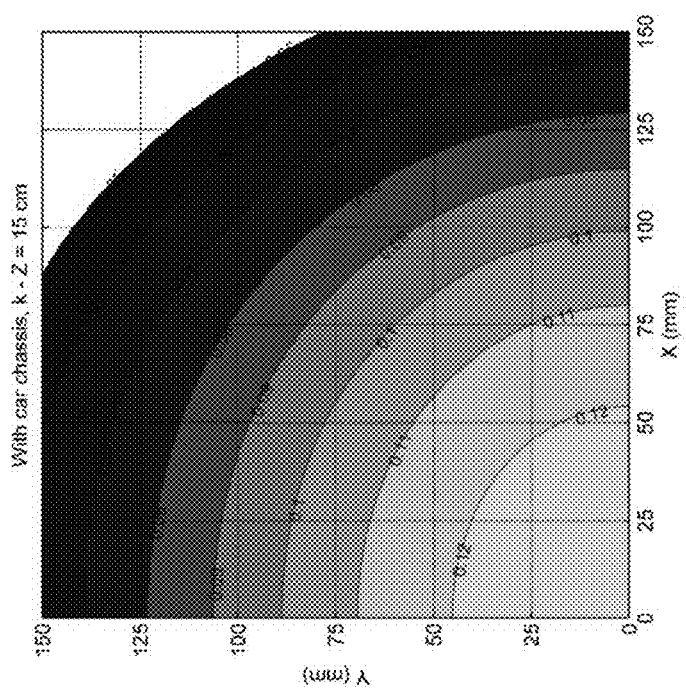

As is evident from the foregoing discussion, the coupling k between source and device resonators can be significantly affected by the presence of a car chassis. FIGS. 60A and 60B are plots showing measured values of the coupling k between source and device resonators that are similar to those shown in FIGS. 44 and 46, respectively, as a function of relative displacements between the centers of the resonators in the X- and Y-directions. The source and device resonators are spaced from one another by 15 cm in the Z-direction. The plot in FIG. 60A shows measurements of k in the presence of a vehicle chassis, while the plot in FIG. 60B shows measurements of k with no vehicle chassis present. The presence of the vehicle chassis reduces the coupling k by between 10% and 15%. Allowing for maximum offsets of 10 cm in both the X- and Y-directions (so that the maximum offset between the resonators corresponds to the coordinate set (X,Y,Z)=(10,10,15) cm), the system should be well matched for a minimum coupling k=0.07.

Figure 61B:
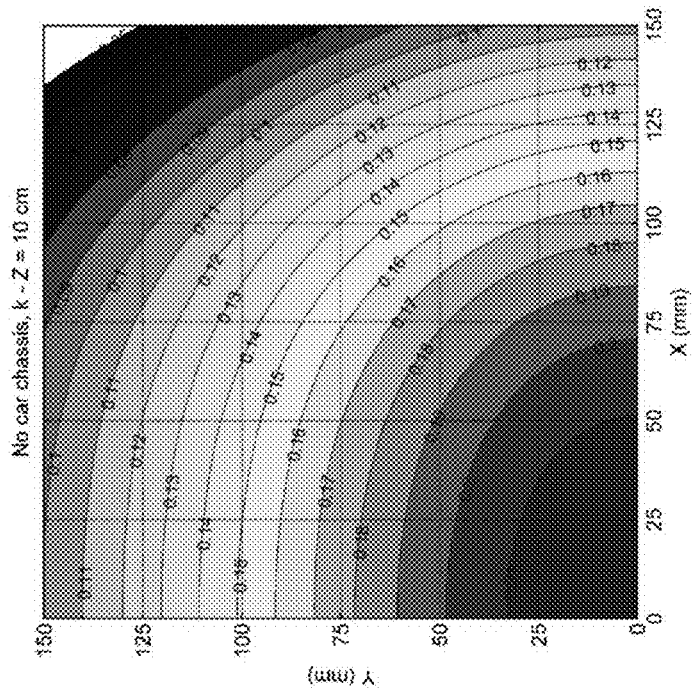
FIGS. 61A and 61B are plots showing measurements of coupling k between a source resonator and a receiver resonator as a function of relative displacement of the resonators.
Figure 61A:
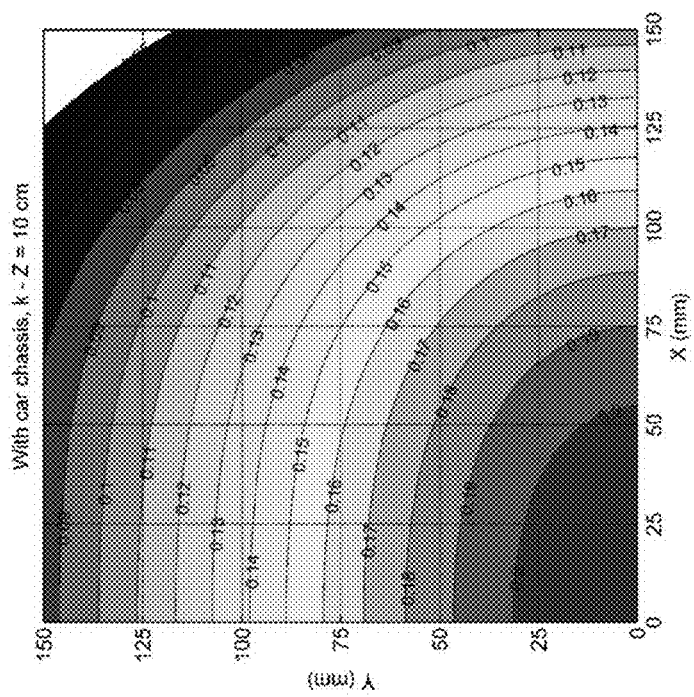

FIGS. 61A and 61B are plots showing measured values of the coupling k between the same source and device resonators as in FIGS. 60A and 60B as a function of relative displacements between the centers of the resonators in the X- and Y-directions. The source and device resonators are spaced from one another by 10 cm in the Z-direction. The plot in FIG. 61A shows measurements of k in the presence of a vehicle chassis, while the plot in FIG. 61B shows measurements of k with no vehicle chassis present. The presence of the vehicle chassis reduces the coupling k by between 1% and 8%.

Figure 62:
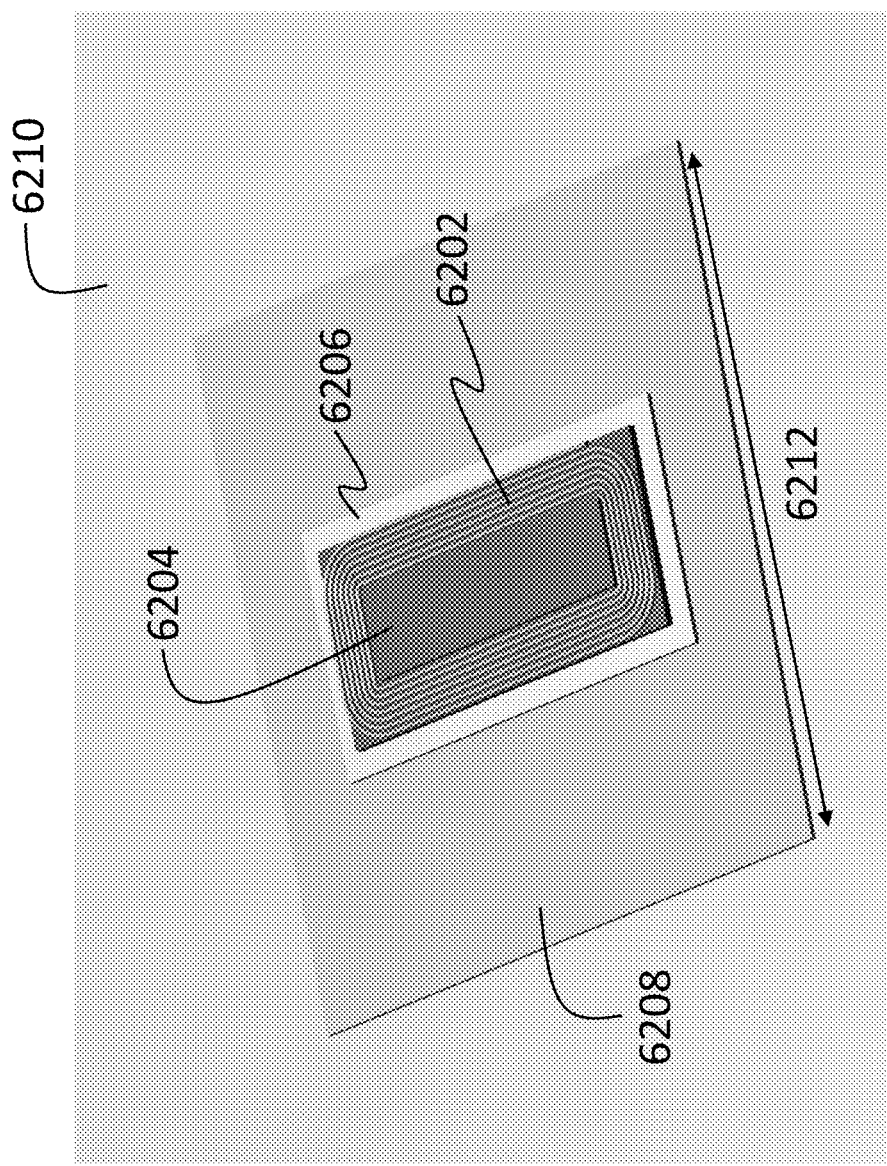
FIG. 62 is a schematic diagram of a receiver resonator.

FIG. 62 shows a schematic diagram of a receiver resonator that includes a resonator coil 6202, a magnetic member 6204, a first conductive shield 6206, and a second conductive shield 6208. The receiver resonator is positioned in proximity to a vehicle chassis 6210 formed of steel (e.g., ST1008). Second conductive shield 6208 is formed of aluminum, and is square in shape with a side length 6212.

Figure 63:
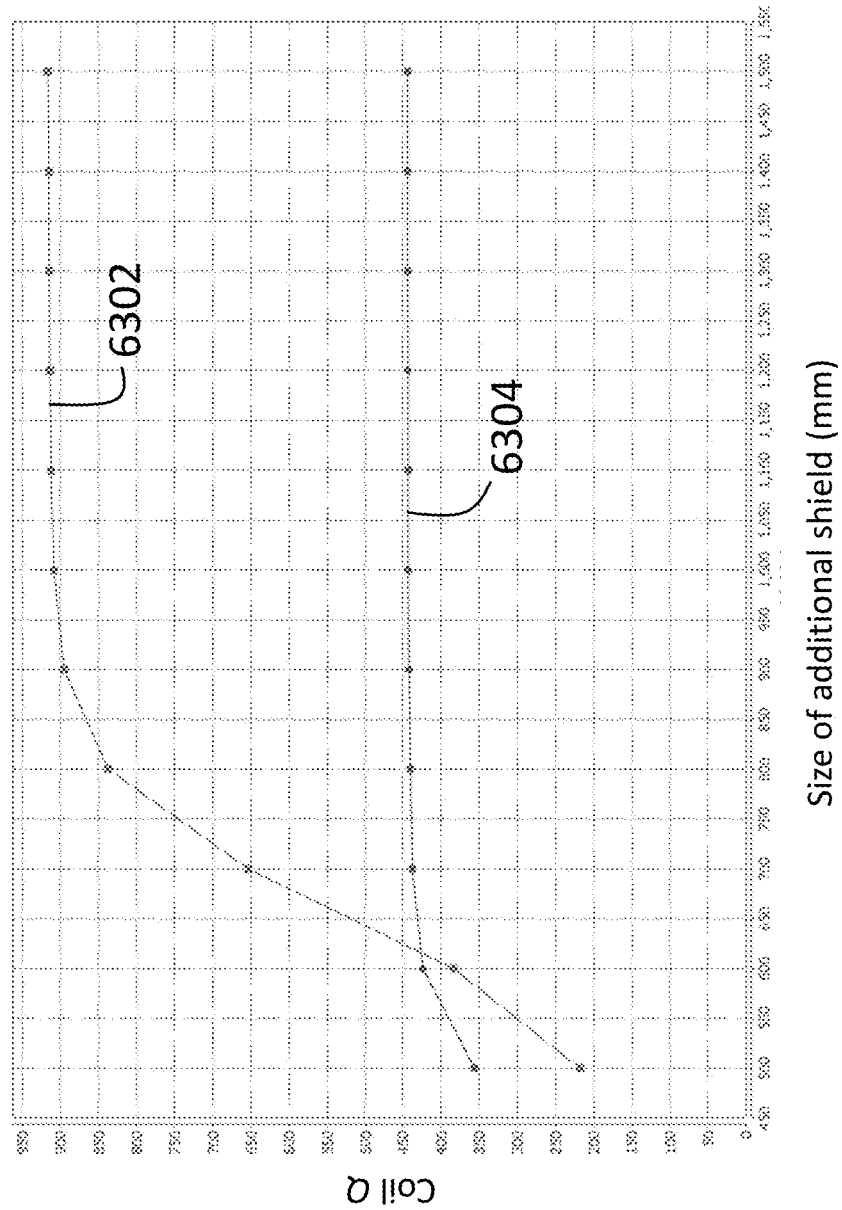
FIG. 63 is a plot of Q-factor for source and receiver resonators as a function of a side length of a shield.

To investigate the effect of the size of second shield 6208 on the mitigation of coupling losses due to chassis 6210, the side length 6212 of second shield 6208 is varied from 50 cm to 150 cm, and values of the Q-factor for both source and receiver resonators in a wireless power transfer system are measured. The source and receiver resonators are similar to those shown in FIGS. 44 and 46, respectively. FIG. 63 is a plot showing measured Q-factor values for the source resonator (curve 6302) and receiver resonator (curve 6304) as a function of the side length 6212 of second shield 6208. The source and receiver resonators are displaced from one another by 10 cm in both the X- and Y-directions, and by 10 cm in the Z-direction, a relative offset at which the effect of the vehicle chassis on the source resonator is greatest. As is evident from FIG. 63, the side length 6212 of second shield 6208 is preferably 80 cm or larger to mitigate the lossy effect of the steel vehicle chassis 6210.

Impedance Matching Networks and Electronic Components

Various impedance matching networks and configurations can be used in the wireless power transfer systems disclosed herein to ensure that power is transferred efficiently between source and receiver resonators. Various features and aspects of impedance matching networks are discussed, for example, in U.S. Patent Application Publication No. 2012/0242225, the entire contents of which are incorporated herein by reference.

FIG. 17A is a schematic diagram showing an example of an impedance matching network for a source resonator that implements a "balanced LCL" matching scheme. FIG. 17B is a schematic diagram showing an example of an impedance matching network for a receiver resonator that implements a "balanced series" matching scheme. These impedance matching networks can be used, for example, at power levels greater than 3 kW, and even greater than 7 kW.

In some embodiments, a wireless power transfer system can include a source resonator with a quality factor $Q_{0,src}$ of approximately 1000 and a receiver resonator with a quality factor $Q_{0,dev}$ of approximately 450. The maximum coupling k value for this system can be approximately 0.12. In the X-Z plane, the minimum coupling k value for a source and receiver resonator of a wireless power transfer system (referring to FIGS. 6A-6B, 7A-7B, 10A-10B, 11A-11B, and 14A-14B) can be approximately 0.08. The minimum coupling k value for a source and receiver resonator of a wireless power transfer system in the Y-Z plane (referring to FIGS. 8A-8B, 9A-9B, 12A-12B, and 13A-13B) can be approximately 0.06.

In certain embodiments, the impedance matching point of the receiver resonator may be chosen such that the maximum power dissipated in the device, including the impedance matching network and diodes, is less than 300 W (e.g., less than 275 W, less than 250 W, less than 225 W, less than 200 W).

Impedance matching networks can generally include a variety of different electronic components. For example, certain impedance matching networks can include ceramic capacitors (for example, capacitors from 800 E series, available from American Technical Ceramics Corp., Huntington Station, N.Y.) rated for approximately 2000 V (peak voltage) and with quality factors of approximately $Q_{cap}$=2500. In certain embodiments, the capacitor voltage rating can determine the target inductances of the resonator coils. For example, the above capacitor rating can correspond to a source resonator coil of inductance L=40 µH and capacitance values of $C_{1a}$=$C_{1b}$=$C_2$=263 nF, and to a receiver resonator coil of inductance L=100 µH and capacitance values $C_{1a}$=$C_{1b}$=70.1 nF. Other types of less expensive capacitors can also be used in certain embodiments, including film capacitors for example.

Figure 18B:
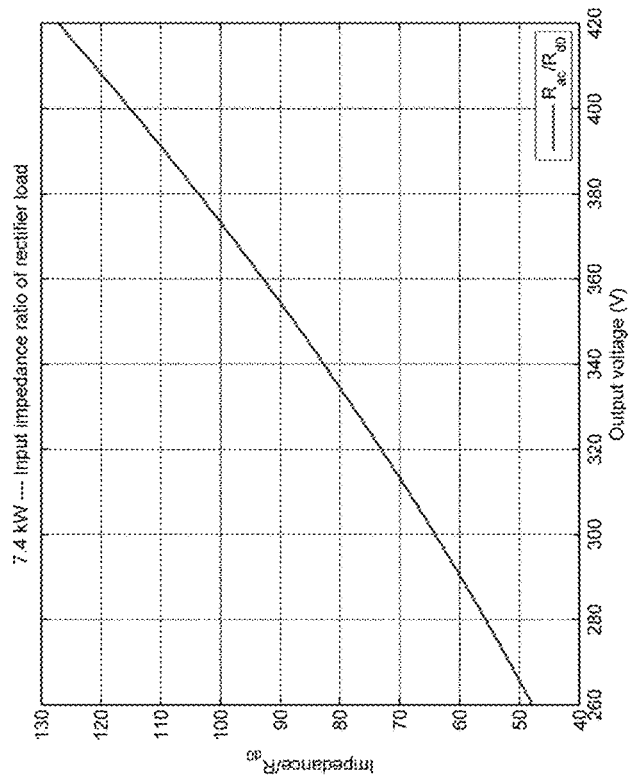
FIGS. 18A and 18B are plots of device-side load impedance as a function of output voltage.
Figure 18A:
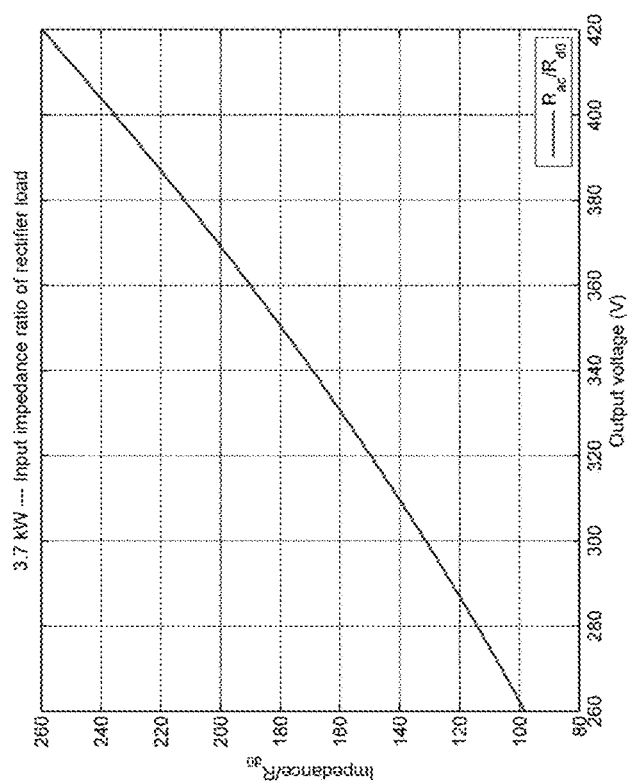

FIGS. 18A and 18B are plots of measured device-side load impedance as a function of output voltage for a device with a receiver resonator as shown in FIG. 5B, in the presence of an aluminum vehicle chassis. FIG. 18A shows measured device-side load impedance for a power level of 3.7 kW, while FIG. 18B shows measured device-side load impedance for a power level of 7.4 kW.

Figure 19B:
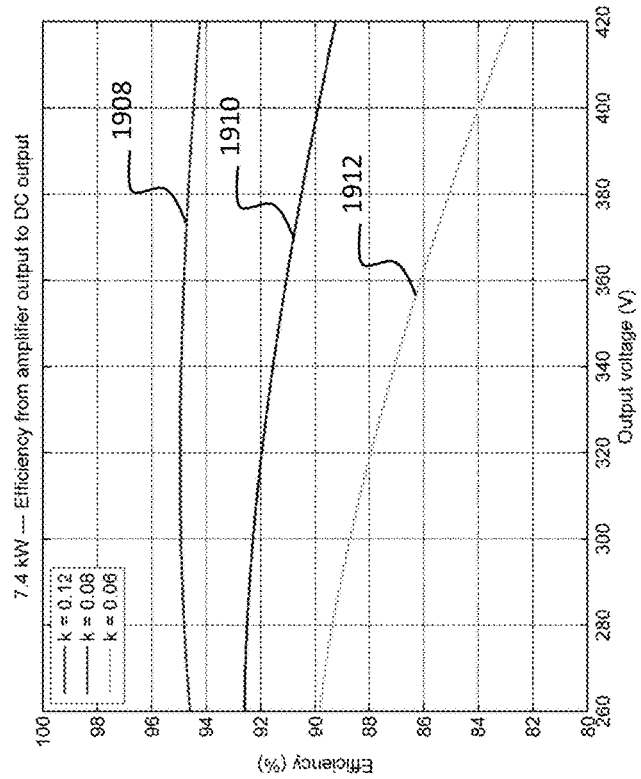
FIGS. 19A and 19B are plots of amplifier-to-battery efficiency as a function of output voltage.
Figure 19A:
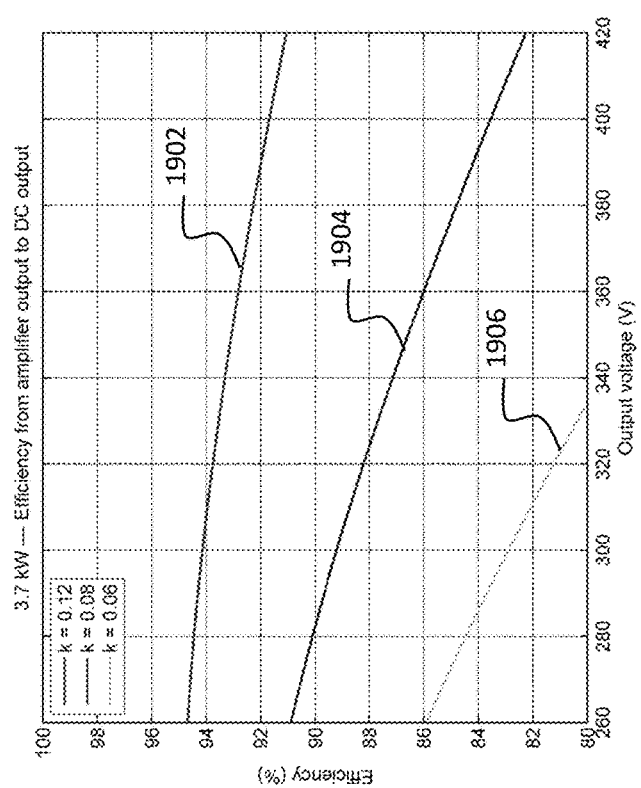

FIGS. 19A and 19B are plots of amplifier-to-battery efficiency as a function of output voltage for a device with a receiver resonator as shown in FIG. 5B, in the presence of an aluminum vehicle chassis. FIG. 19A shows amplifier-to-battery efficiency for coupling k values of 0.12 (curve 1902), 0.08 (curve 1904), and 0.06 (curve 1906) for a power level of 3.7 kW. FIG. 19B shows amplifier-to-battery efficiency for coupling k values of 0.12 (curve 1908), 0.08 (curve 1910), and 0.06 (curve 1912) for a power level of 7.4 kW. In some embodiments, efficiency values at the lower of the coupling k values can be improved by matching to a lower figure-of-merit $U_d$.

Figure 20B:
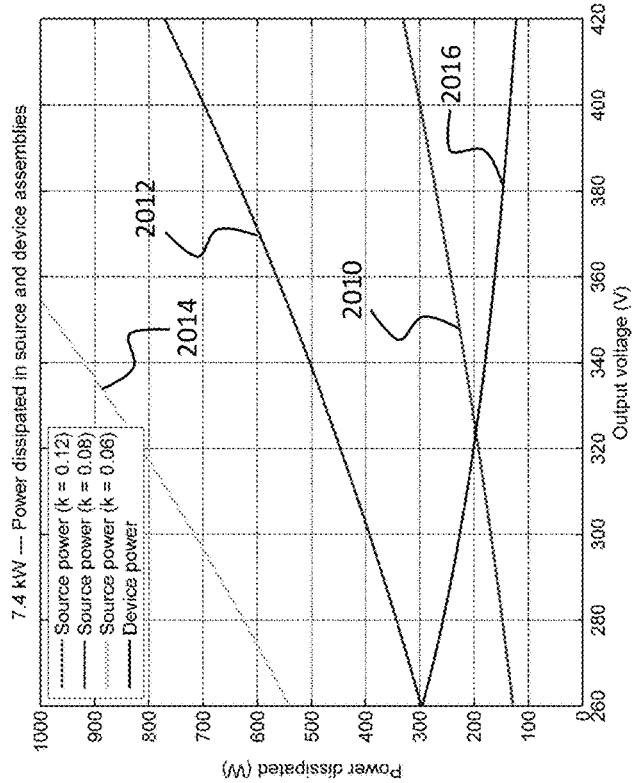
FIGS. 20A and 20B are plots of power dissipated in a source and a device as a function of output voltage.
Figure 20A:
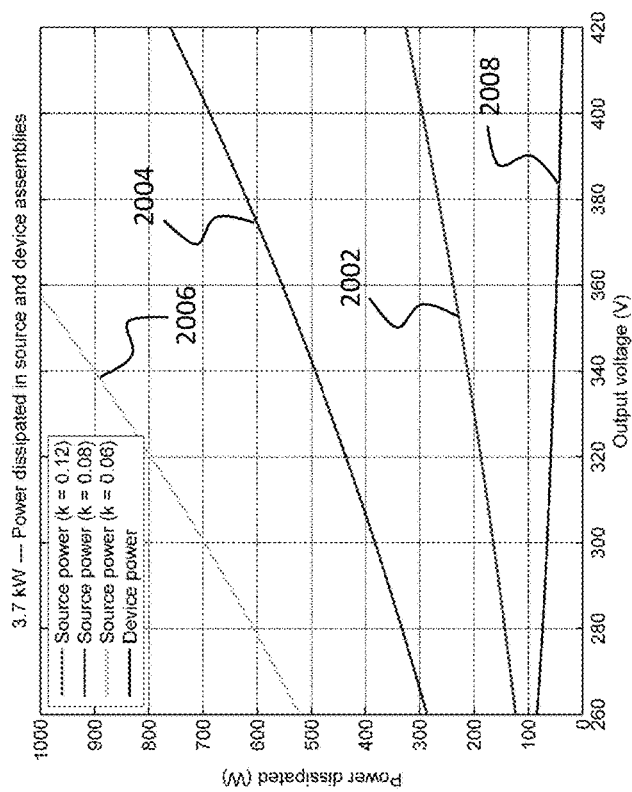

FIGS. 20A and 20B are plots of power dissipated in a source (with a resonator corresponding to the source resonator shown in FIG. 3B) and a device (with a receiver resonator corresponding to the receiver resonator shown in FIG. 5B) as a function of output voltage, in the presence of an aluminum vehicle chassis. FIG. 20A shows power dissipated in the source for coupling k values of 0.12 (curve 2002), 0.08 (curve 2004), 0.06 (curve 2006), and in the device (curve 2008) at a power level of 3.7 kW. FIG. 20B shows power dissipated in the source for coupling k values of 0.12 (curve 2010), 0.08 (curve 2012), 0.06 (curve 2014) and in the device (curve 2016) at a power level of 7.4 kW.

Figures 21A, 21B:
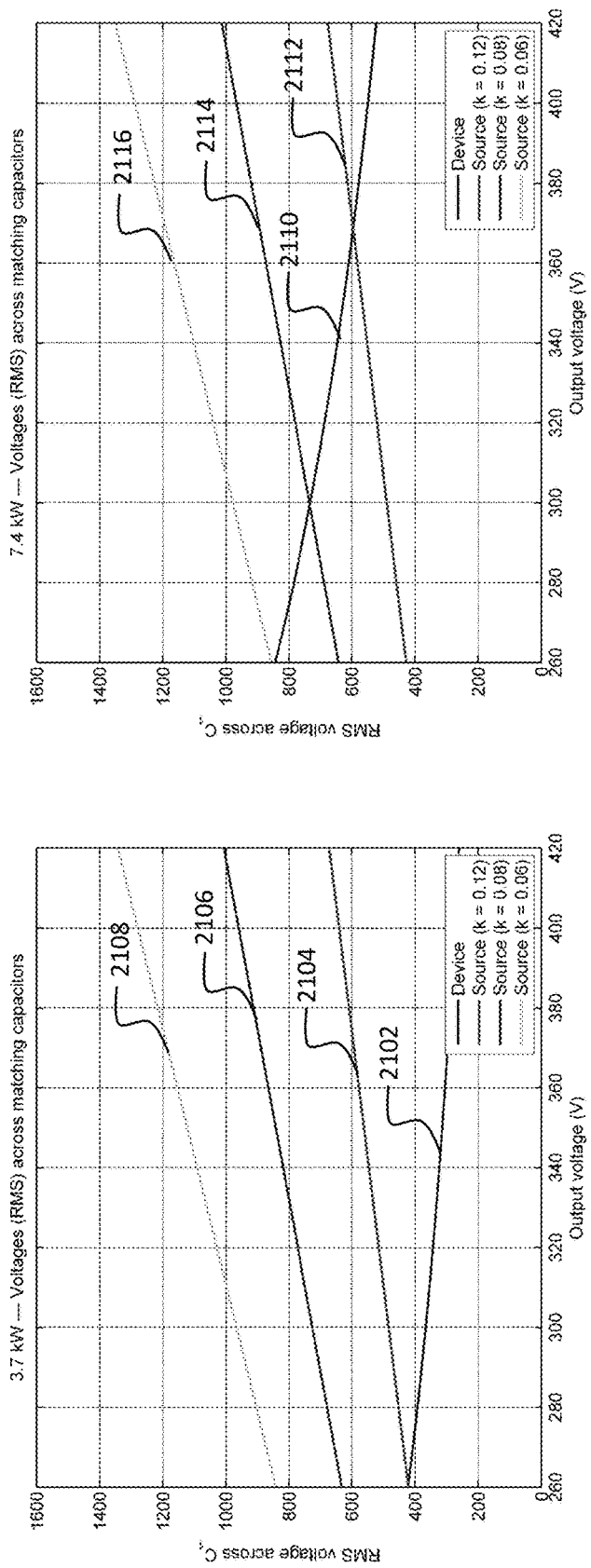
FIGS. 21A and 21B are plots of voltage measured across one or more capacitors in an impedance matching network.

FIGS. 21A and 21B are plots of the voltage ($V_{rms}$) measured across one or more capacitors in an impedance matching network for a system that includes a source (with a resonator corresponding to the source resonator shown in FIG. 3B) and a device (with a receiver resonator corresponding to the receiver resonator shown in FIG. 5B) as a function of output voltage, in the presence of an aluminum vehicle chassis. Voltages in FIGS. 21A and 21B are measured across capacitors $C_{1a}$ and $C_{1b}$ shown in FIGS. 17A and 17B. FIG. 21A shows the RMS voltage across capacitor $C_1$ for a source with coupling k values of 0.12 (curve 2104), 0.08 (curve 2106), and 0.06 (curve 2108), and for a device (curve 2102) at a power level of 3.7 kW. FIG. 21B shows the RMS voltage across capacitor $C_1$ for a source with coupling k values of 0.12 (curve 2112), 0.08 (curve 2114), and 0.06 (curve 2116), and for a device (curve 2110) at a power level of 7.4 kW.

Figure 22B:
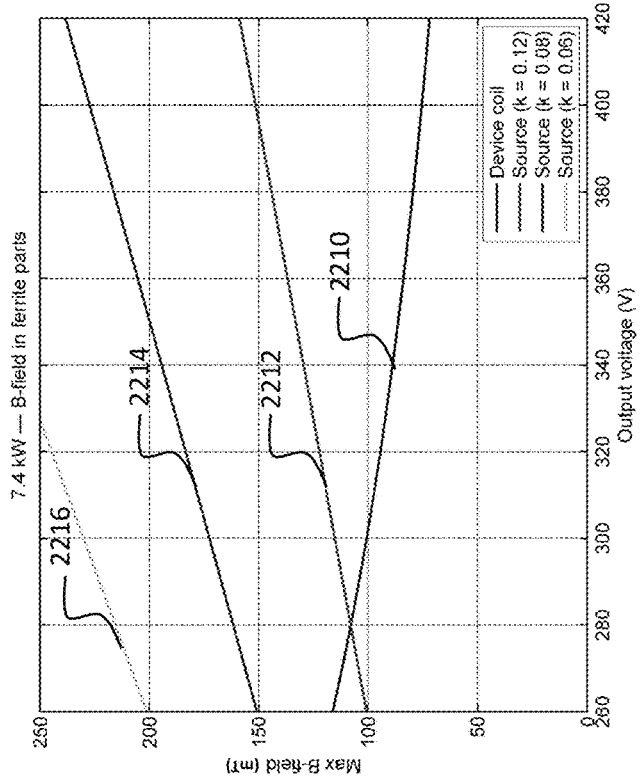
FIGS. 22A and 22B are plots of the magnetic field amplitude in a magnetic member of a source resonator.
Figure 22A:
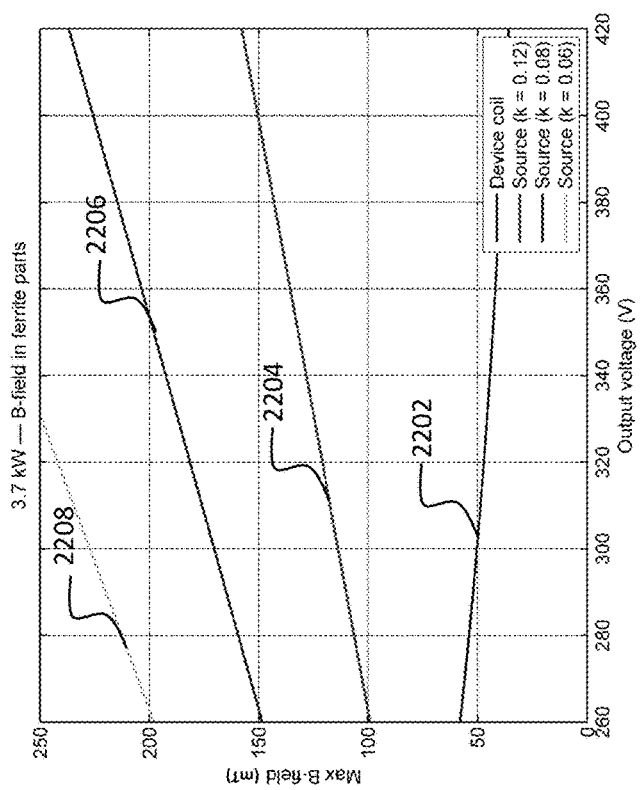

FIGS. 22A and 22B are plots of the magnetic field (mT) measured in the magnetic member attached to the resonators in a wireless power transfer system (i.e., attached to a source resonator such as the resonator shown in FIG. 3B and attached to a receiver resonator as shown in FIG. 5B), as a function of output voltage, in the presence of an aluminum vehicle chassis. For measurements shown in FIGS. 22A and 22B, the magnetic member is formed from 5 mm ferrite pieces. FIG. 22A shows the magnetic field in the magnetic member of a source resonator for coupling k values of 0.12 (curve 2204), 0.08 (curve 2206), and 0.06 (curve 2208), and in a receiver resonator (curve 2202) at a power level of 3.7 kW. FIG. 22BB shows the magnetic field in the magnetic member of a source resonator for coupling k values of 0.12 (curve 2212), 0.08 (curve 2214), and 0.06 (curve 2216), and in a receiver resonator (curve 2210) at a power level of 7.4 kW.

Figure 23:
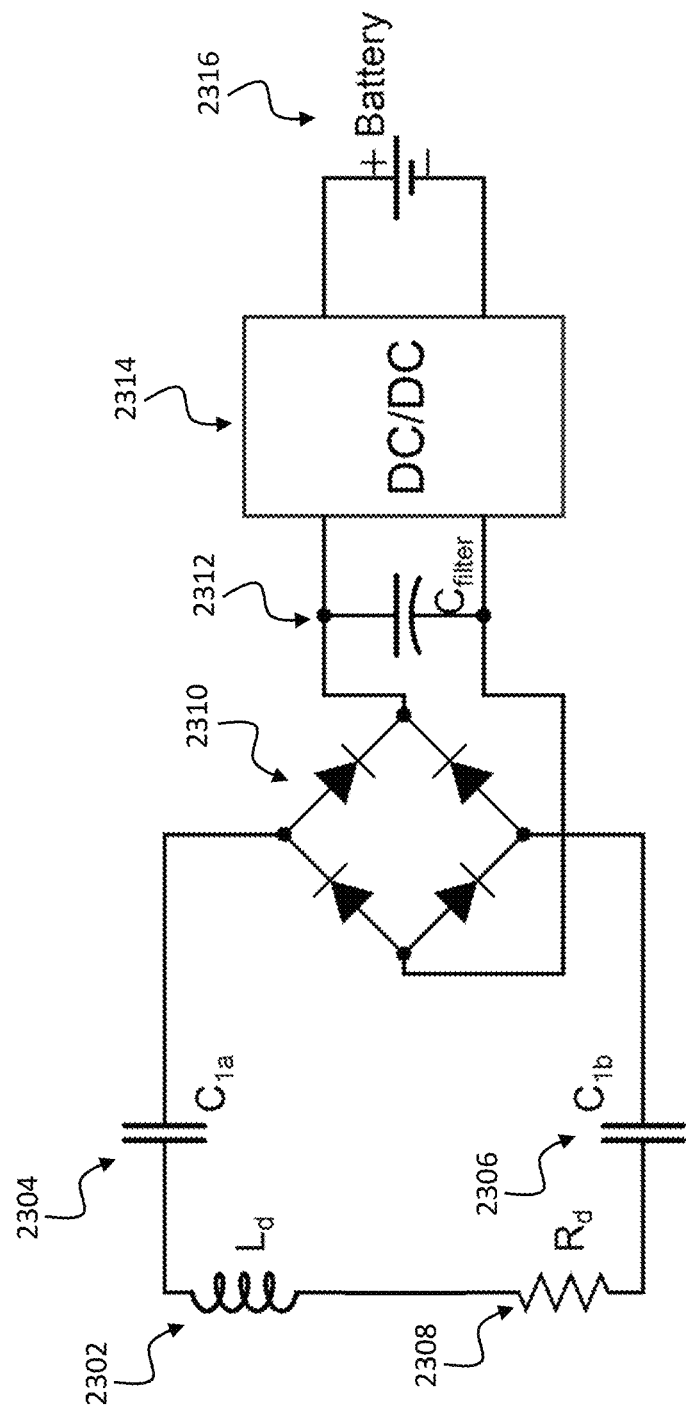
FIG. 23 is a schematic circuit diagram of an embodiment of device electronics.

FIG. 23 shows a schematic circuit diagram of an embodiment of device electronics 110. The device electronics include a device resonator coil 2302 with series tuning, represented by series capacitors 2304 and 2306. The device electronics can include a half-wave or full-wave rectification stage 2310, one or more filters 2312, and/or a DC-to-DC converter 2314. The DC-DC converter can be used to tune the load impedance that the device sees to achieve an improved and/or optimal impedance matching value. Load 112 can correspond to a variety of electronic devices such as, for example, a battery 2316. In some embodiments, DC-DC converter 2314 can be a boost converter to minimize the voltage across capacitors $C_{1a}$, and $C_{1b}$. In certain embodiments, DC-DC converter 2314 can be a buck converter to reduce losses in the rectification diodes.

Figures 24A, 24B:
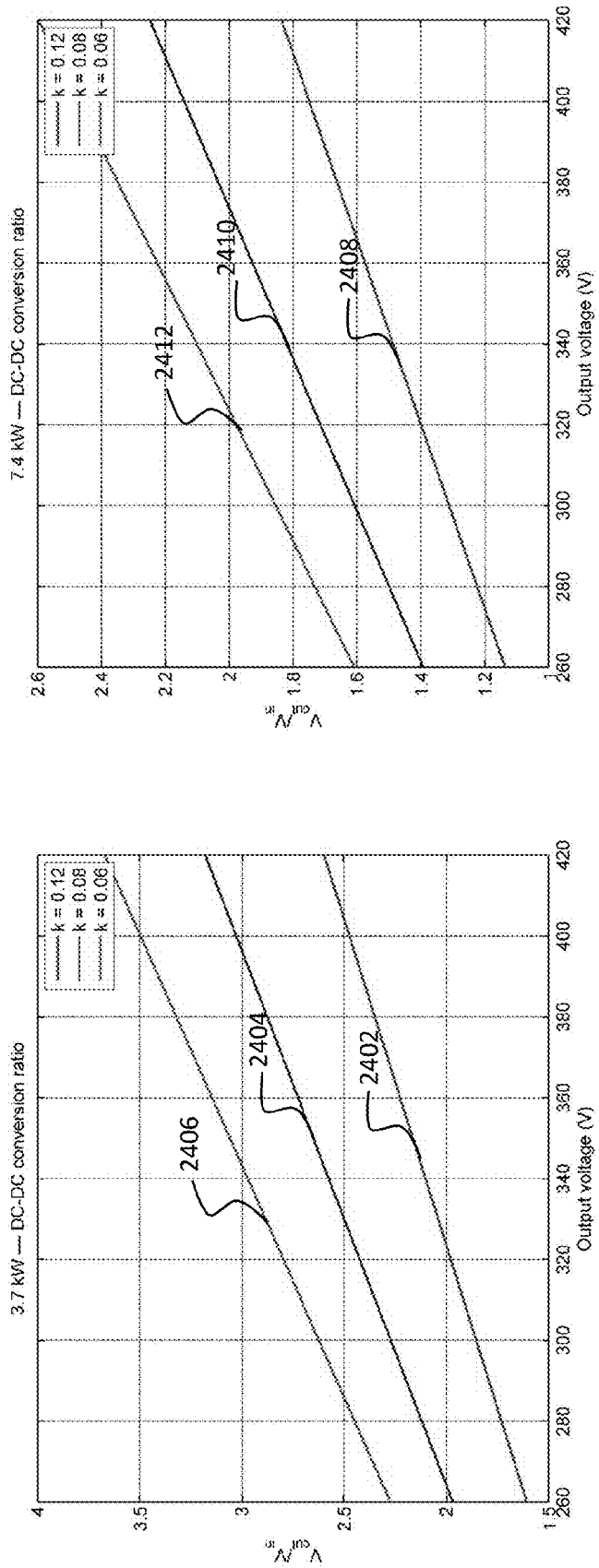
FIGS. 24A and 24B are plots of a DC-DC boost conversion ratio as a function of output voltage.

FIGS. 24A and 24B are plots showing the DC-DC boost conversion ratio for a device with a receiver resonator (such as the receiver resonator shown in FIG. 5B) as a function of output voltage, in the presence of an aluminum vehicle chassis. FIG. 24A shows the DC-DC conversion ratio for a device with a receiver resonator having coupling k values of 0.12 (curve 2402), 0.08 (curve 2404), and 0.06 (curve 2406) at a power level of 3.7 kW. FIG. 24B shows the DC-DC conversion ratio for a device with a receiver resonator having coupling k values of 0.12 (curve 2402), 0.08 (curve 2404), and 0.06 (curve 2406) at a power level of 7.4 kW. In some embodiments, a DC-DC boost conversion ratio of approximately 4:1 can be optimal for operation at both 3.7 kW and 7.4 kW for various positional offsets between the source and device resonators as well as output voltages.

Figures 25A, 25B:
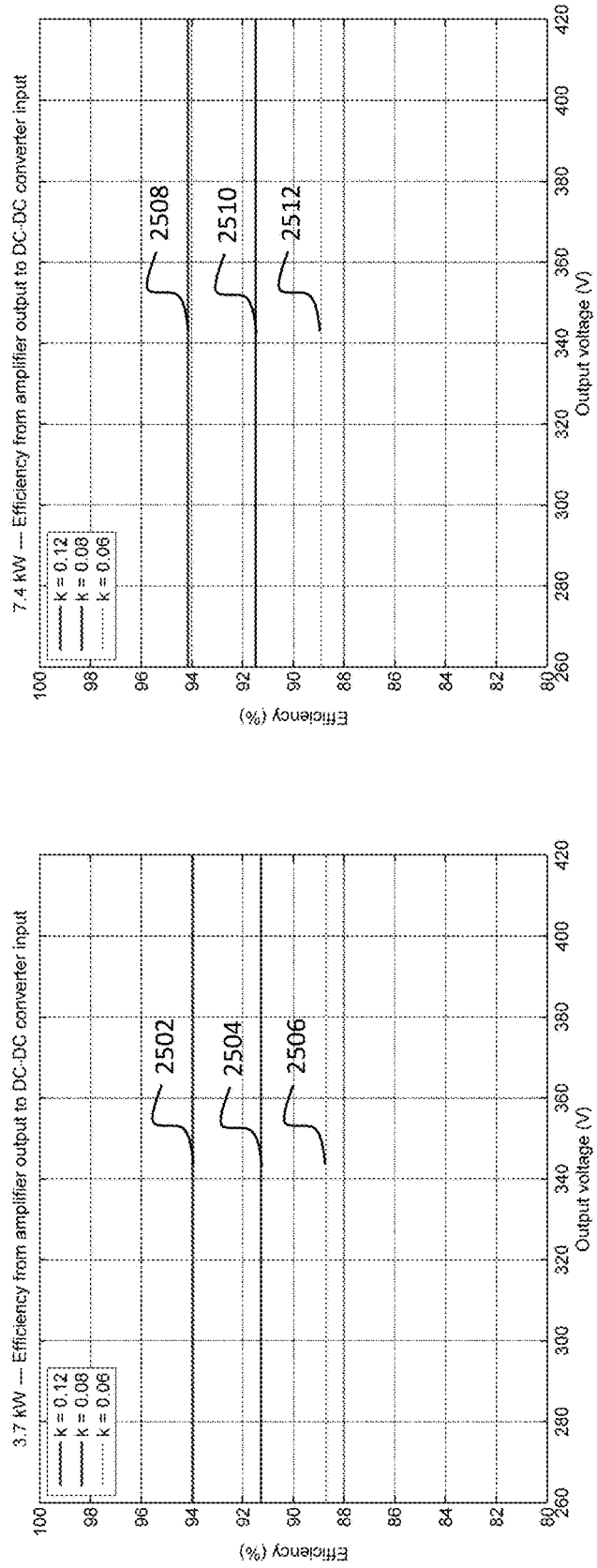
FIGS. 25A and 25B are plots of amplifier-to-converter efficiency as a function of output voltage.

FIGS. 25A and 25B are plots showing the amplifier-to-converter efficiency for a device with a receiver resonator (such as the receiver resonator shown in FIG. 5B) as a function of output voltage, in the presence of an aluminum vehicle chassis. FIG. 25A shows the efficiency for a device with a receiver resonator having coupling k values of 0.12 (curve 2502), 0.08 (curve 2504), and 0.06 (curve 2506) at a power level of 3.7 kW. FIG. 25B shows the efficiency for a device with a receiver resonator having coupling k values of 0.12 (curve 2502), 0.08 (curve 2504), and 0.06 (curve 2506) at a power level of 7.4 kW.

Figures 26A, 26B:
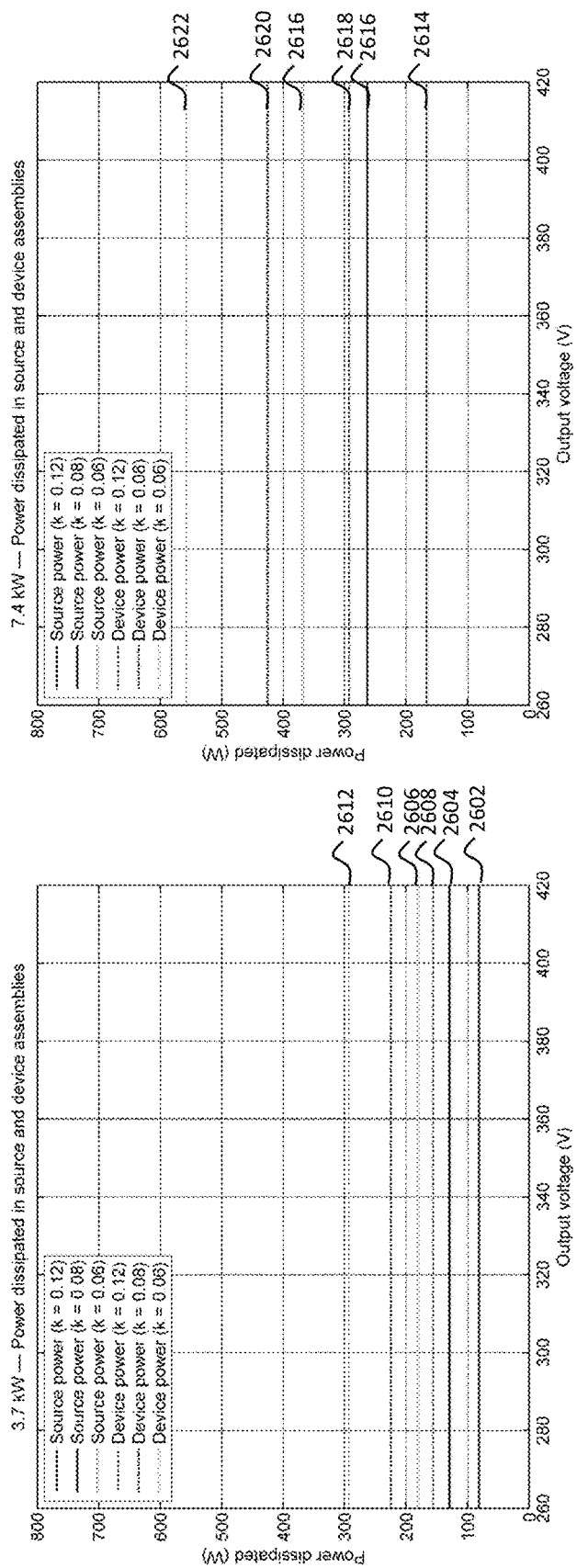
FIGS. 26A and 26B are plots of power dissipated in a source as a function of output voltage.

FIGS. 26A and 26B are plots showing power dissipated in a source that includes a source resonator (such as the source resonator shown in. FIG. 3B) and in a device that includes a receiver resonator (such as the receiver resonator shown in FIG. 5B) as a function of output voltage in the presence of an aluminum vehicle chassis. FIG. 26A shows the power dissipated in a source for coupling k values of 0.12 (curve 2602), 0.08 (curve 2604), and 0.06 (curve 2606), and in a device for coupling k values of 0.12 (curve 2608), 0.08 (curve 2610), and 0.06 (curve 2612) at a power level of 3.7 kW. FIG. 26B shows the power dissipated in a source for coupling k values of 0.12 (curve 2614), 0.08 (curve 2616), and 0.06 (curve 2618), and in a device for coupling k values of 0.12 (curve 2620), 0.08 (curve 2622), and 0.06 (curve 2624) at a power level of 7.4 kW.

Figures 27A, 27B:
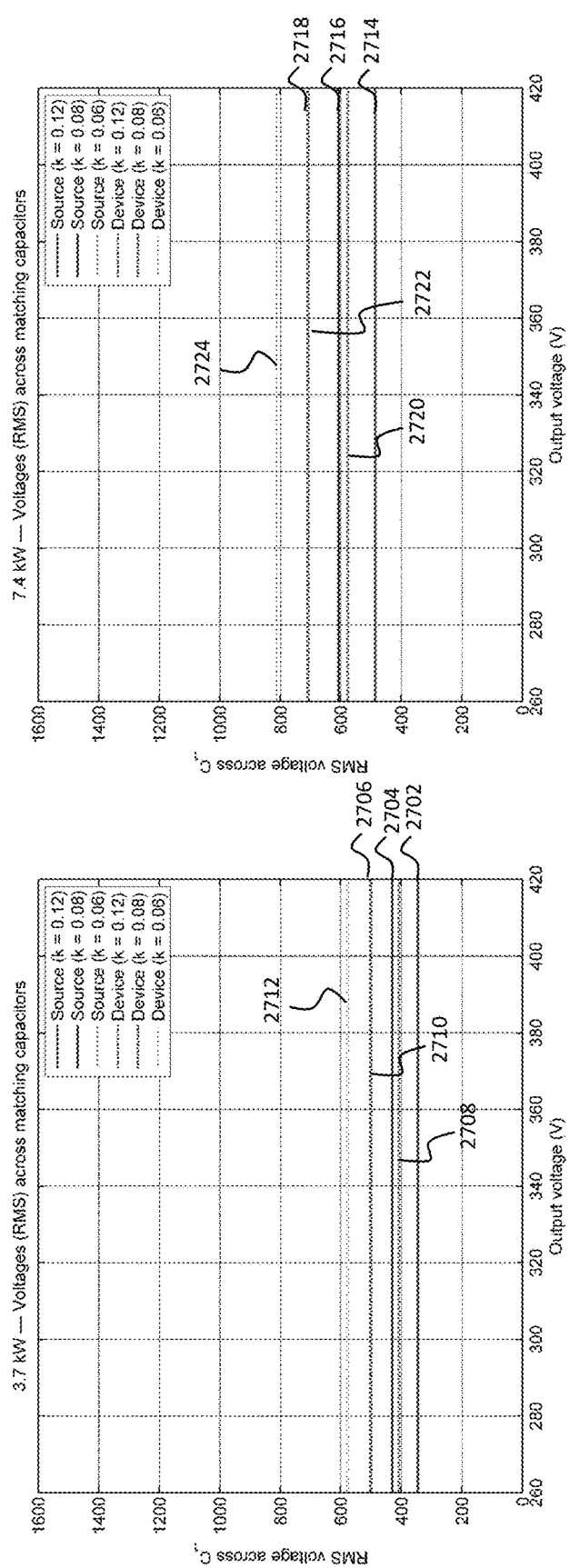
FIGS. 27A and 27B are plots of measured voltages across one or more matching network capacitors in a source.

FIGS. 27A and 27B are plots showing measured voltages across one or more matching network capacitors in a source that includes a source resonator (such as the source resonator shown in FIG. 3B) and in a device that includes a receiver resonator (such as the receiver resonator shown in FIG. 5B) as a function of output voltage in the presence of an aluminum vehicle chassis. FIG. 27A shows the voltage across one or more matching network capacitors in a source for coupling k values of 0.12 (curve 2702), 0.08 (curve 2704), and 0.06 (curve 2706), and across one or more matching network capacitors in a device for coupling k values of 0.12 (curve 2708), 0.08 (curve 2710), and 0.06 (curve 2712) at a power level of 3.7 kW. FIG. 27B shows the voltage across one or more matching network capacitors in a source for coupling k values of 0.12 (curve 2714), 0.08 (curve 2716), and 0.06 (curve 2718), and across one or more matching network capacitors in a device for coupling k values of 0.12 (curve 2720), 0.08 (curve 2722), and 0.06 (curve 2724) at a power level of 7.4 kW.

Figures 28A, 28B:
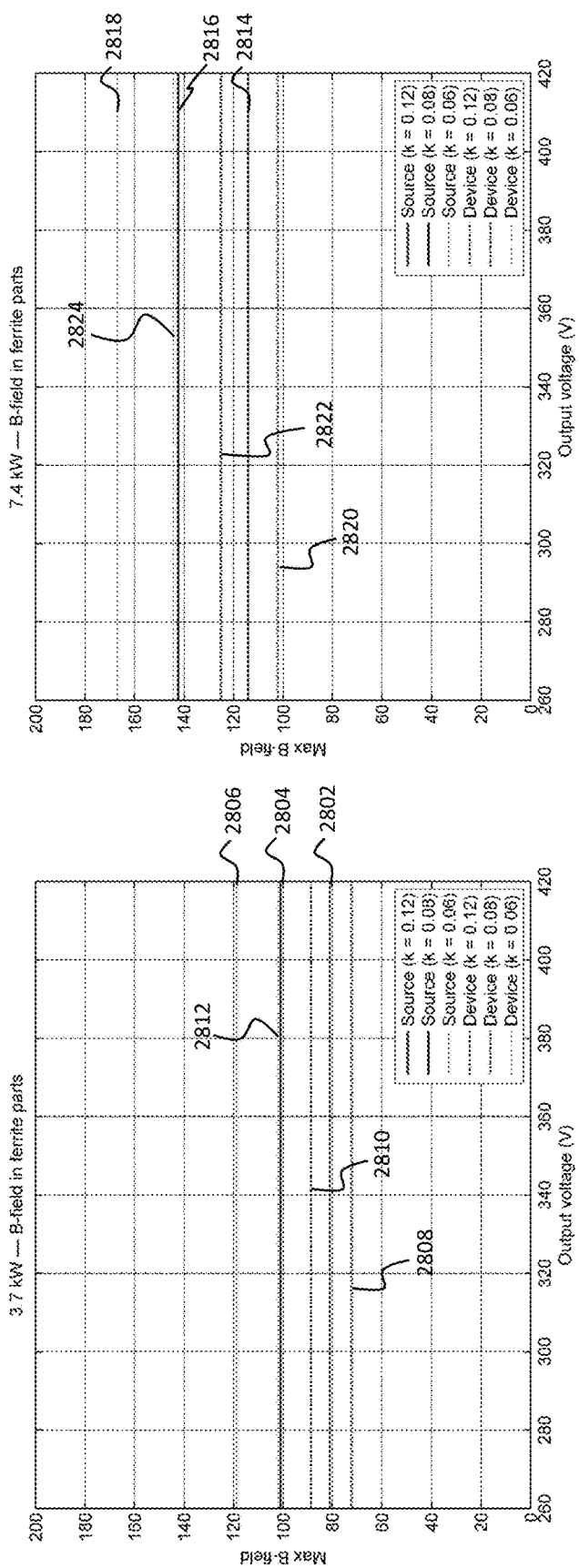
FIGS. 28A and 28B are plots of the magnetic field in a magnetic member attached to a source.

FIGS. 28A and 28B are plots of the magnetic field (mT) measured in a magnetic member attached to the source and receiver resonators in a wireless power transfer system, where the source resonator is similar to the resonator shown in FIG. 3B and the receiver resonator is similar to the resonator shown in FIG. 5B, as a function of output voltage, in the presence of an aluminum vehicle chassis. FIG. 28A shows the magnetic field measured in the magnetic member of the source for coupling k values of 0.12 (curve 2802), 0.08 (curve 2804), and 0.06 (curve 2806), and in the magnetic member of the device for coupling k values of 0.12 (curve 2808), 0.08 (curve 2810), and 0.06 (curve 2812) at a power level of 3.7 kW. FIG. 28B shows the magnetic field measured in the magnetic member of the source for coupling k values of 0.12 (curve 2814), 0.08 (curve 2816), and 0.06 (curve 2818), and in the magnetic member of the device for coupling k values of 0.12 (curve 2820), 0.08 (curve 2822), and 0.06 (curve 2824) at a power level of 7.4 kW.

In some embodiments, wireless power transfer systems can include a switchable, multi-tapped transformer to variably tune the impedance of source and/or receiver resonators. In some embodiments, wireless power transfer systems can include a DC-DC converter to modulate the output impedance.

Resonator Configurations

A wide variety of different resonator configurations can be used in wireless power transfer systems. In this section, examples of such configurations and certain performance characteristics of the configurations will be discussed.

Figure 29B:
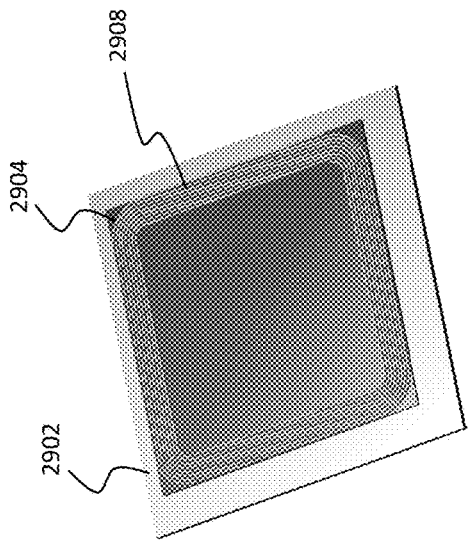
FIGS. 29A-29D are schematic diagrams showing embodiments of resonators for wireless power transfer.
Figure 29D:
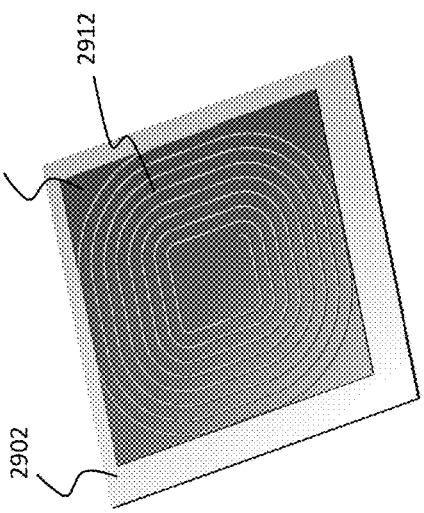
Figure 29A:
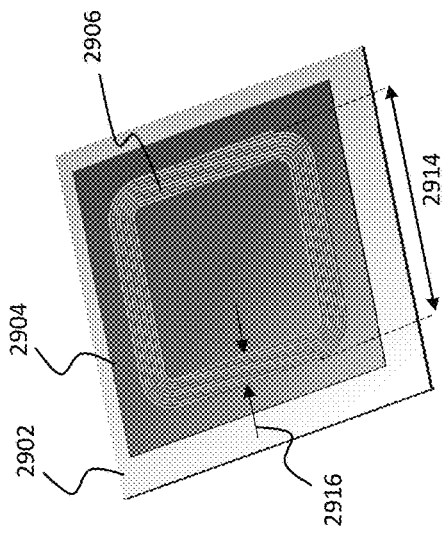
Figure 29C:
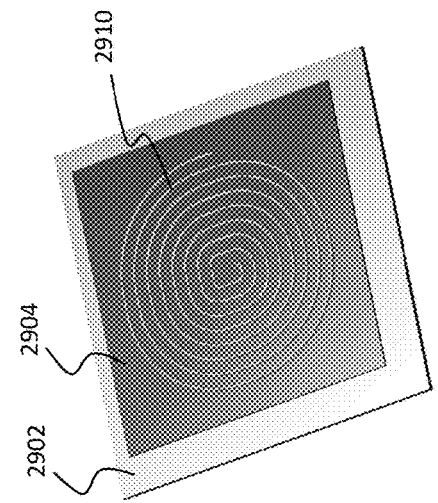

FIGS. 29A-29D are schematic diagrams showing exemplary embodiments of resonator coils for wireless power transfer systems. In each of FIGS. 29A-29D, the resonator winding length 2914 and span 2916 varies. In each of FIGS. 29A-29D, the size of magnetic member 2904 is 50 cm×50 cm×5 mm, and the size of shield 2902 is 60 cm×60 cm. Magnetic member 2904 is formed from ferrite, and shield 2902 is formed from aluminum. FIG. 29A shows a resonator coil 2906 with a minimum length of 400 mm and minimum span of 50 mm. FIG. 29B shows a resonator coil 2908 with a maximum length of 500 mm and minimum span of 50 mm. FIG. 29C shows a resonator coil 2910 with a minimum length of 400 mm and maximum span of 175 mm. FIG. 29D shows a resonator coil 2912 with a maximum length of 500 mm and maximum span of 175 mm The resonators shown in FIGS. 29A-29D can be used as source resonators (such as the source resonator shown in FIG. 3B).

Figures 30A, 30B:
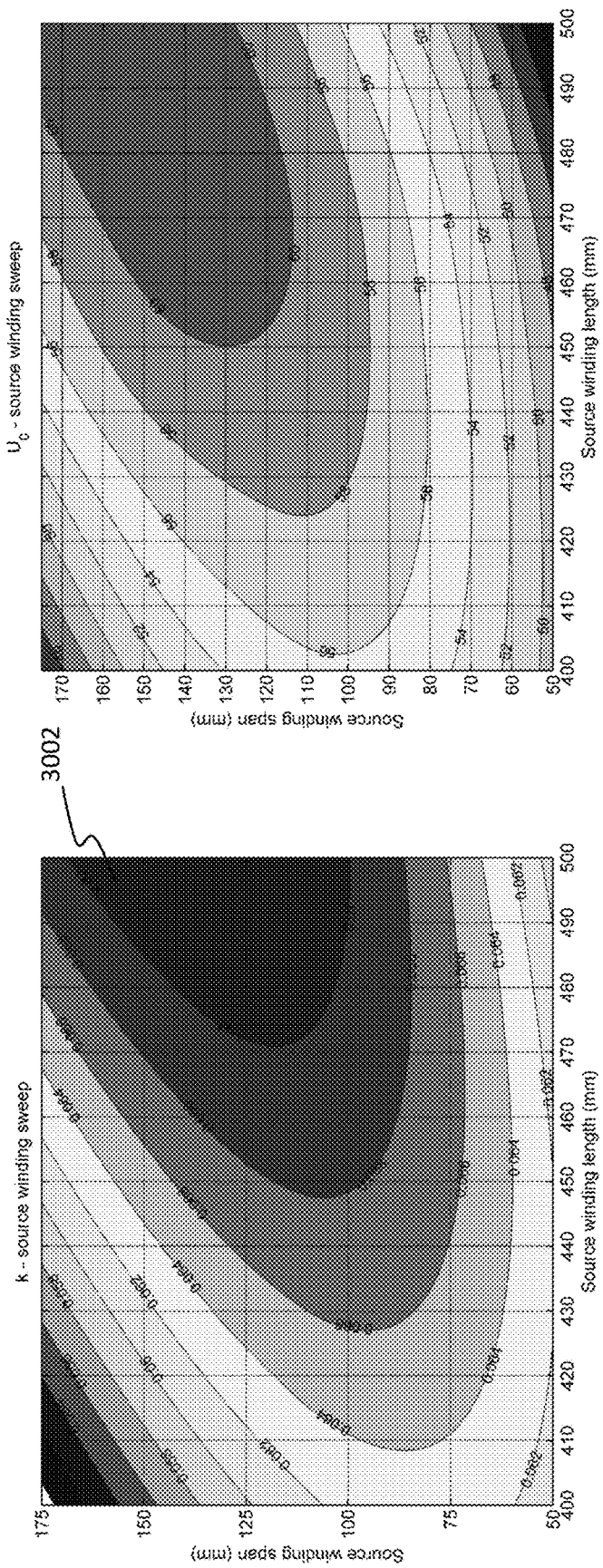
FIG. 30A is a plot of coupling rate as a function of source resonator coil winding length.
FIG. 30B is a plot of figure-of-merit as a function of source resonator coil winding length.

FIG. 30A is a plot of coupling rate k as a function of source resonator coil winding length and span, measured at an approximate offset of (X,Y,Z)=(10,10,15) cm relative to a receiver resonator coil, where Z-offset is measured from coil surface to surface. The receiver resonator dimensions are 25 mm by 50 mm. In FIG. 30A, the dark region 3002 with greater coupling k indicates that a winding length of 500 mm and winding span of 130 mm result in higher coupling for certain source resonator coil dimensions. FIG. 30B is a plot of figure-of-merit $U_0$ as a function of source resonator coil winding length and span, measured at an approximate offset of (X,Y,Z)=(10,10,15) cm relative to a receiver resonator coil, where Z-offset is measured from coil surface to surface, for the same source and receiver resonators as in FIG. 30A.

Figure 31A:
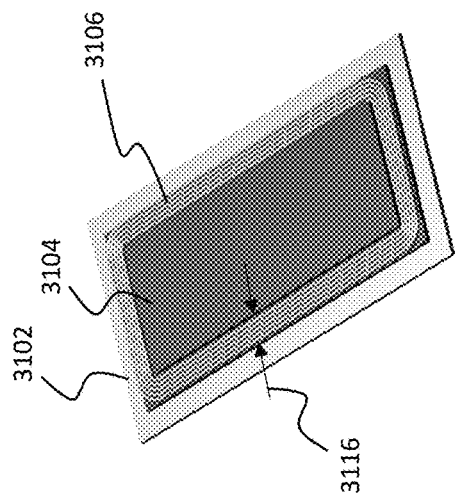
FIGS. 31A-31D are schematic diagrams of resonator coils.
Figure 31B:
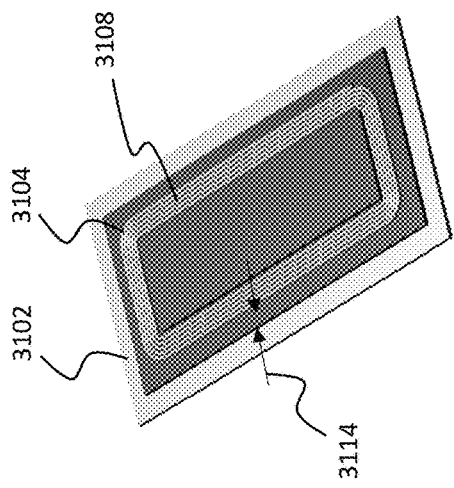
Figure 31C:
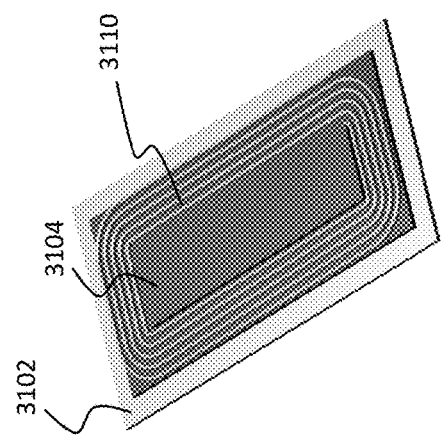
Figure 31D:
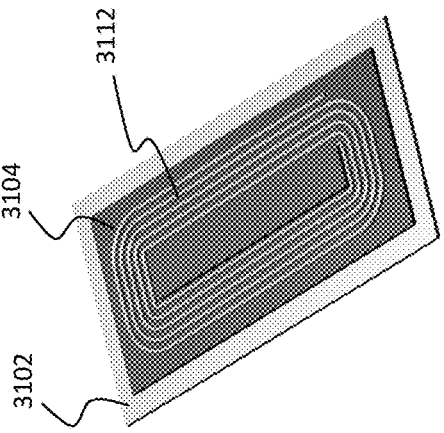

FIGS. 31A-31D are schematic diagrams showing exemplary embodiments of resonator coils for wireless power transfer systems. In each of FIGS. 31A-31D, the winding gap-to-edge distance 3114 and span 3116 vary. In FIGS. 31A-31D, the size of magnetic member 3104 is 20 cm×45 cm×5 mm, and the size of shield 3102 is 25 cm×50 cm. Magnetic member 3104 is formed from ferrite, and shield 3102 is formed from aluminum. FIG. 31A shows a resonator coil 3106 with a minimum gap-to-edge distance of 0 mm and a minimum span of 25 mm. FIG. 31B shows a resonator coil 3108 with a maximum gap-to-edge distance of 20 mm and a minimum span of 25 mm. FIG. 31C shows a resonator coil 3110 with a minimum gap-to-edge distance of 0 mm and a maximum span of 50 mm. FIG. 31D shows a resonator coil 3112 with a maximum gap-to-edge distance of 20 mm and a maximum span of 50 mm. The resonators shown in FIGS. 31A-31D can be used as receiver resonators in devices, for example.

Figure 32B:
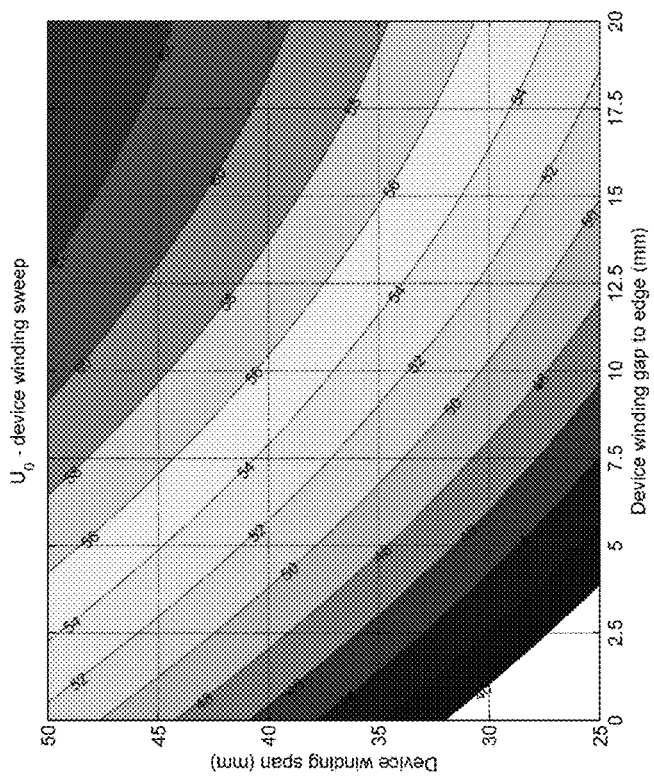
FIG. 32B is a plot of figure-of-merit as a function of resonator coil winding gap-to-edge distance and span.
Figure 32A:
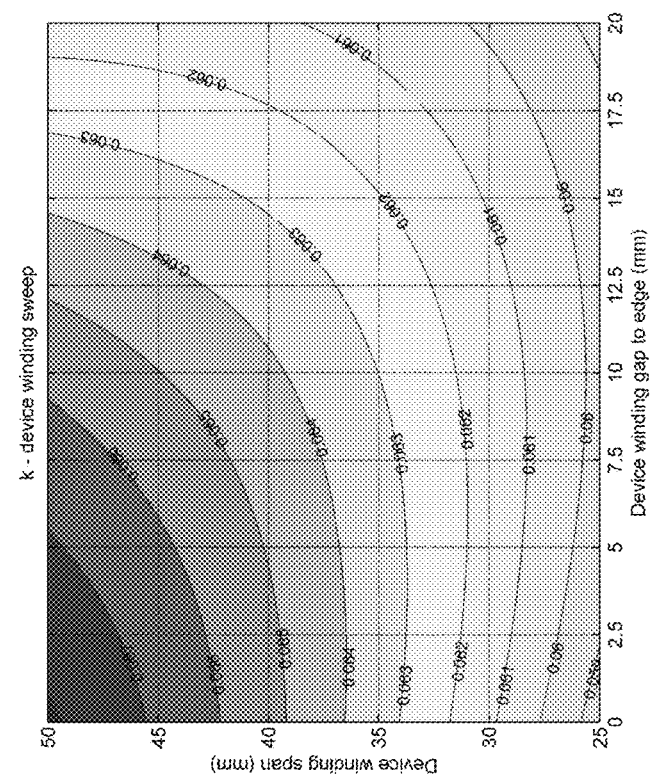
FIG. 32A is a plot of coupling rate as a function of resonator coil winding gap-to-edge distance and span.

FIG. 32A is a plot of coupling k as a function of resonator coil winding gap-to-edge distance and span for the resonators of FIGS. 31A-31D. Highest coupling is achieved for resonator coils with a winding gap-to-edge distance of 0 mm and a span of 50 mm. FIG. 32B is a plot of figure-of-merit $U_0$ as a function of resonator coil winding gap-to-edge distance and span for the resonators of FIGS. 31A-31D.

FIGS. 33A and 33B are plots of the coupling k between a source resonator of the type shown in FIGS. 29A-29D and a device resonator of the type shown in FIGS. 31A-31D, as a function of relative offset between the resonators in the X- and Y-directions. FIG. 33A shows the coupling k for a relative offset between the resonators in the Z-direction of 10 cm, and FIG. 33B shows the coupling k for a relative offset between the resonators in the Z-direction of 15 cm.

FIGS. 34A and 34B are plots of the figure-of-merit $U_0$ for a wireless power transfer system that includes a source resonator of the type shown in FIGS. 29A-29D, and a device resonator of the type shown in FIGS. 31A-31D, as a function of relative offset between the resonators in the X- and Y-directions. FIG. 34A shows the figure-of-merit $U_0$ for a relative offset between the resonators in the Z-direction of 10 cm, and FIG. 34B shows the figure-of-merit $U_0$ for a relative offset between the resonators in the Z-direction of 15 cm.

Additional Impedance Matching Network Topologies

Figure 35A:
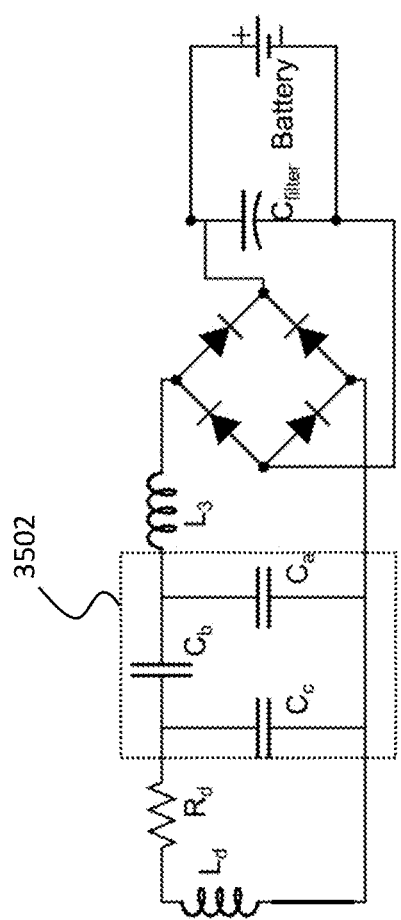
FIGS. 35A and 35B are schematic diagrams of impedance matching networks.
Figure 35B:
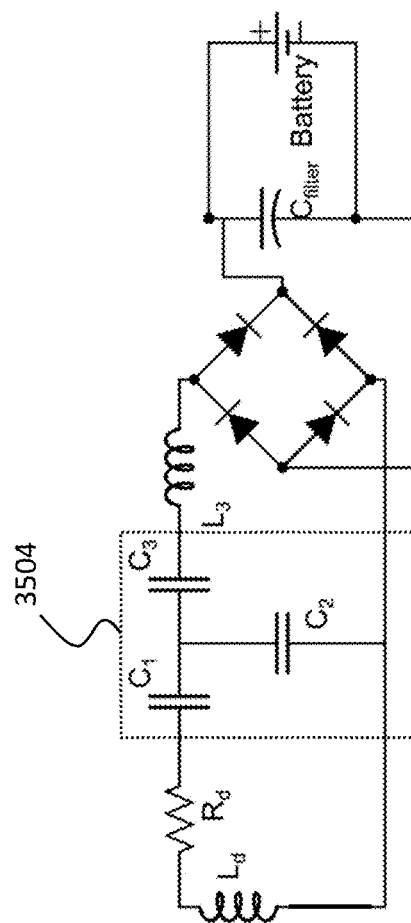

In addition to the impedance matching networks discussed above, additional impedance matching network topologies can also be used in the wireless power systems disclosed herein. FIGS. 35A and 35B are schematic diagrams of matching networks for use in device electronics 110. FIG. 35A shows a delta capacitor matching network 3502 and FIG. 35B shows a wye capacitor matching network 3504. The two capacitor networks are equivalent to each other through a "delta-wye" transformation. Delta and wye networks that match a device to an effective impedance that stays relatively flat as a battery voltage and output power vary can be desirable. Accordingly, wireless power transfer systems can include a matching network of either topology. In some embodiments, the implementation of either a delta or wye matching network is guided by the network that uses the fewest capacitors of a given voltage rating, making that network the cheaper of the two to implement.

Figure 36:
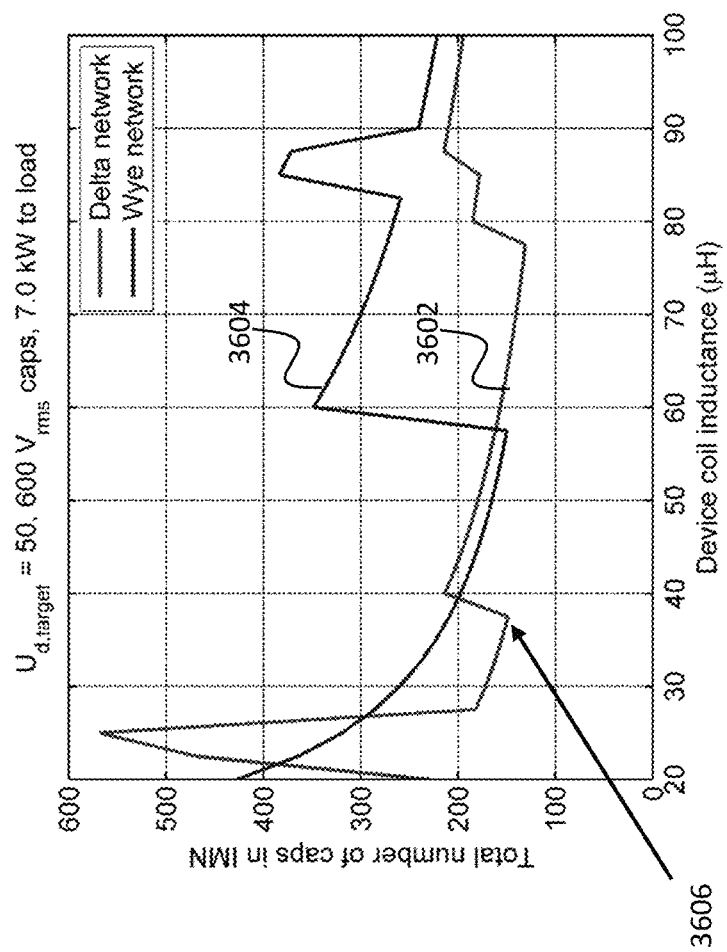
FIG. 36 is a plot showing a minimum number of capacitors for different impedance matching networks.

FIG. 36 is a plot of the total minimum number of capacitors for delta (3602) and wye (3604) impedance matching networks in a device. The device matching point $U_d$ can affect the overall efficiency and determine how the power dissipated is distributed between the source and the device. A higher $U_d$ value means less power is dissipated in the device and more power is dissipated in the source. Delta and/or wye matching networks can be used to match to $U_d$=50 such that approximately equal power is dissipated in the source and the device at maximum relative offset between the resonators. In some embodiments, point 3606 ($L_d$=37.5 µH) can be chosen on the delta network 3602 to minimize the number of capacitors and inductance. A lower inductance may reduce the voltage across the winding.

Figure 37:
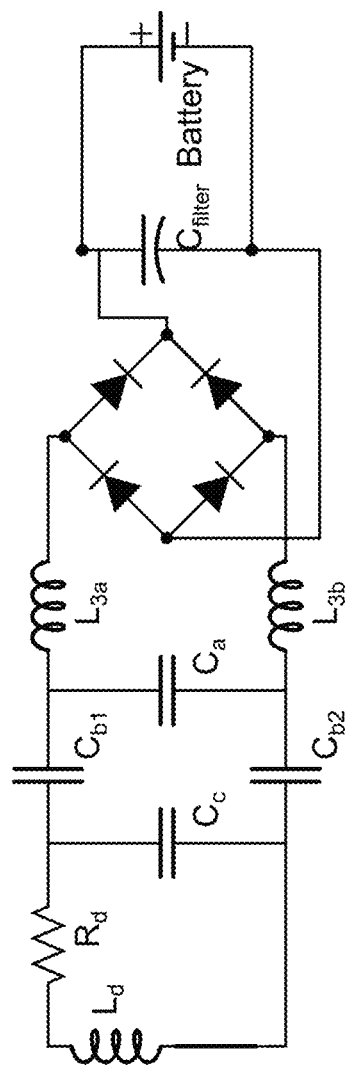
FIG. 37 is a schematic diagram of an impedance matching network.

FIG. 37 is a schematic diagram showing an embodiment of an impedance matching network topology for use in device electronics 110. As one example, in FIG. 37, the various circuit component positions can have the following values: $L_{3a}=L_{3b}=25$ µH; $C_a$–24.8 nF; $C_{b1}=C_{b2}=39$ nF; and $C_c$=71.8 nF. This topology provides additional degrees of freedom in the impedance matching of the device as compared to topologies with fewer component positions. Note that components in positions $C_{b1}$ and $C_{b2}$ provide a balancing of the impedance matching network shown in FIG. 35A. Additional aspects of the impedance matching network topology shown in FIG. 37 are disclosed, for example, in U.S. Pat. No. 8,461,719, the entire contents of which are incorporated herein by reference.

Figure 38:
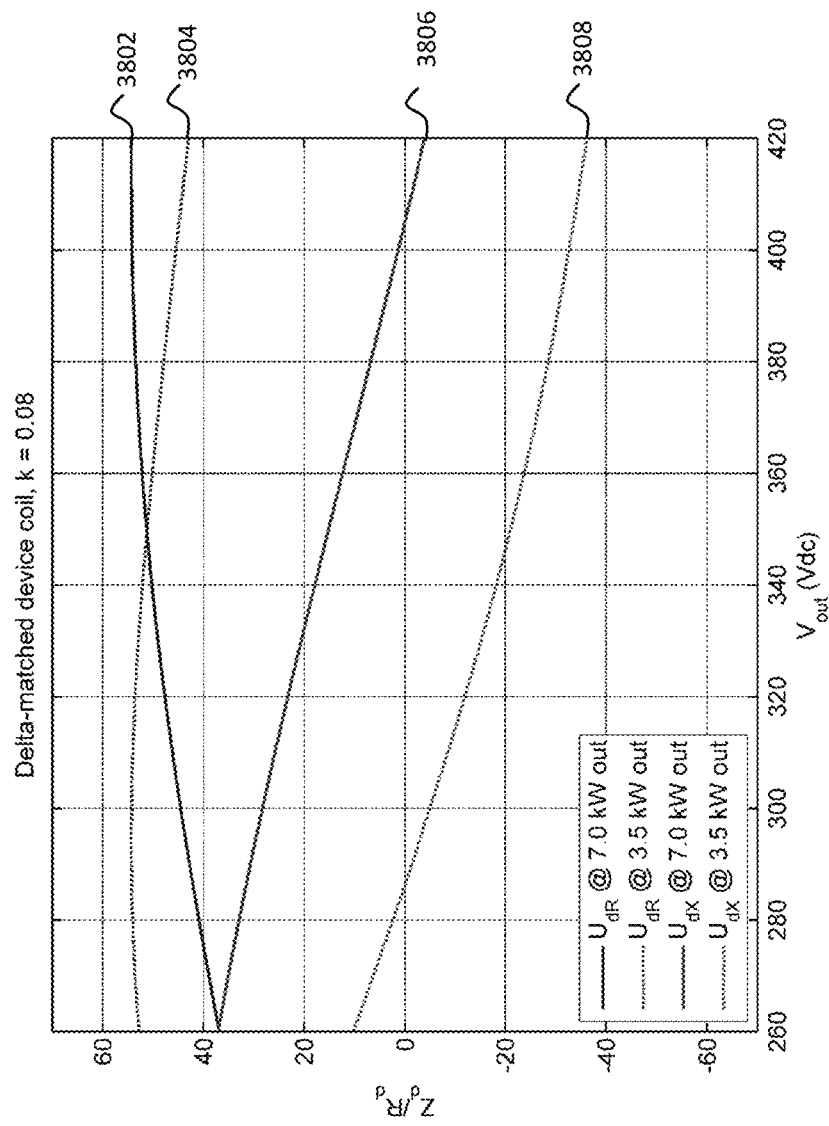
FIG. 38 is a plot of figure-of-merit as a function of output voltage in an impedance-matched device.

FIG. 38 is a plot of the figure-of-merit U as function of output voltage in a device that includes a receiving resonator with a delta-type impedance matching network (as shown in FIG. 35A). Curve 3802 shows the figure-of-merit $U_{dR}$ which is the resistive component of the device matching impedance for power output of 7.0 kW. Curve 3804 shows the figure of merit $U_{dR}$ which is the resistive component of the device matching impedance for power output of 3.5 kW. Curve 3806 shows the figure-of-merit $U_{dX}$ which is the reactive component of the device matching impedance for power output of 7.0 kW. Curve 3808 shows the figure of merit $U_{dX}$ which is the reactive component of the device matching impedance for power output of 3.5 kW. The reactive component of the device matching impedance is generally smaller than the resistive component, and thus the device resonator is not significantly detuned off resonance. Furthermore, in these conditions, current in the source does not increase excessively to drive an off-resonance device resonator.

Figure 39:
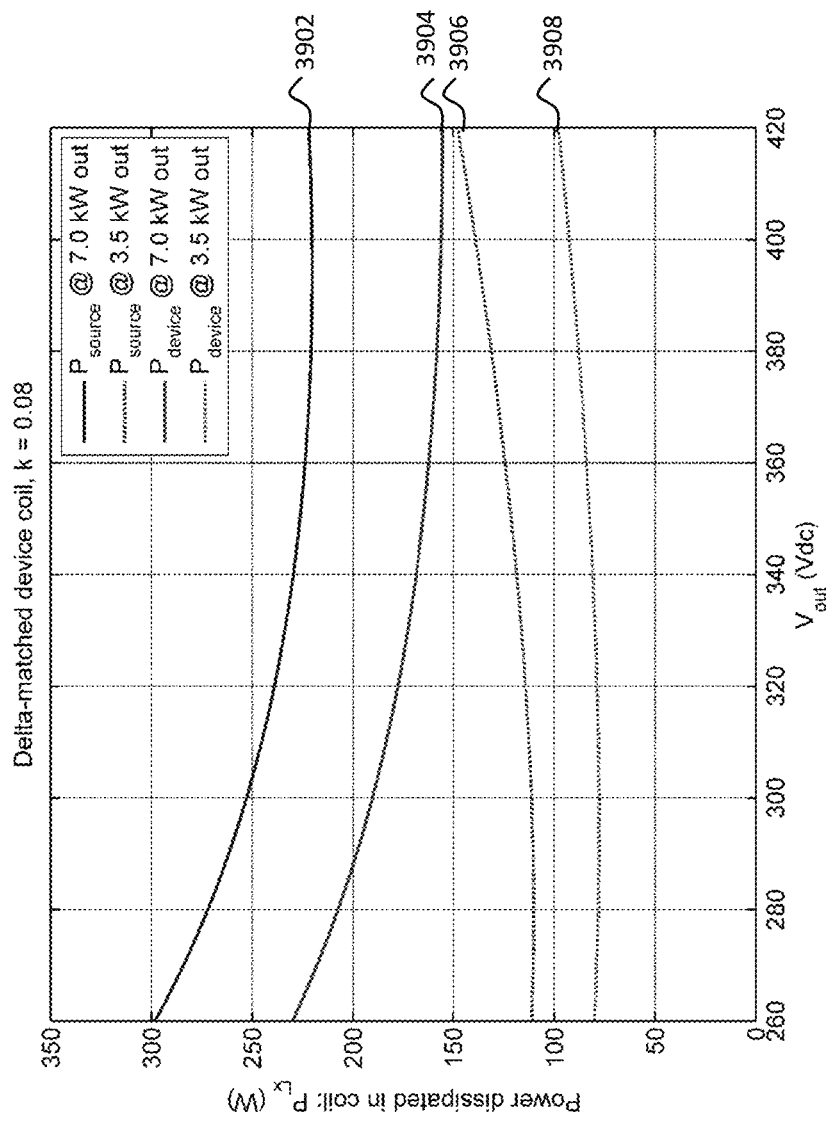
FIG. 39 is a plot of power dissipated in source and receiver resonators that are impedance-matched.

FIG. 39 is a plot showing the power dissipated in source and receiver resonators that are matched using a delta-type impedance matching network, as a function of output voltage. The system of source and receiver resonators has a coupling k of 0.08. Curve 3902 shows the power dissipated in the source resonator coil and one or more capacitors of the matching network at a power output of 7.0 kW. Curve 3904 shows the power dissipated in the source resonator coil and one or more capacitors of the matching network at a power output of 3.5 kW. Curve 3906 shows the power dissipated in the receiver resonator coil and one or more source-side capacitors of the matching network at a power output of 7.0 kW. Curve 3908 shows the power dissipated in the receiver resonator coil and one or more device-side capacitors of the matching network at a power output of 3.5 kW.

Figure 40:
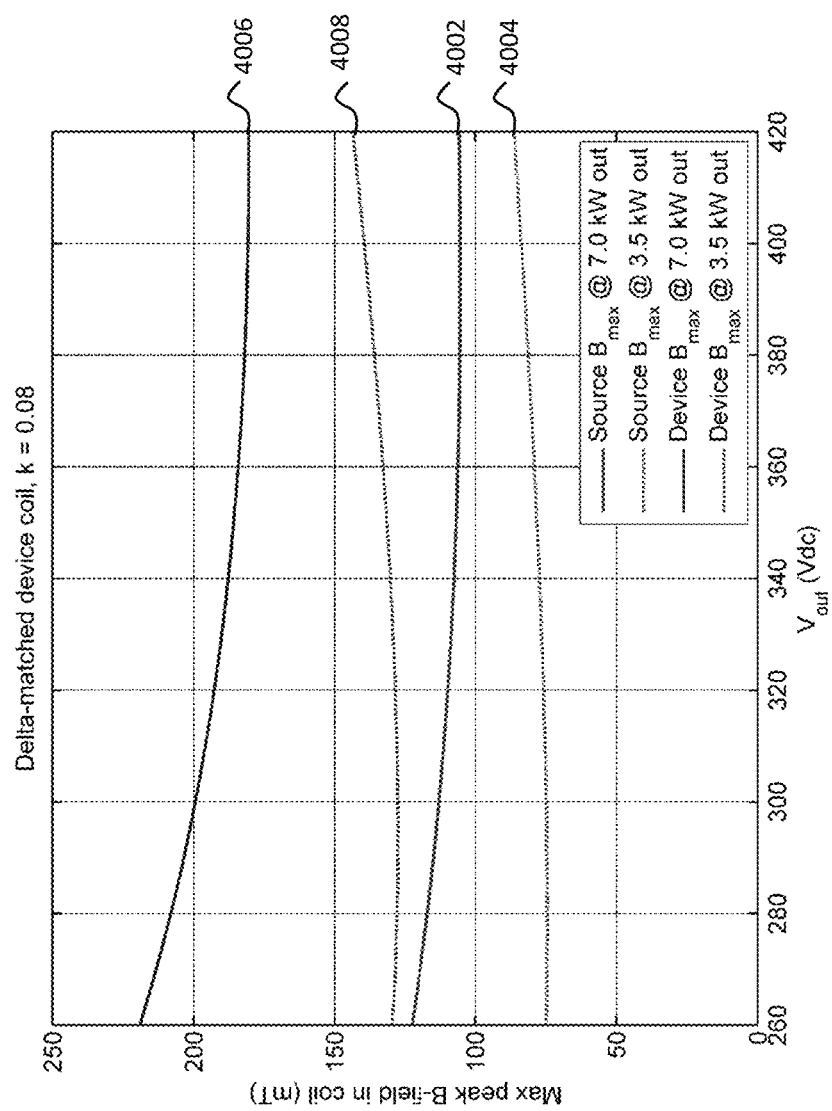
FIG. 40 is a plot of maximum magnetic field in source and device resonators as a function of output voltage.

FIG. 40 is a plot showing the maximum magnetic field in the source and device resonators as a function of output voltage for a wireless power transfer system that includes source and device resonators with a coupling k of 0.08. Curve 4002 shows the maximum magnetic field in the source resonator at a power output of 7.0 kW. Curve 4004 shows the maximum magnetic field in the source resonator at a power output of 3.5 kW. Curve 4006 shows the maximum magnetic field in the device resonator at a power output of 7.0 kW. Curve 4008 shows the maximum magnetic field in the device resonator at a power output of 3.5 kW.

Figure 41:
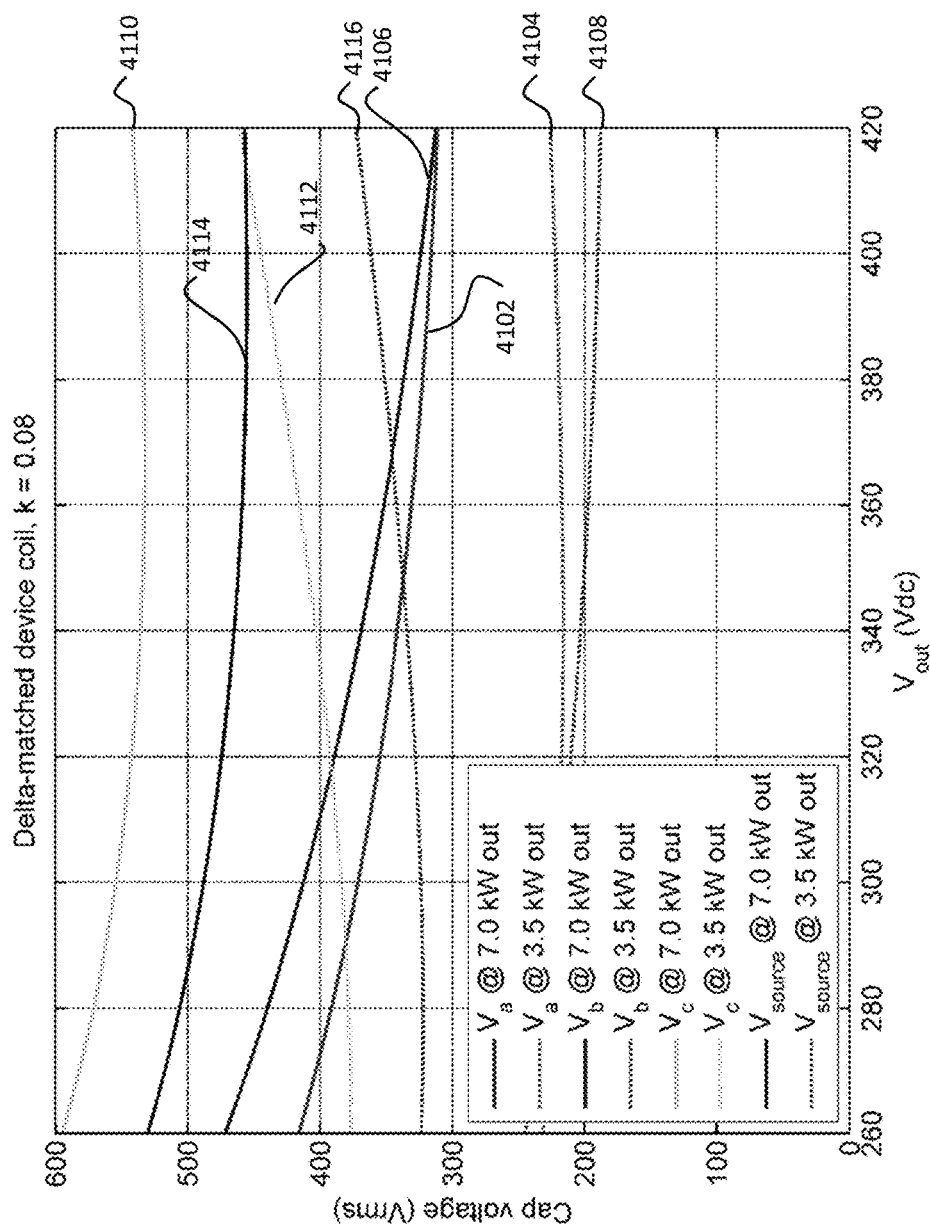
FIG. 41 is a plot of voltage across one or more capacitors of an impedance matching network in source and receiver resonators.

FIG. 41 is a plot showing the voltage across one or more capacitors of a delta-matching network in a receiver resonator of a device (curves 4102-4112) and in a source resonator (curves 4114-4116) as function of output voltage. Curve 4102 shows the voltage across capacitor $C_a$ in FIG. 37 at a power output of 7.0 kW. Curve 4104 shows the voltage across capacitor $C_a$ in FIG. 37 at a power output of 3.5 kW. Curve 4106 shows the voltage across capacitor $C_b$ in FIG. 37 at a power output of 7.0 kW. Curve 4108 shows the voltage across capacitor $C_b$ in FIG. 37 at a power output of 3.5 kW. Curve 4110 shows the voltage across capacitor $C_c$ in FIG. 37 at a power output of 7.0 kW. Curve 4112 shows the voltage across capacitor $C_c$ in FIG. 37 at a power output of 3.5 kW. Curve 4114 shows the voltage across a source capacitor at a power output of 7.0 kW. Curve 4116 shows the voltage across a source capacitor at a power output of 3.5 kW.

Optimizing impedance matching networks for particular resonator configurations and power delivery specifications involves selecting electronic components for the network. For example, with reference to the delta-matching network shown in FIG. 35A, one component that is selected is the inductance value $L_3$. If $L_3$ is too small, the diodes in the rectifier may conduct for only a fraction of an oscillation period, so to transfer a fixed amount of power, the peak current through the diodes would have to be higher, leading to more power dissipation in the diodes. In addition, the electrical current through $L_3$ would also peak higher and have more harmonic content, leading to losses in the inductor. Conversely, large values of $L_3$ can add too much ESR to the impedance matching network. As such, the value of $L_3$ is chosen to balance these competing effects.

FIGS. 64A and 64B are plots showing the peak current through the diodes and inductor $L_3$ for delivery of 6.6 kW to a load of $V_{dc}$=420 V. For a capacitor with $L_3$=20 µH (FIG. 64A), the peak current is 34.5 A. For a capacitor with $L_3$=50 µH (FIG. 64B), the peak current is 26.7 A.

Figure 65A:
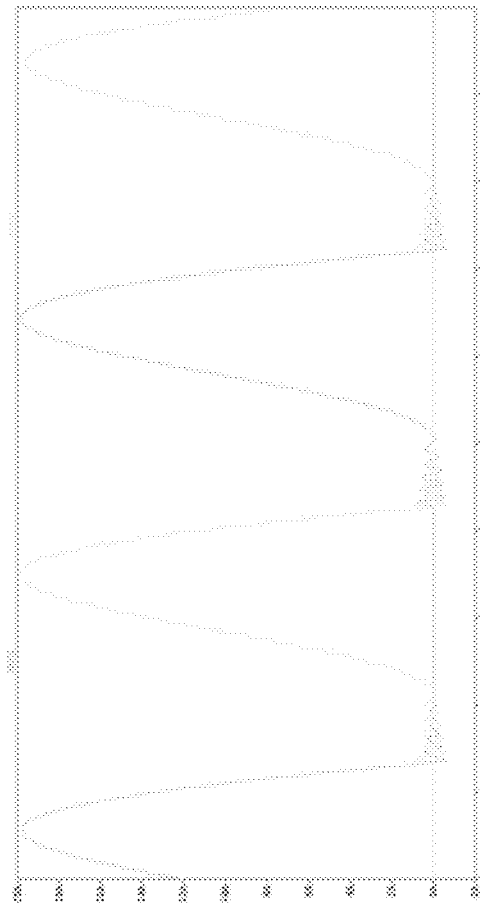
FIGS. 65A and 65B are plots of peak current through the diodes of a rectifer in an impedance matching network.
Figure 65B:
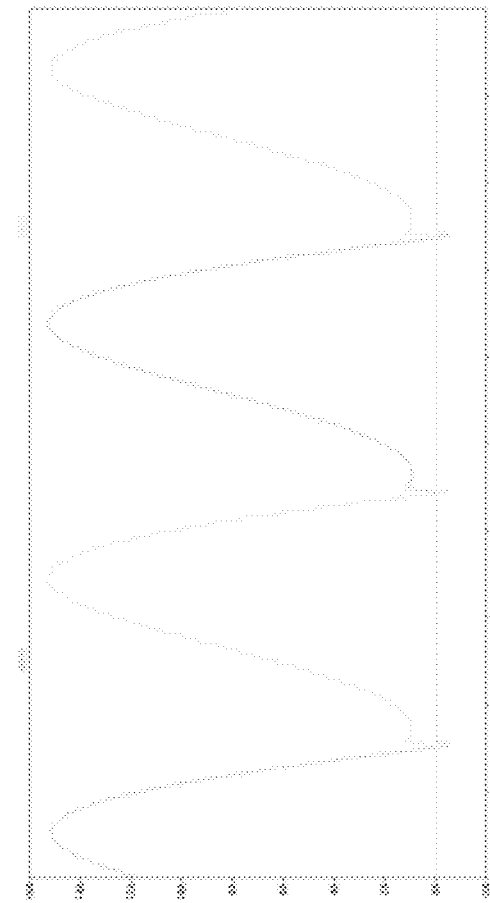

FIGS. 65A and 65B are plots showing the peak current through the diodes and inductor L3 for delivery of 3.3 kW to a load of $V_{dc}$=420 V. For a capacitor with $L_3$=20 µH (FIG. 65A), the peak current is 19.9 A. For a capacitor with $L_3$=50 µH (FIG. 65B), the peak current is 15.3 A.

As discussed above, once the configuration of the impedance matching network has been determined, the network configuration can be optimized. In general, the device matching point $U_d$ affects the overall efficiency of wireless power transfer and how power is dissipated between the source and the device. Higher values of $U_d$ mean that more power is dissipated in the source and less is dissipated in the device. Impedance matching networks can be optimized to satisfy the condition $U_d$=50 (i.e., equal power dissipation in the source and device) at the maximum offset between the source and device resonators (i.e., where k=0.07). The optimum configuration for an impedance matching network is generally the configuration that uses the smallest number of capacitors, while satisfying the optimization condition to within an acceptable tolerance.

Figure 66B:
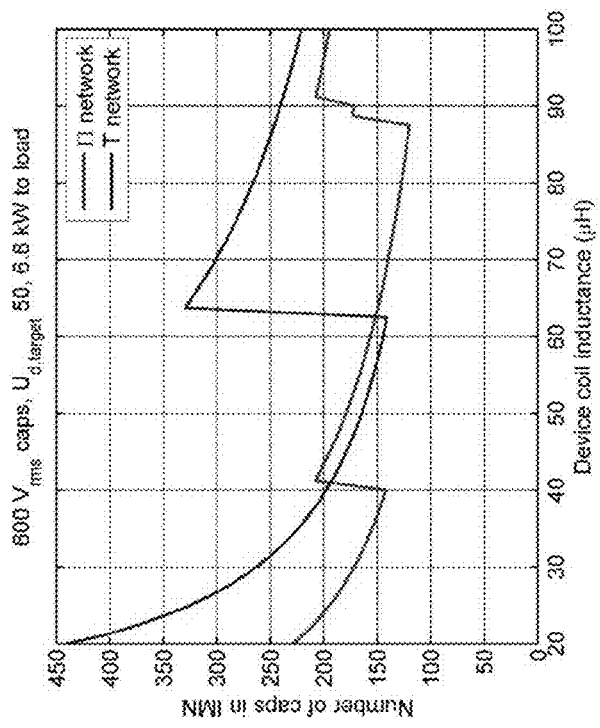
FIGS. 66A and 66B are plots showing the number of capacitors in a device's impedance matching network as a function of device inductance.
Figure 66A:
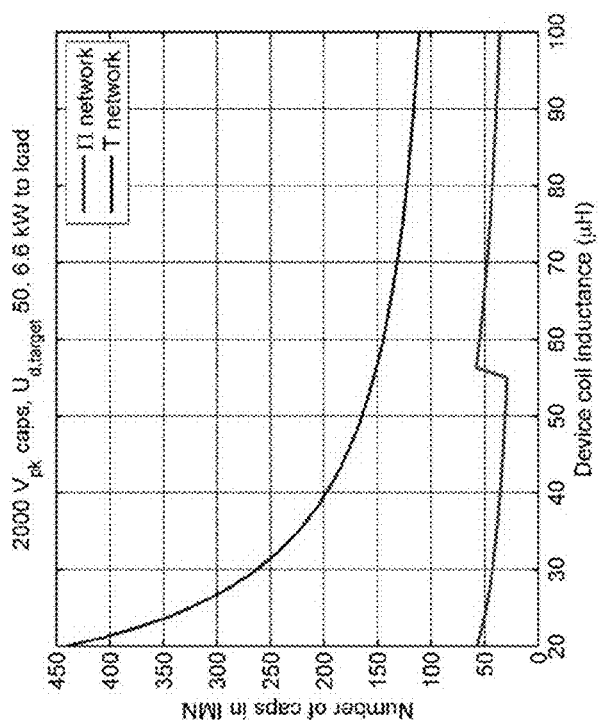

FIGS. 66A and 66B are plots showing the number of capacitors in a device's impedance matching network as a function of the inductance of the device's receiving resonator coil inductance, for 800 E series capacitors (American Technical Ceramics Corp.) (FIG. 66A) and film capacitors (available from EPCOS, Munich, Germany). Each plot shows results for both delta- and wye-matching networks. FIG. 66A corresponds to capacitors at 2000 V peak voltage and 6.6 kW, with a target $U_d$ of 50. FIG. 66B corresponds to capacitors at 600 V RMS voltage and 6.6 kW, with a target $U_d$ of 50.

After choosing the type of capacitors to use (i.e., 800 E series capacitors) and the inductance of the receiver resonator coil (43.5 µH, which can be achieved with 8 loops of conductive material), the number and capacitance values of the different capacitors in the impedance matching network are selected, subject to the impedance matching condition ($U_d$=50), and further subject to the constraint that the number of capacitors used to achieve the impedance matching condition should be as small as possible.

Figure 67:
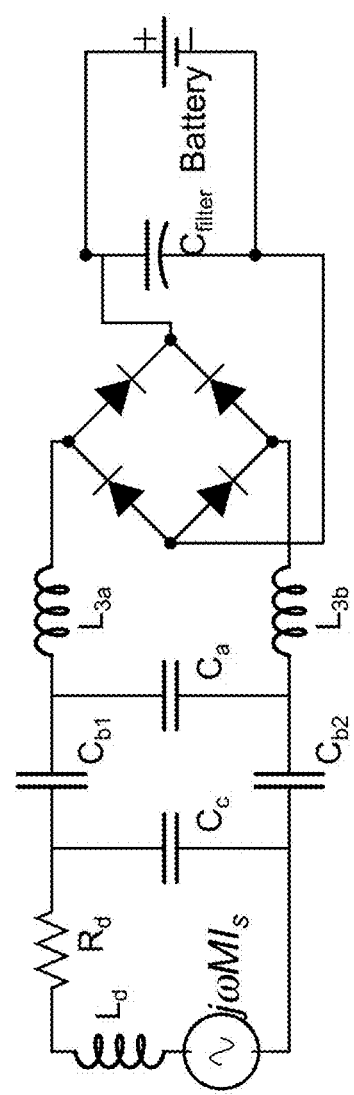
FIG. 67 is a schematic diagram of an impedance matching network.

FIG. 67 is a schematic diagram of an optimized device impedance matching network. In the optimized network, $L_{3a}$=$L_{3b}$=25 µH, $C_a$=28.6 nF (achieved with 5×5.1 nF+1× 3.0 nF 800 E capacitors), $C_{b1}$=$C_{b2}$=36.8 nF (achieved with 7×5.1 nF+1×1.0 nF 800 E series capacitors), and $C_3$=51.0 nF (achieved with 10×5.1 nF 800 E series capacitors). The total number of capacitors used in the optimized network is 32. The optimized network is sufficiently small geometrically that it fits within the empty volume of the "top hat" resonator shown in FIG. 5B.

Figure 68:
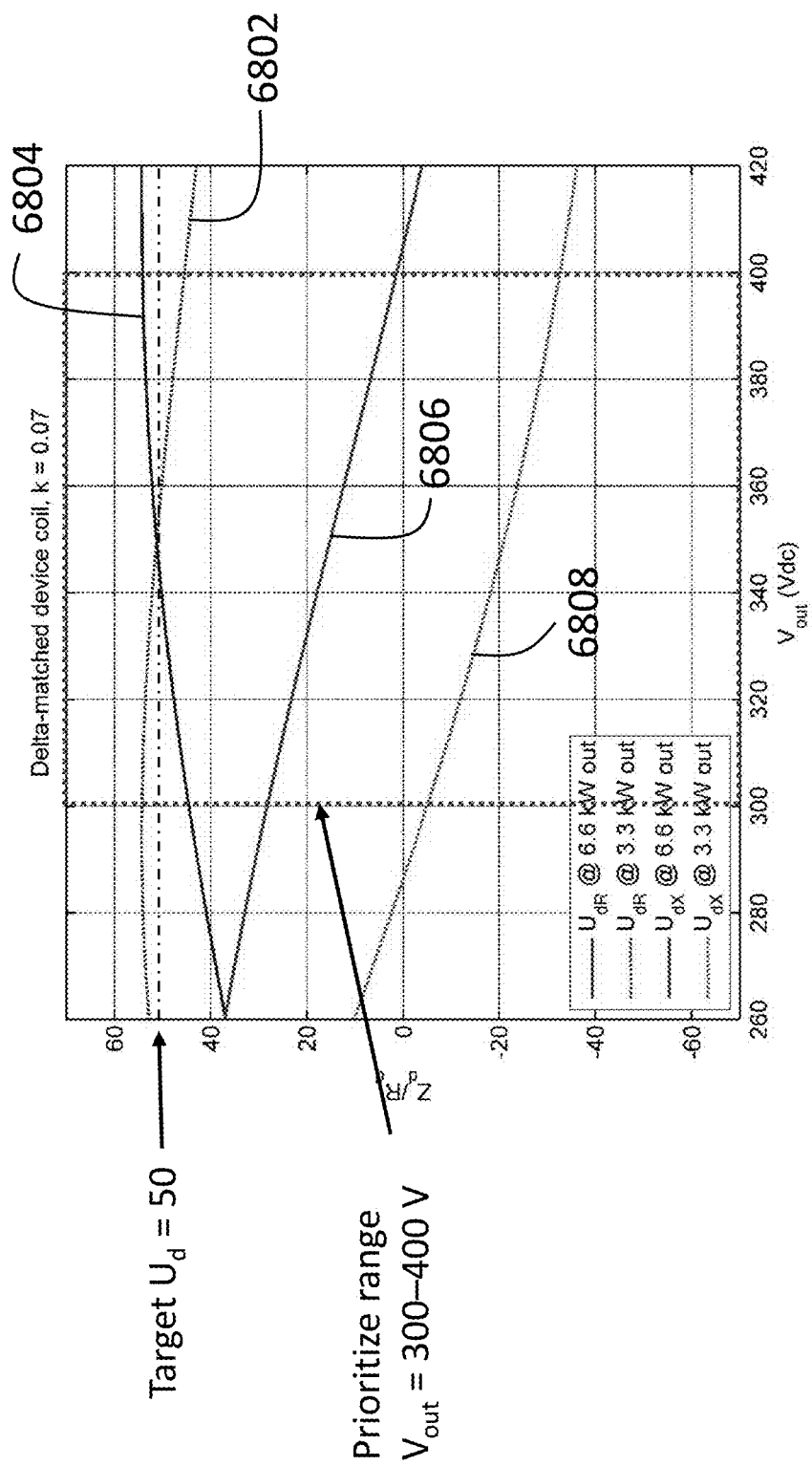
FIG. 68 is a plot of figure of merit as a function of output voltage for an impedance matching network.

FIG. 68 is a plot showing the figure of merit $U_d$ as a function of output voltage for an optimized impedance matching network, at a coupling k value of 0.07. The target $U_d$=50 is achieved between 300 V and 400 V (and specifically, at approximately 350 V) for the resistive component of $U_d$ at 3.3 kW output (curve 6802) and 6.6 kW output (curve 6804), but not for the reactive component of $U_d$ at either 6.6 kW output (curve 6806) or 3.3 kW output (curve 6808).

Figure 69:
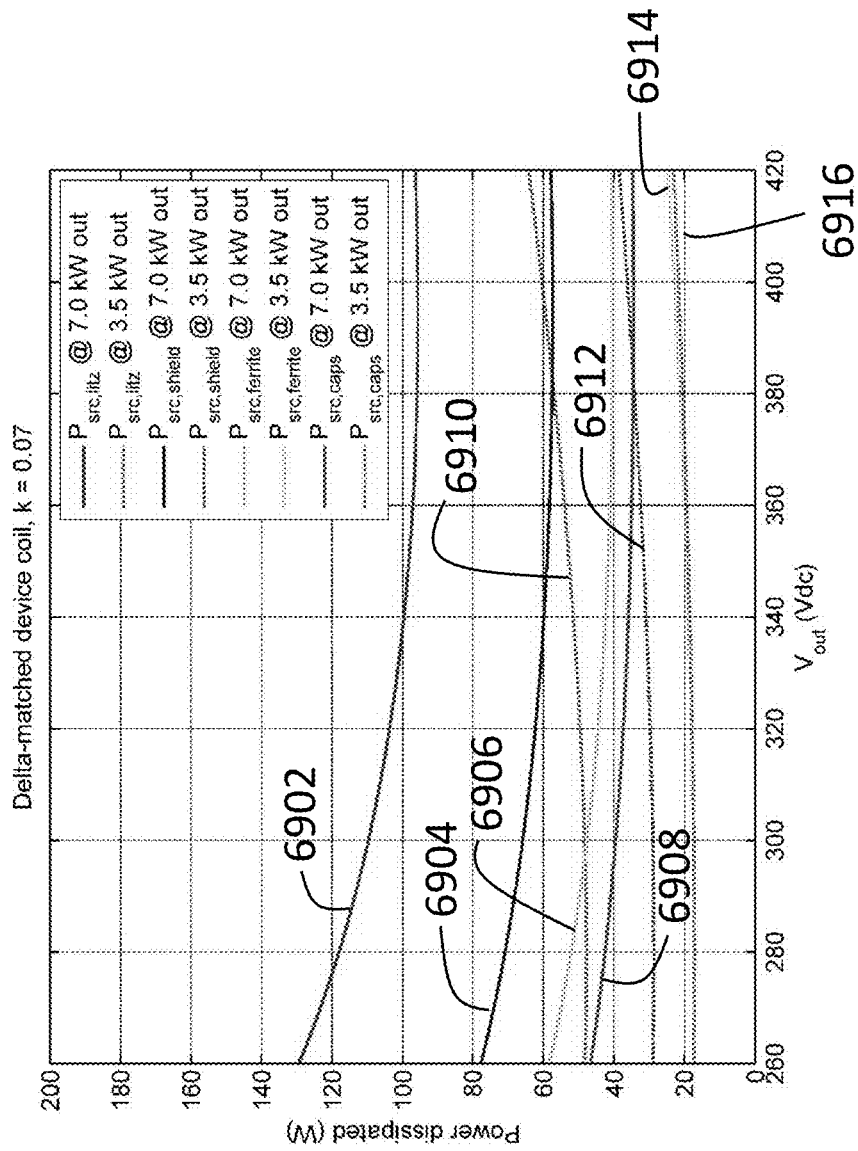
FIG. 69 is a plot of power dissipation in various components of a source.

FIG. 69 is a plot showing the amount of power dissipated in various components of the source for a wireless power transfer system with an optimized device impedance matching network having a coupling value k=0.07 between source and receiver resonators. Curves 6902, 6904, 6906, and 6908 show the power dissipated in the source's resonator coil windings, shield, ferrite magnetic member, and capacitors at 7.0 kW output power. Curves 6910, 6912, 6914, and 6916 show the power dissipated in the source's resonator coil windings, shield, ferrite magnetic member, and capacitors at 3.5 kW output power.

Figure 70:
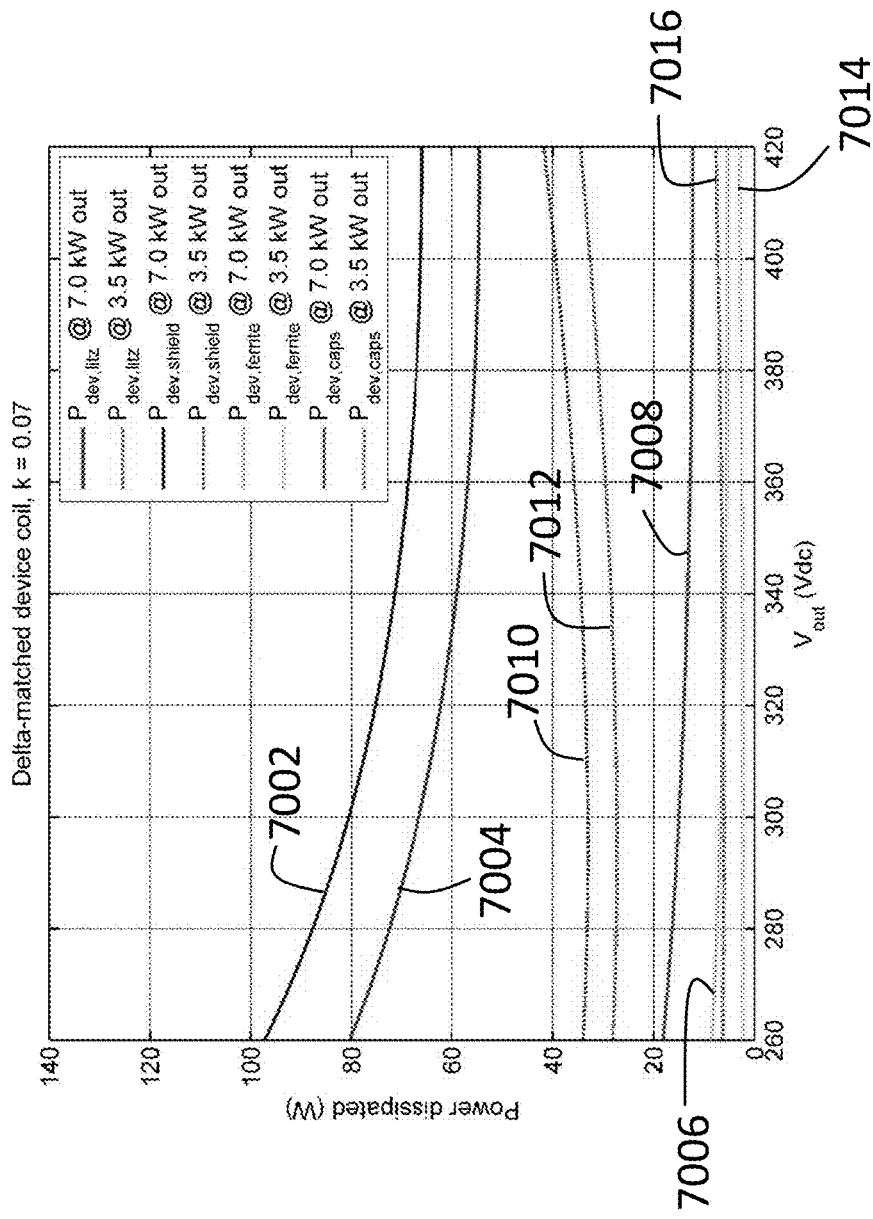
FIG. 70 is a plot of power dissipation in various components of a device.

FIG. 70 is a plot showing the amount of power dissipated in various components of the device for a wireless power transfer system with an optimized device impedance matching network having a coupling value k=0.07 between source and receiver resonators. Curves 7002, 7004, 7006, and 7008 show the power dissipated in the device's receiver coil windings, shield, ferrite magnetic member, and capacitors at 7.0 kW output power. Curves 7010, 7012, 7014, and 7016 show the power dissipated in the device's receiver coil windings, shield, ferrite magnetic member, and capacitors at 3.5 kW output power.

Figure 71:
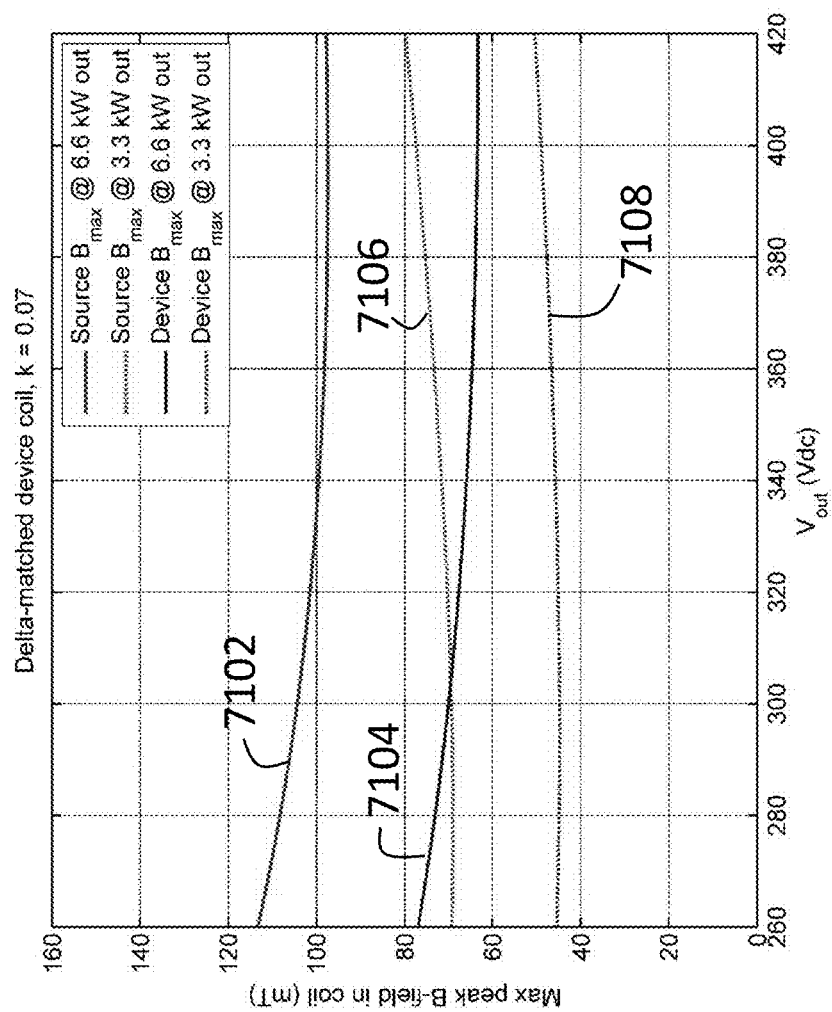
FIG. 71 is a plot of the magnetic field in a magnetic member as a function of output voltage.

FIG. 71 is a plot showing the magnetic field in the ferrite magnetic member as a function of output voltage for a wireless power transfer system with an optimized device impedance matching network having a coupling value k=0.07 between source and receiver resonators. Curves 7102 and 7104 show the magnetic field in the magnetic member of the source resonator at 6.6 kW and 3.3 kW power output, respectively. Curves 7106 and 7108 show the magnetic field in the magnetic member of the device's receiver resonator at 6.6 kW and 3.3 kW power output, respectively.

Figure 72:
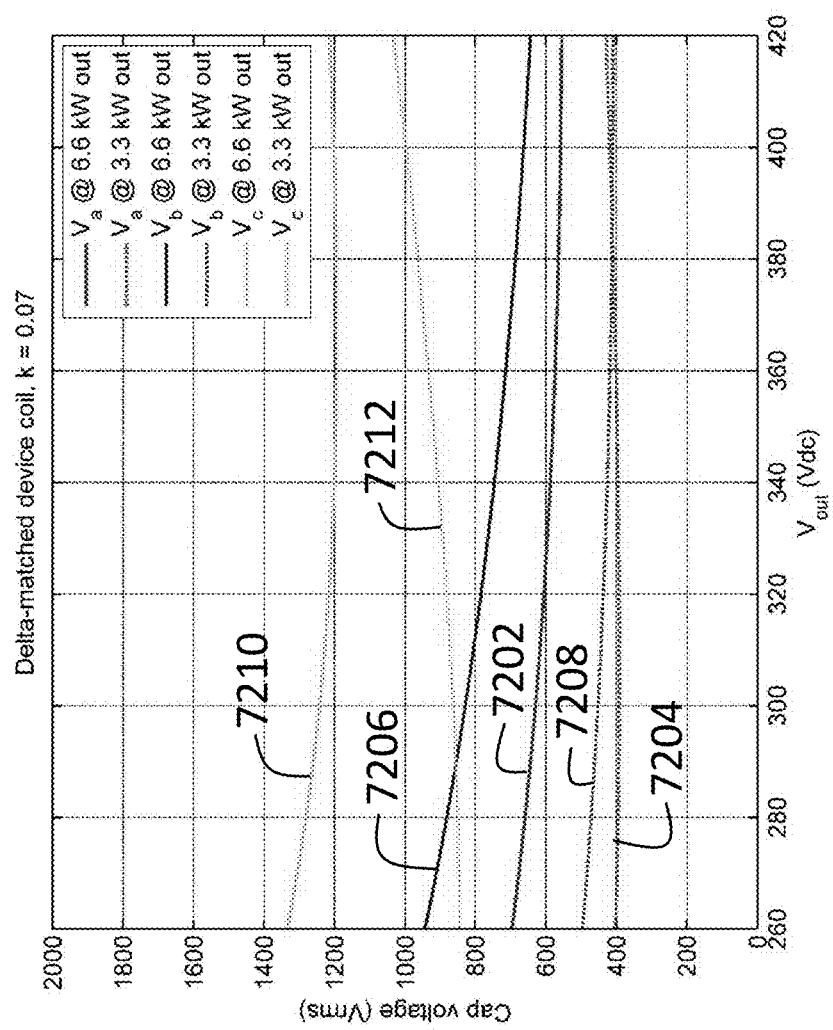
FIG. 72 is a plot of voltages across capacitors in an impedance matching network as a function of output voltage.

FIG. 72 is a plot showing voltages across the capacitors as a function of output voltage for a wireless power transfer system with an optimized device impedance matching network having a coupling value k=0.07 between source and receiver resonators. Curves 7202 and 7204 show the voltages across $C_a$ at 6.6 kW and 3.3 kW output power, respectively. Curves 7206 and 7208 show the voltages across $C_b$ at 6.6 kW and 3.3 kW output power, respectively. Curves 7210 and 7212 show the voltages across $C_c$ at 6.6 kW and 3.3 kW output power, respectively.

Figure 73:
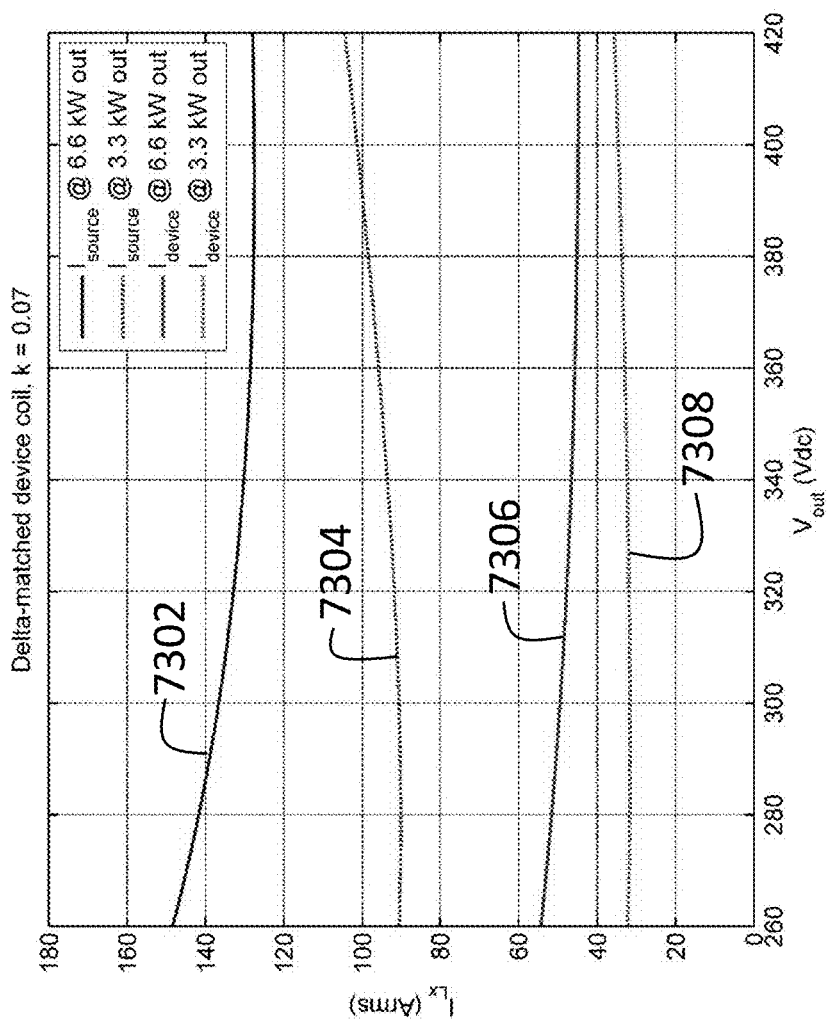
FIG. 73 is a plot of electrical current through the source and device resonator coils as a function of output voltage.

FIG. 73 is a plot showing the electrical current through the source resonator coil and the device's receiver resonator coil as a function of output voltage for a wireless power transfer system with an optimized device impedance matching network having a coupling value k=0.07 between source and receiver resonators. Curves 7302 and 7304 show the current through the source resonator coil at 6.6 kW and 3.3 kW output power, respectively. Curves 7306 and 7308 show the current through the device's receiver resonator coil at 6.6 kW and 3.3 kW output power, respectively.

Additional Resonator Configurations

Figure 42:
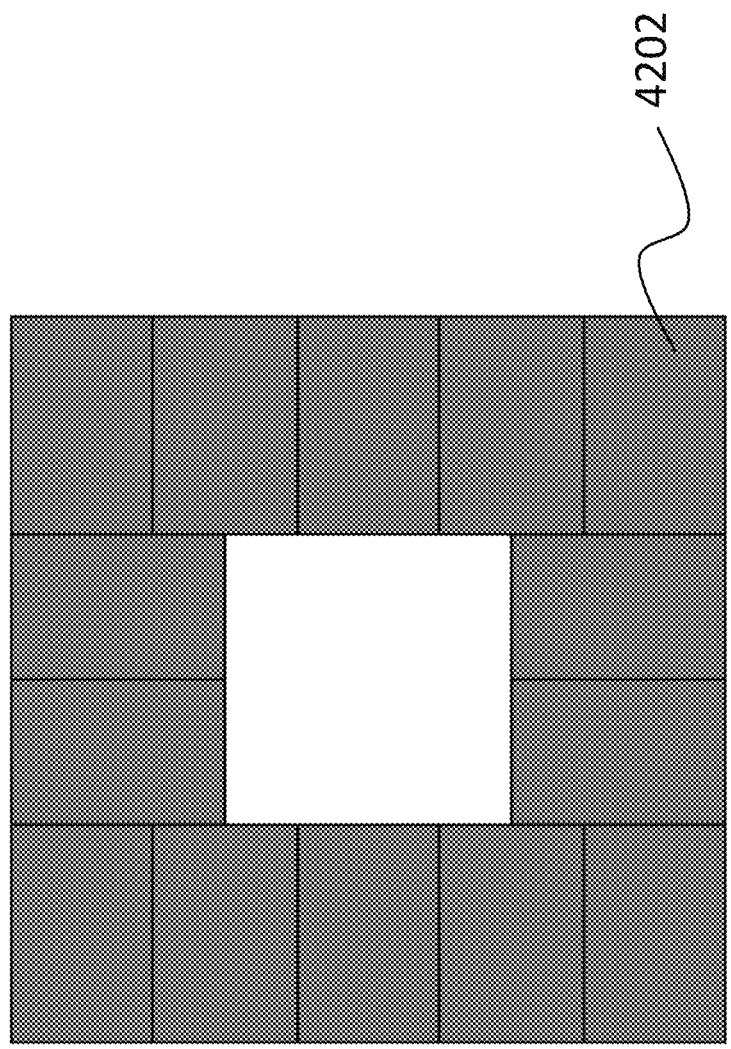
FIG. 42 is a schematic diagram showing an embodiment of a magnetic member.

FIG. 42 is a schematic diagram showing an embodiment of a magnetic member formed from an array of tiles 4202 of magnetic material (e.g., ferrite). In some embodiments, the ferrite tiles 4202 can have dimensions of about 150 mm by 100 mm, and a thickness of about 5 mm or 8 mm or greater. In certain embodiments, the ferrite tiles 4202 can be arranged such that there are equal gaps of about 0.4 mm between adjacent tiles. In some embodiments, the maximum dimensions of the magnetic member can be approximately 500 mm by 500 mm.

Figure 43:
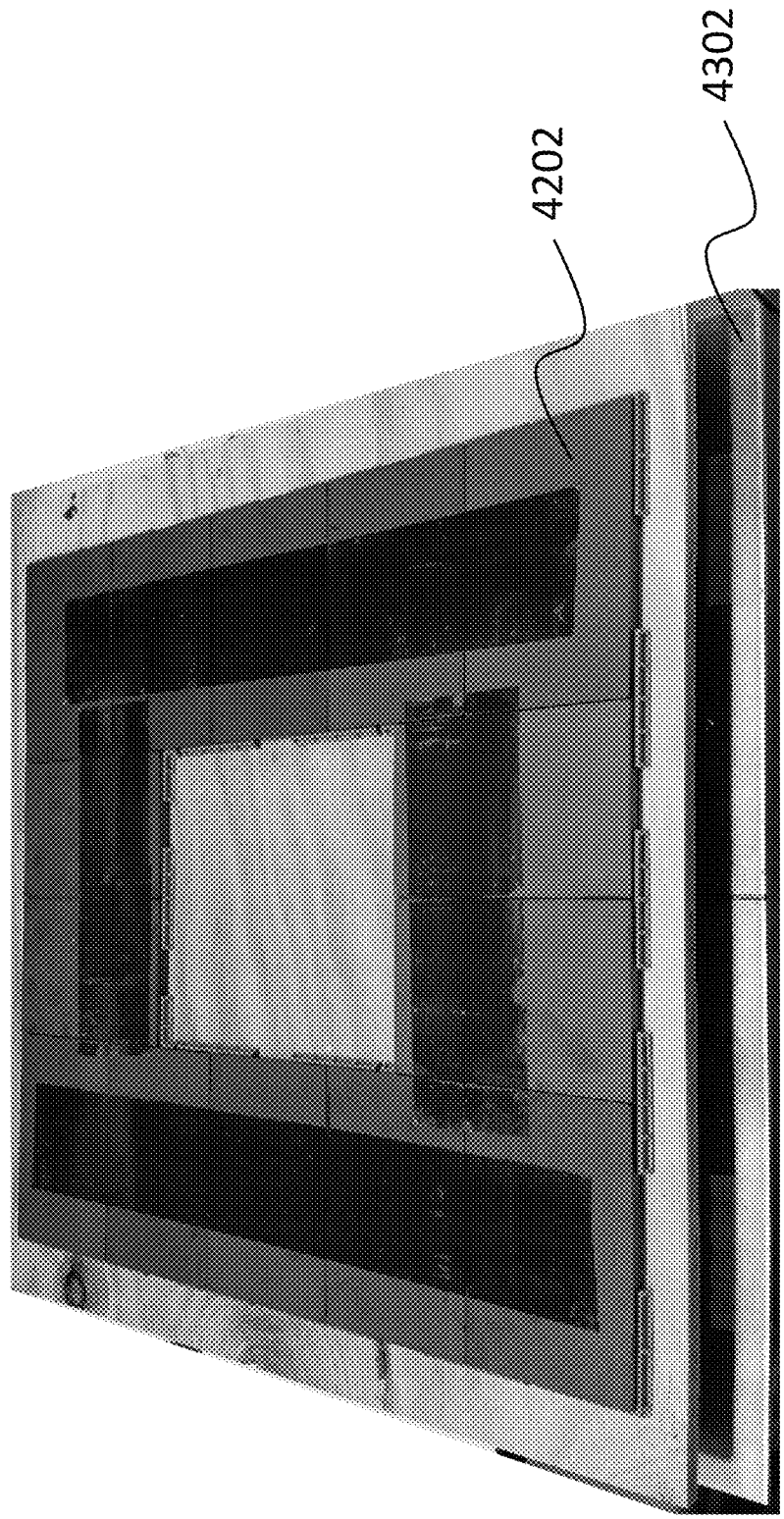
FIG. 43 is an image of an embodiment of a resonator.

In general, the central region of the magnetic member can be left empty (as in FIG. 42) or filled with additional magnetic material. In some embodiments, the magnetic member can be spaced from an aluminum shield 4302 by about 40 mm in a resonator, as shown in FIG. 43. The magnetic member shown in FIGS. 42 and 43 is typically used in a source resonator.

Figure 44:
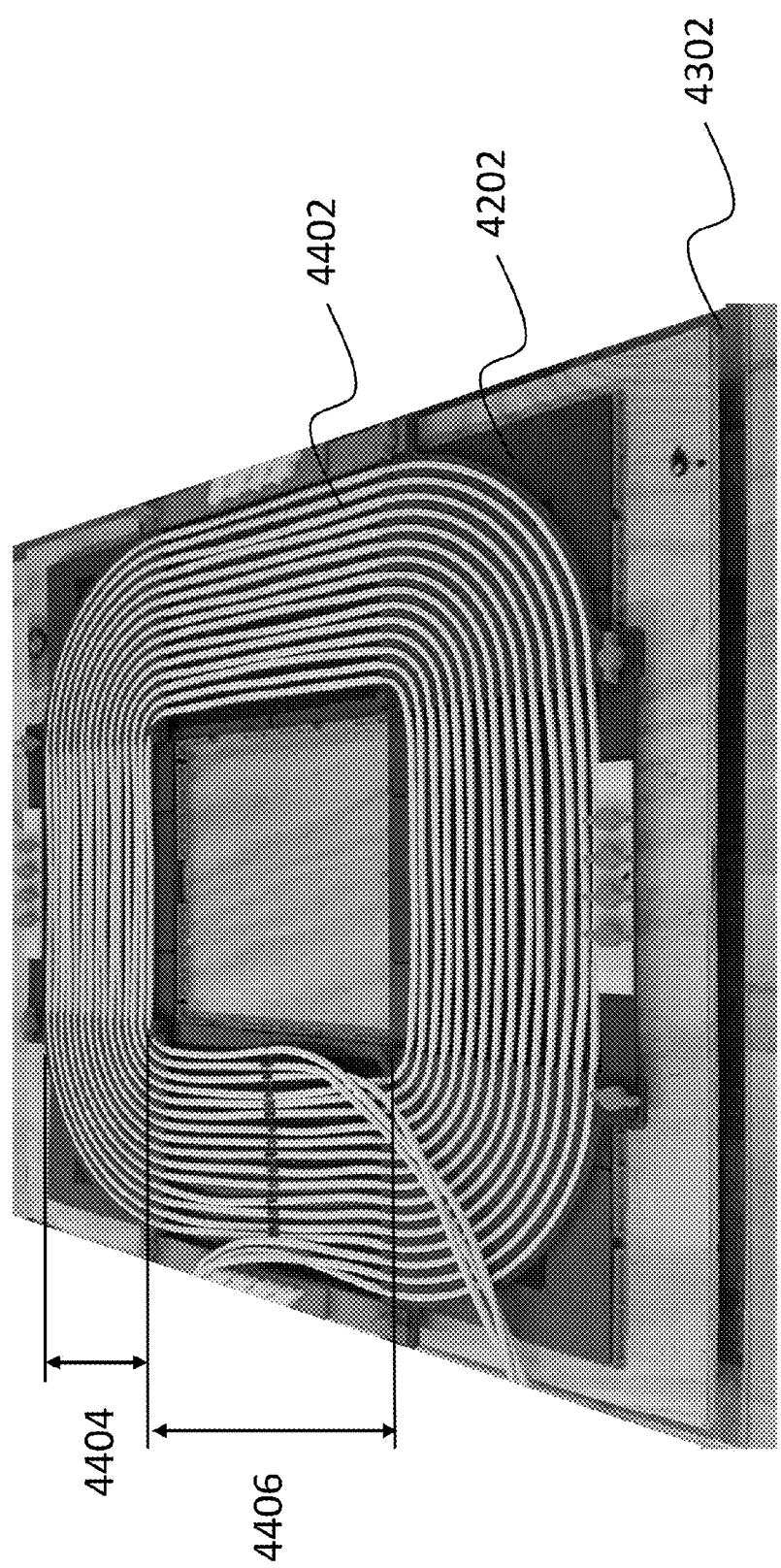
FIG. 44 is an image of an embodiment of a source resonator coil affixed to a magnetic member.

FIG. 44 shows an image of an embodiment of a source resonator coil 4402 affixed to a magnetic member 4202 positioned over, and spaced from, an aluminum shield 4302. In FIG. 44, the source resonator coil has similar outer dimensions to those of the magnetic member (i.e., about 500 mm×500 mm), the resonator coil windings span 4404 is approximately 130 mm, and the coil windings have an inner dimension 406 of approximately 240 mm square.

In general, higher resonator Q values can be achieved by winding multiple resonator coils in parallel within a resonator. In FIG. 44, three coils are wound in parallel with a minimum of 5 loops in each coil to achieve a targeted inductance value.

Figure 45B:
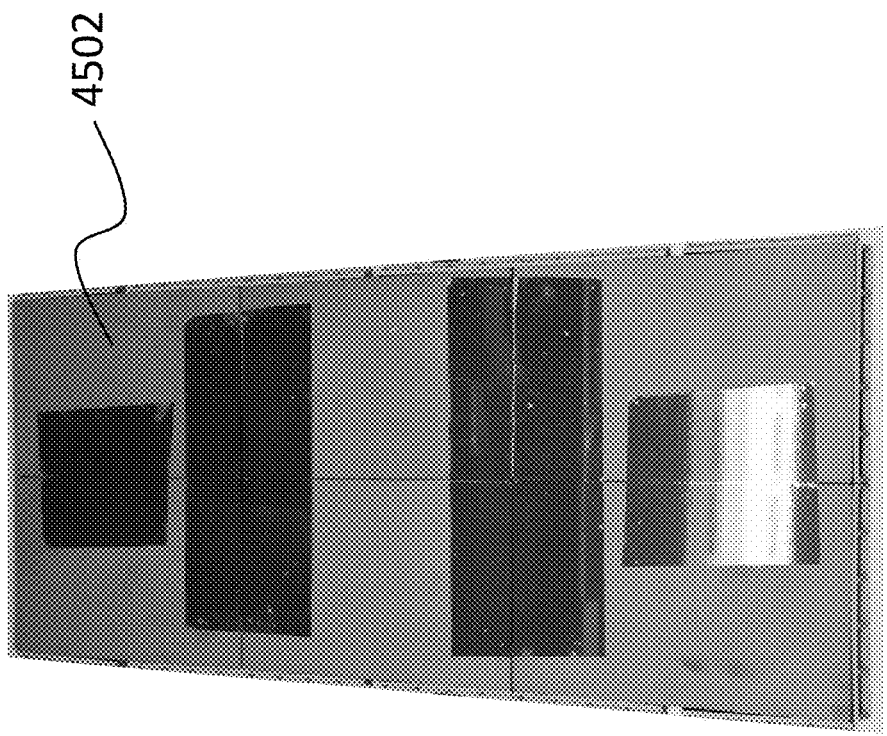
FIG. 45B is an image of an embodiment of a magnetic member.
Figure 45A:
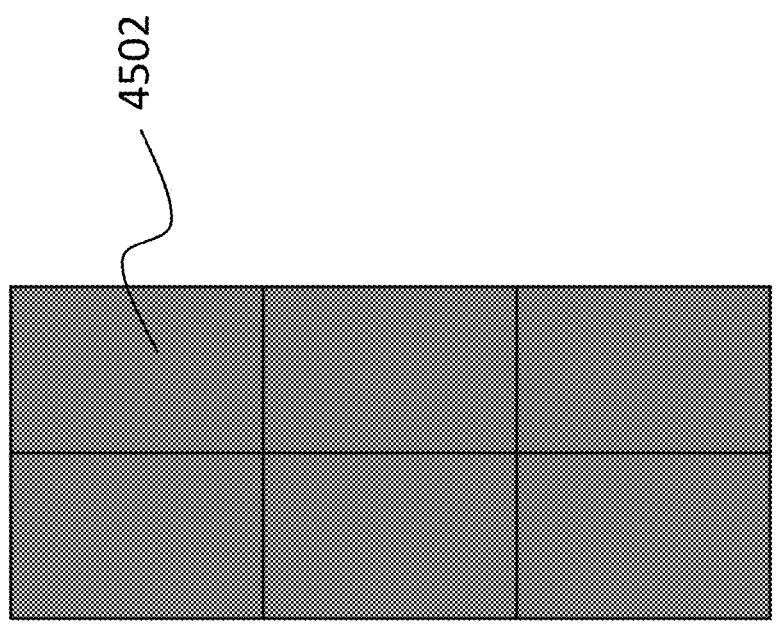
FIG. 45A is a schematic diagram of an embodiment of a magnetic member.

FIGS. 45A and 45B are a schematic diagram and an image, respectively, that show an embodiment of a magnetic member formed from an array of ferrite tiles 4502. In some embodiments, the ferrite tiles 4502 can have dimensions of about 150 mm by 100 mm, with a thickness of about 5 mm or 8 mm or greater. In certain embodiments, the ferrite tiles 4502 can be arranged such that there are equal gaps of about 0.4 mm between the tiles. In some embodiments, the maximum dimensions of the magnetic member can be approximately 200 mm by 450 mm. The magnetic member shown in FIGS. 45A and 45B is typically used in a device's receiver resonator.

Figure 46:
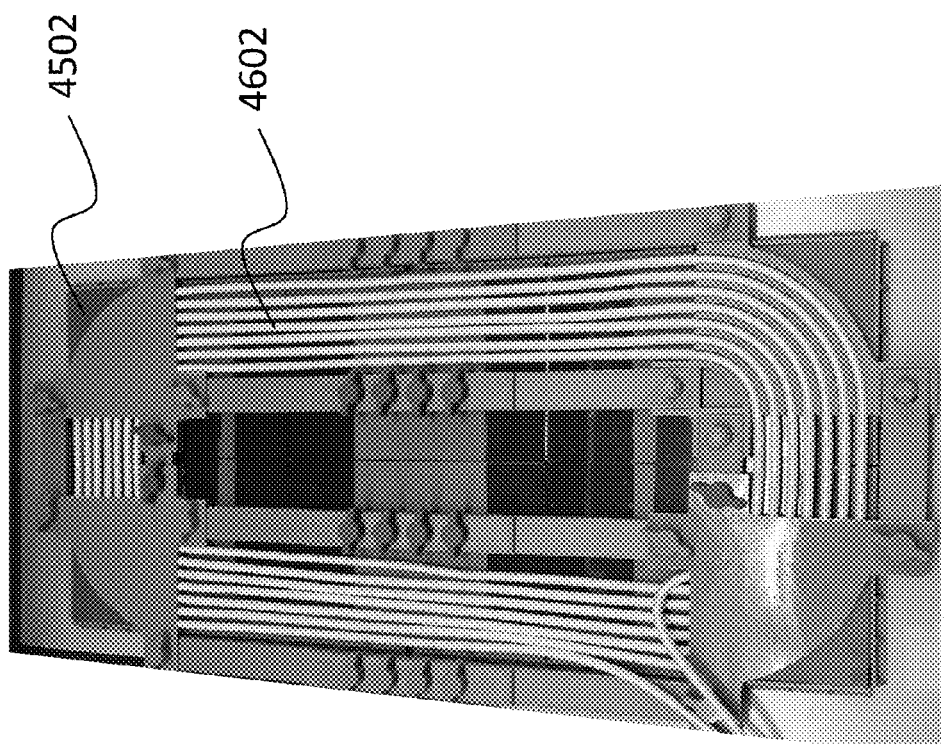
FIG. 46 is an image of an embodiment of a device receiver resonator coil.

FIG. 46 is an image of an embodiment of a device receiver resonator coil 4602 affixed to a magnetic member 4502. In FIG. 46, the device receiver resonator coil has similar outer dimensions to the magnetic member shown in FIG. 42 (i.e., about 200 mm by 450 mm). The receiver resonator coil in FIG. 42 includes a single wire that forms seven loops on the surface of the magnetic member of FIG. 45. The inductance of the receiver resonator coil 4602 is approximately 33.1 µH and its quality factor is approximately 591.

Figure 47B:
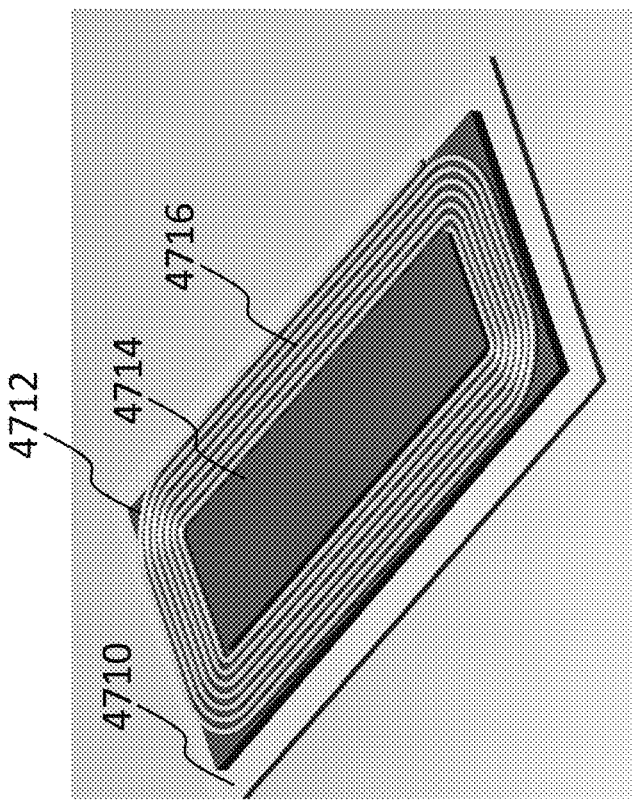
FIG. 47B is a schematic diagram of an embodiment of a device resonator coil.
Figure 47A:
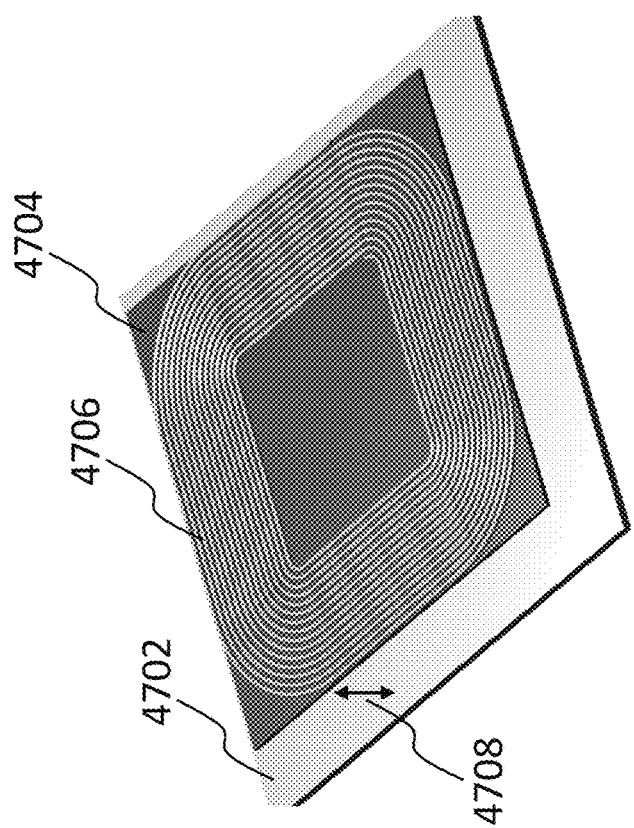
FIG. 47A is a schematic diagram of an embodiment of a source resonator coil.

FIG. 47A is a schematic diagram of an embodiment of a source resonator coil 4706 affixed to a magnetic member 4704. In some embodiments, for example, magnetic member 4704 can have dimensions of about 50 cm by 50 cm, and a thickness of about 5 mm, about 8 mm, or greater. Coil 4706 and magnetic member 4704 are positioned over, and spaced from, a shield 4702. In certain embodiments, for example, shield 4702 is formed from a conductive material such as aluminum, and has dimensions of about 60 cm by 60 cm). In some embodiments, gap 4708 between magnetic member 4704 and shield 4702 can be about 50 mm. In certain embodiments, the inductance of coil 4706 can be about 19.9 µH and its quality factor can be about 1150. In certain embodiments, coil 4706 can include at least three sets of coil windings wound in parallel, each formed from a different wire or conductive material. The windings can be connected in parallel to yield a high-Q resonator coil. As an example, each coil winding can include at least five loops to achieve the target inductance.

FIG. 47B is a schematic diagram showing an embodiment of a device receiver resonator coil 4716 affixed to magnetic member 4712. In some embodiments, magnetic member 4712 can have dimensions of about 45 cm by 20 cm, and a thickness of about 5 mm, about 8 mm, or greater. In certain embodiments, a central region of magnetic member 4712 can be stepped such that it protrudes into the region internal to coil 4716, as shown in FIG. 5B. In some embodiments, the thickness of the magnetic material in the center of the resonator coil can be less than the thickness of the magnetic material elsewhere.

Coil 4716 and magnetic member 4712 are affixed to a shield 4710 formed of conductive material (e.g., aluminum) and having dimensions of, for example, about 50 cm by 25 cm. In some embodiments, the inductance of coil 4716 can be 33.3 µH and its quality factor can be about 443.

For the source and device resonators shown in FIGS. 47A and 47B, coupling k values for a maximum relative offset of (X,Y,Z)=(10,10,15) between the coils can be: for a source resonator affixed to magnetic member of 5 mm thickness, k=0.0707; and for a source resonator affixed to magnetic member of 8 mm thickness, k=0.0710.

Figure 48B:
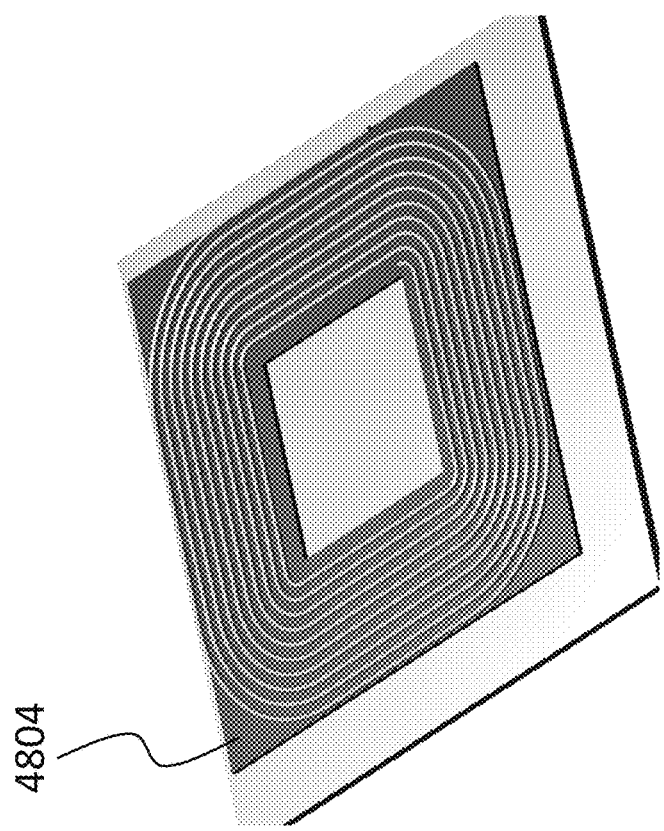
FIGS. 48A and 48B are schematic diagrams of embodiments of source resonator coils affixed to magnetic members.
Figure 48A:
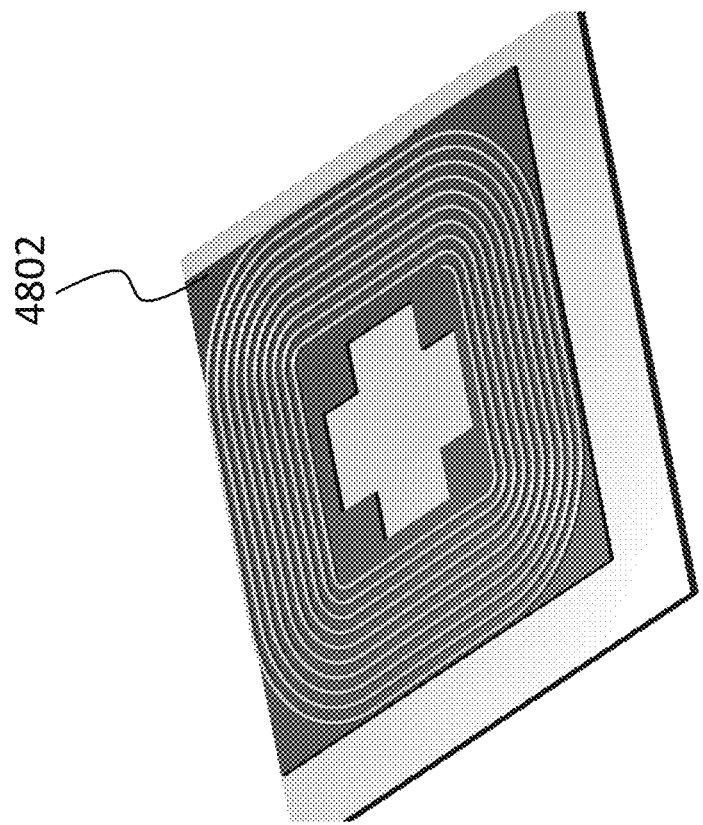

FIG. 48A is a schematic diagram showing an embodiment of a source resonator affixed to a magnetic member 4802 formed from ferrite tiles with dimensions of about 10 cm by 10 cm in each corner, and tiles with dimensions of about 15 cm by 10 cm outside the corners. The quality factor of this resonator is approximately 1220.

FIG. 48B is a schematic diagram showing an embodiment of a source resonator affixed to a magnetic member 4804 formed from ferrite tiles with dimensions of about 15 cm by 10 cm. The quality factor of this resonator is approximately 1050.

Resonator Coils with Parallel Windings

Figure 49:
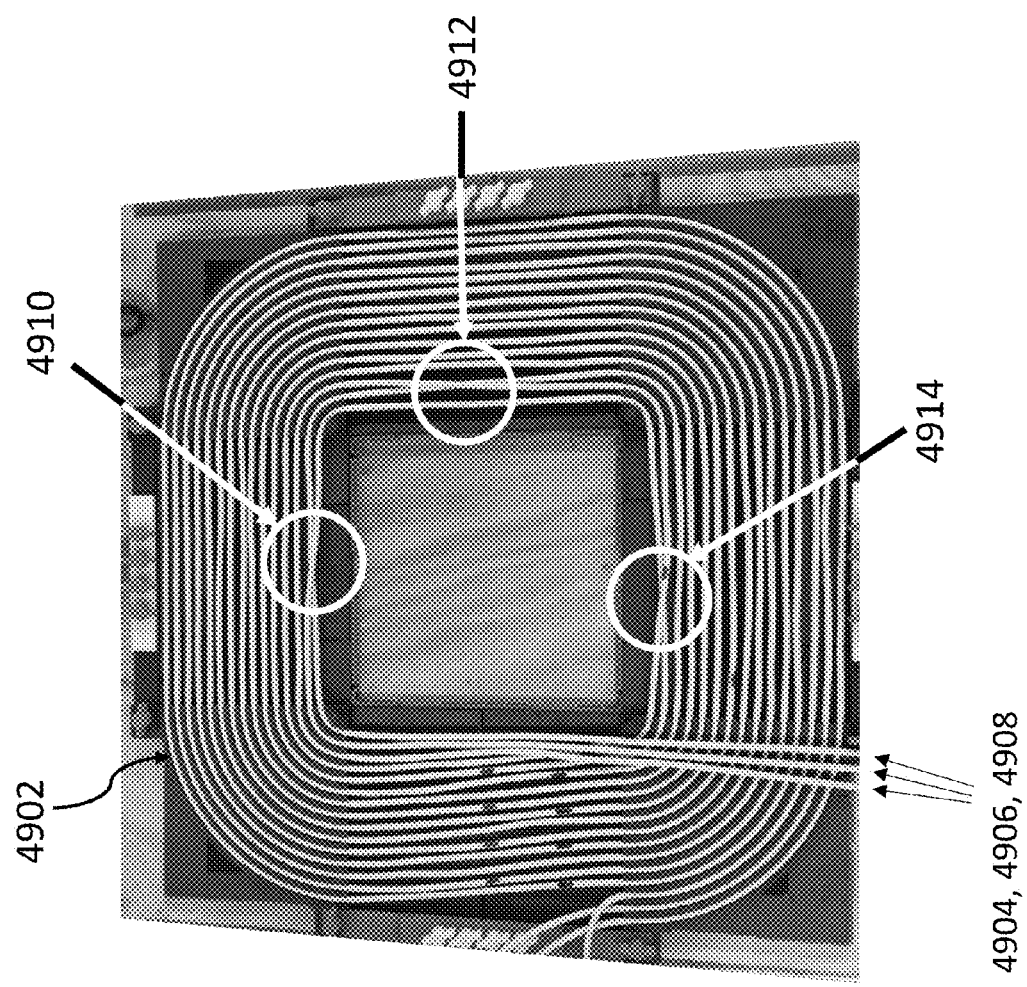
FIG. 49 is an image of an embodiment of a resonator coil with parallel windings.

FIG. 49 is an image showing an embodiment of a source resonator 4902 that includes three parallel windings 4904, 4906, and 4908 that are wound in a coil shape and electrically connected in parallel over a magnetic member. In embodiments, windings may be electrically connected in parallel instead of series in order to reduce the overall voltage that can occur across the coil. While three windings are shown in FIG. 49, more generally any number of windings can wound in parallel to form a coil and electrically connected in parallel. The windings can have the same or different wire diameters, and the overall shape of the coil formed by the parallel windings can be any of the different shapes disclosed herein. For purposes of this disclosure, two sets of loops—each corresponding to a coil winding—are physically "parallel" if the sets of loops have complementary and corresponding shapes, and the distance between the conductive material forming one set of loops and the conductive material forming the other set of loops is the same between corresponding portions of the sets of loops along 80% or more of the lengths of the conductive materials. Two windings may be considered to be physically parallel if the magnetic coupling between the loops of the two windings is greater than 90%. In some embodiments, sets of parallel loops are frequently interleaved such that corresponding portions of the conductors that form the loops are parallel to one another.

In some embodiments, where a coil includes multiple parallel sets of loops (e.g., windings), excess current can flow in the innermost coil winding. This can occur, for example, because the innermost winding typically has a shorter overall length within the coil than middle and outer windings. This is due to the geometry of the windings within the coil—the innermost winding, because it typically has a smaller average loop diameter than the other windings, has a shorter total length, and therefore a smaller total resistance and inductance than the other windings. As a result, excess current can flow in the innermost coil winding relative to the other windings. More generally, because each winding is typically of a different length, the currents that flow in each of the windings are different, and some (or even all) of these may exceed design specifications and/or safety guidelines.

In general, excess current in any one coil winding may result in decreased efficiency during wireless power transfer due to greater heat dissipation in the winding with excess current. Typically, heat dissipation increases proportionally with the square of current flow in each parallelized coil winding. In this section, various methods for balancing currents in multiple parallel windings are disclosed. The general objective underlying these methods is to control current flow in multiple coil windings so that the actual currents that flow in the windings are equal to a predetermined or selected distribution of currents, within an acceptable tolerance range. Typically, the predetermined distribution of currents is expressed as a percentage of total current flow through the windings that make up the coil. For example, for a coil that includes three parallel windings, the predetermined distribution of current can correspond to 33.3% (i.e., one third) of the total current carried by the coil flowing through each winding.

In some embodiments, the predetermined current distribution corresponds to an equal partitioning of the total current among the windings. Thus, for a coil with four parallel windings for example, the predetermined current distribution corresponds to a partitioning of 25% of the total coil current carried by each of the four windings.

In certain embodiments, the predetermined distribution does not correspond to an equal partitioning of currents among the windings. To achieve certain functionality, for example, it can be advantageous to partition the total coil current unequally among the coil's parallel windings. The methods and systems disclosed herein can be used flexibly to achieve both equal and non-equal predetermined current distributions among parallel windings of a coil.

In some embodiments, to balance (i.e., nominally equalize) the currents in each coil winding, coil windings may be twisted "crossed-over" with one another. FIG. 49 shows three such twists at locations 4910, 4912, and 4914. The coil windings are crossed in the following manner: at location 4910, winding 4908 is crossed with winding 4906; at location 4912, winding 4908 is crossed with winding 4904; and at location 4914, winding 4906 is crossed with winding 4904. In some embodiments, three such twists may be sufficient to approximately balance currents throughout the coil. More generally, however, the windings of the three coils may be crossed or twisted throughout the coil (e.g., include any number of crossings or twists) to further balance the current in the windings as well as to ensure that each wire is of similar length. In some embodiments, for a coil with three coil windings, such as 4904, 4906, and 4908 in FIG. 49, the twists in the windings may each be separated by a ⅓ of the distance around the coil. More generally, for a coil with n coil windings, the windings can be spaced by 1/n of the total length of a single winding loop, measured along the loop.

Typically, the crossings between the windings are used to approximately equalize the lengths of the windings. By equalizing the winding lengths, each winding has a similar resistance and inductance value, and therefore, an approximately equal portion of the total coil current flows through each of the windings.

Figure 50:
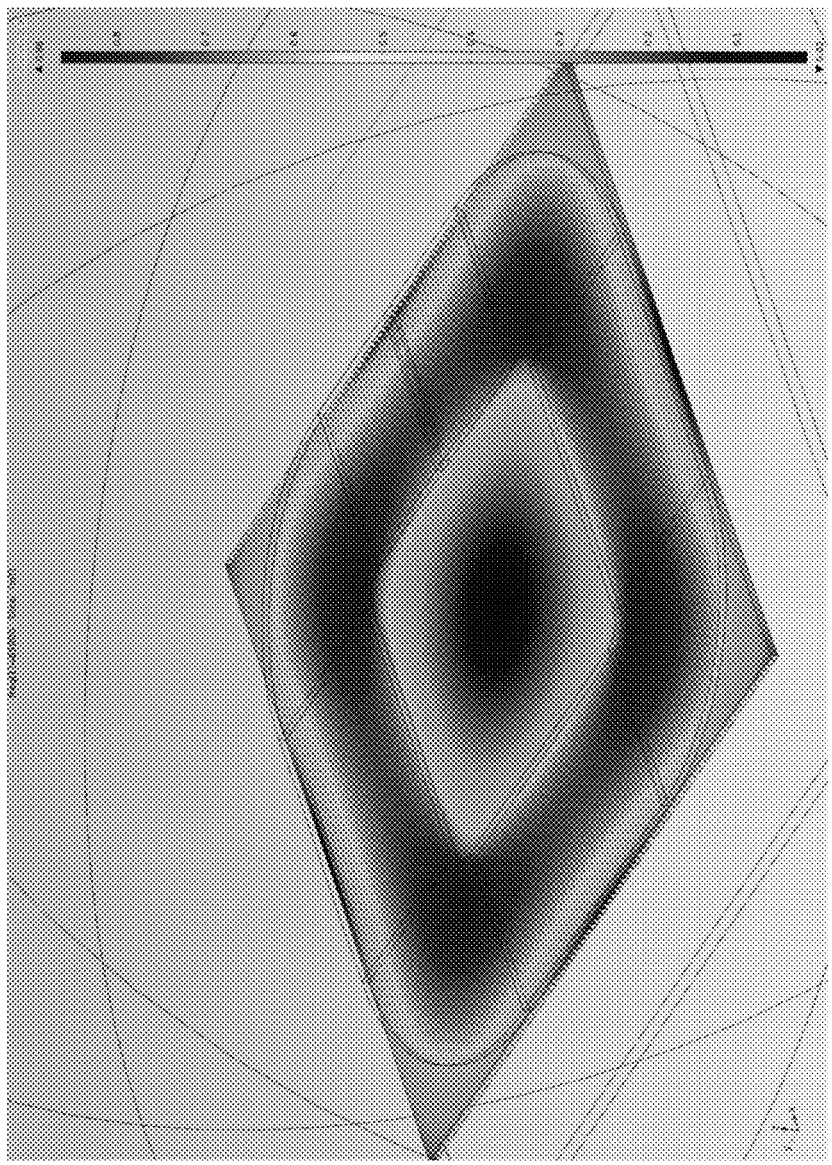
FIG. 50 is a plot of the magnetic field in the magnetic member of a source resonator.

FIG. 50 is a plot showing the magnetic field in the magnetic member of a source resonator (such as the source resonator shown in FIG. 47A). In FIG. 50, the magnetic member is formed of ferrite of 5 mm thickness. The maximum magnetic field is 170 mT at 198 A of current.

Figure 51:
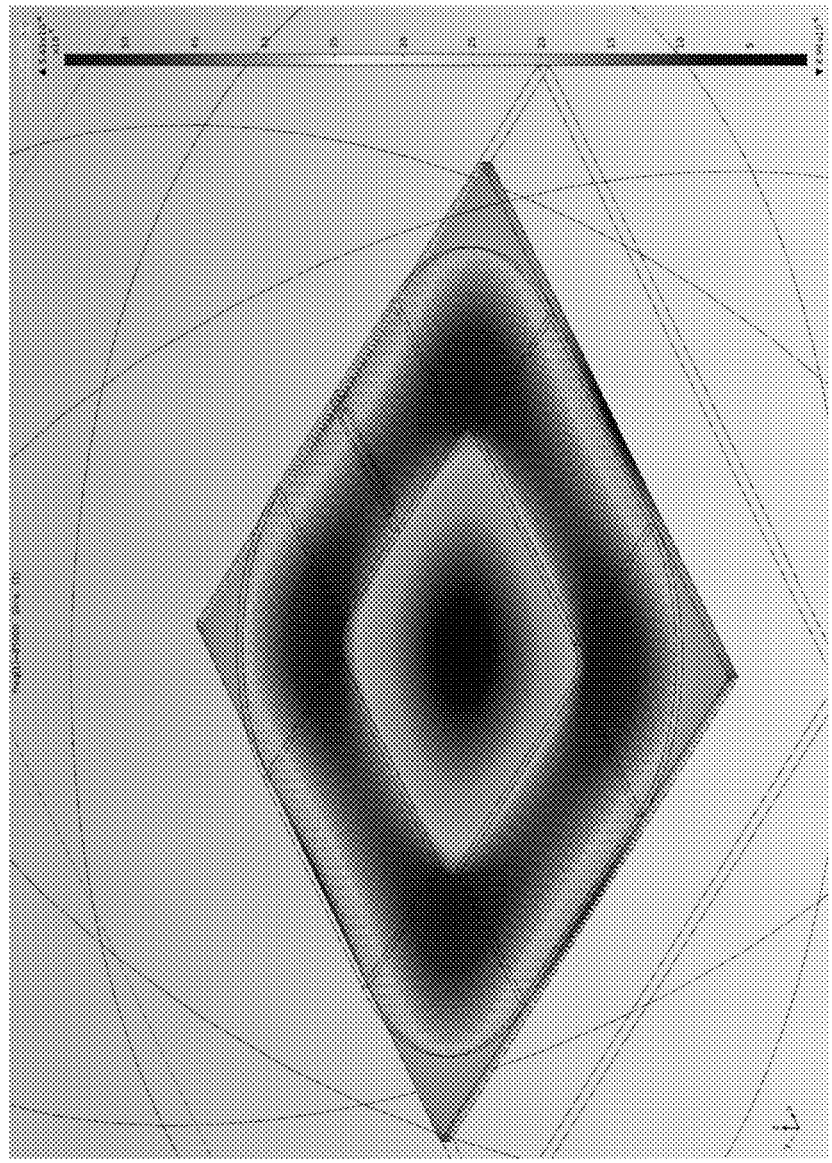
FIG. 51 is a plot of the magnetic field in the magnetic member of a source resonator.

FIG. 51 is a plot showing the magnetic field in the magnetic member of a source resonator (such as the source resonator shown in FIG. 47A). In FIG. 51, the magnetic member is formed of ferrite of 8 mm thickness. The maximum magnetic field is 107 mT at 198 A of current.

Figure 52:
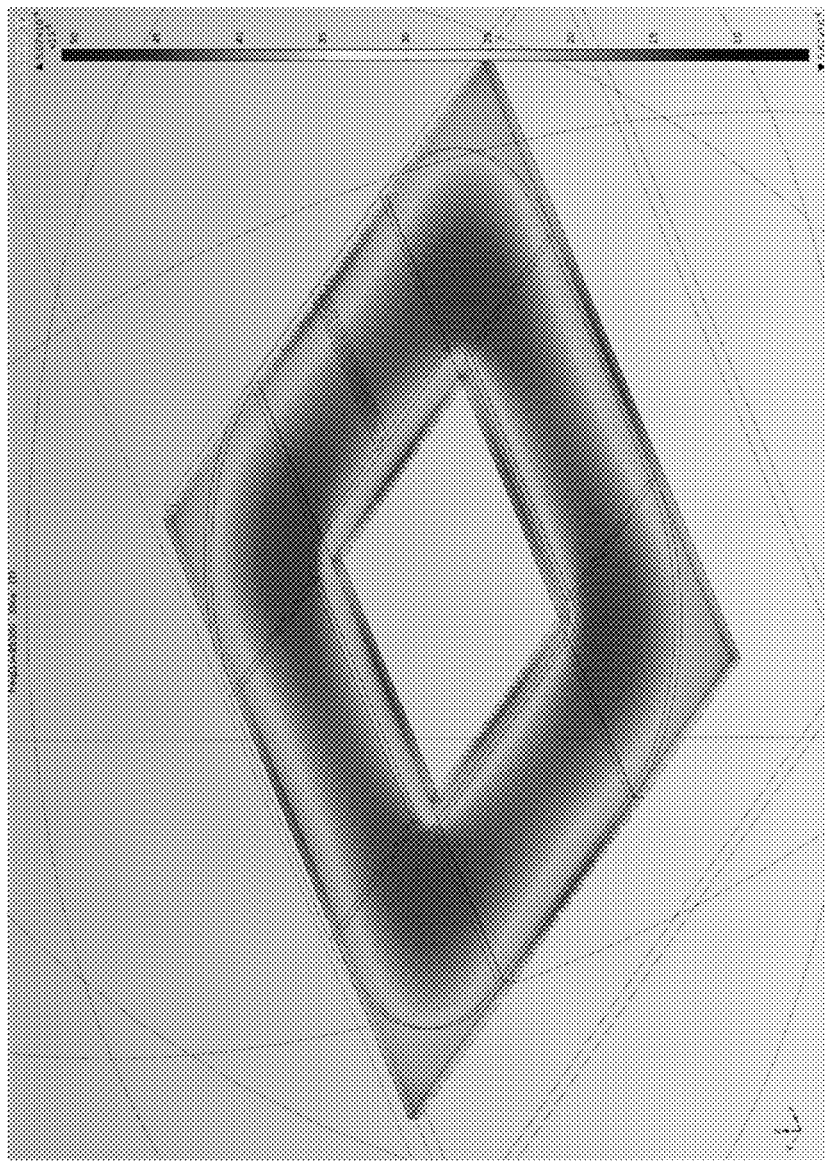
FIG. 52 is a plot of the magnetic field in the magnetic member of a source resonator.

FIG. 52 is a plot showing the magnetic field in the magnetic member of a source resonator (such as the source resonator shown in FIG. 47A). In FIG. 52, the magnetic member is formed from ferrite tiles of dimension 15 cm by 10 cm by 8 mm. The maximum magnetic field is 101 mT at 198 A of current.

Figure 53:
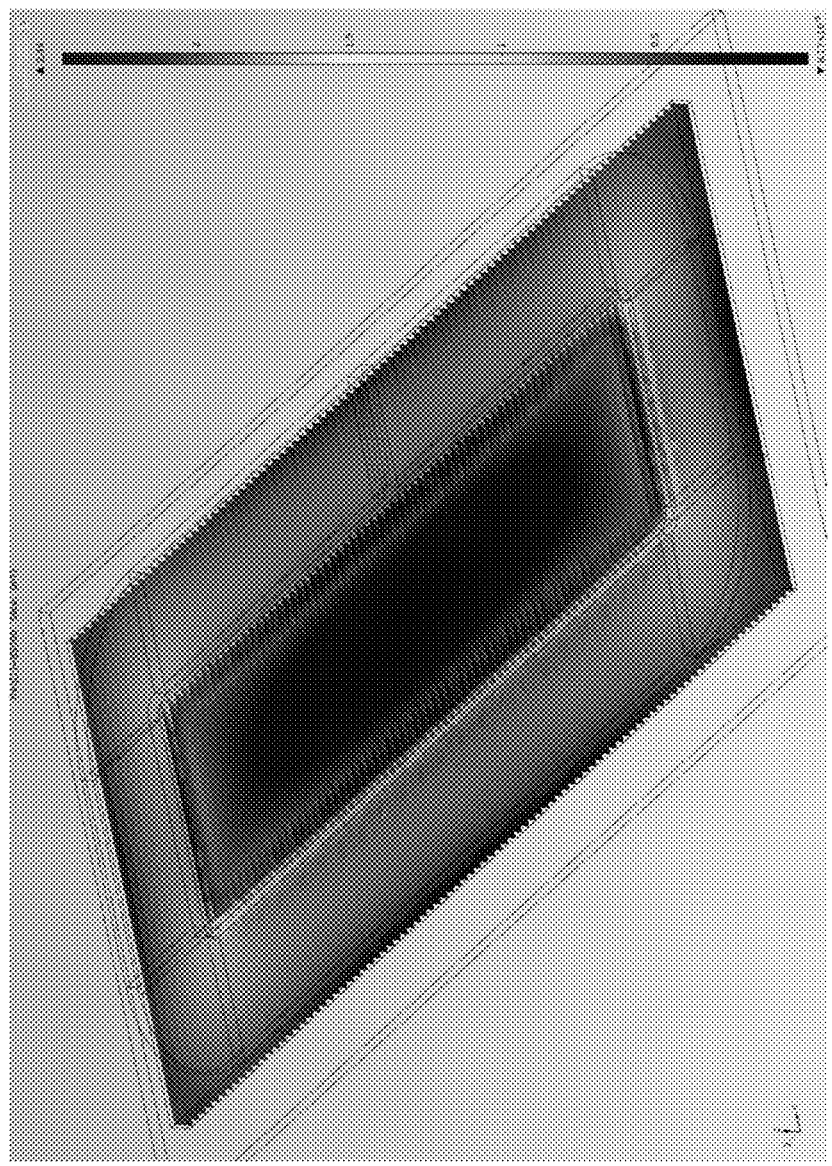
FIG. 53 is a plot of the magnetic field in the magnetic member of a device resonator.

FIG. 53 is a plot showing the magnetic field in the magnetic member of a device resonator (such as the device resonator shown in FIG. 47B). In FIG. 53, the magnetic member is formed of ferrite of thickness 8 mm.

Figure 54B:
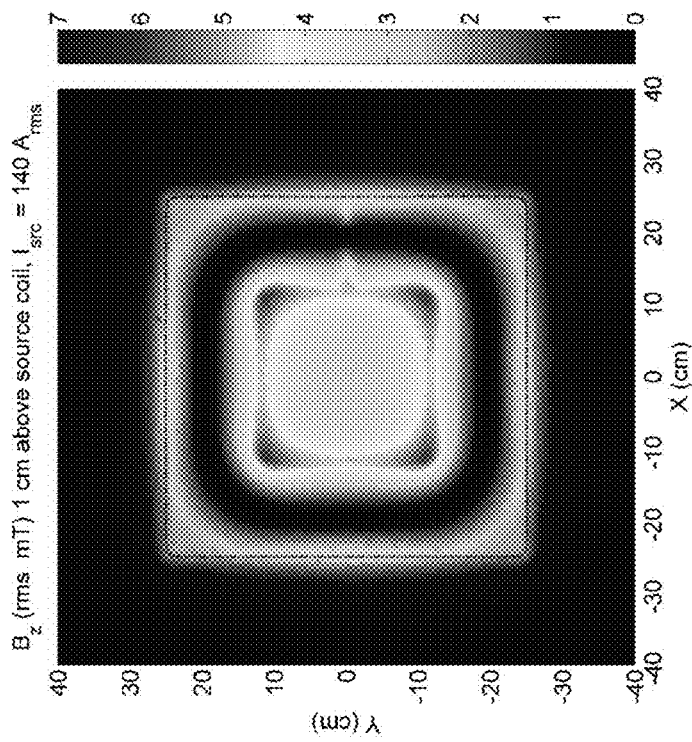
FIGS. 54A and 54B are plots of the magnetic field above a source resonator.
Figure 54A:
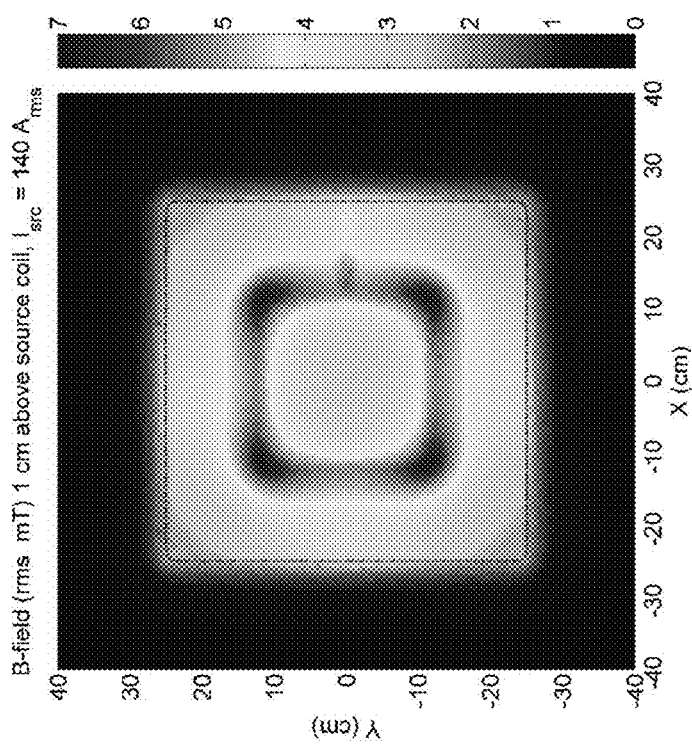
Figure 55:
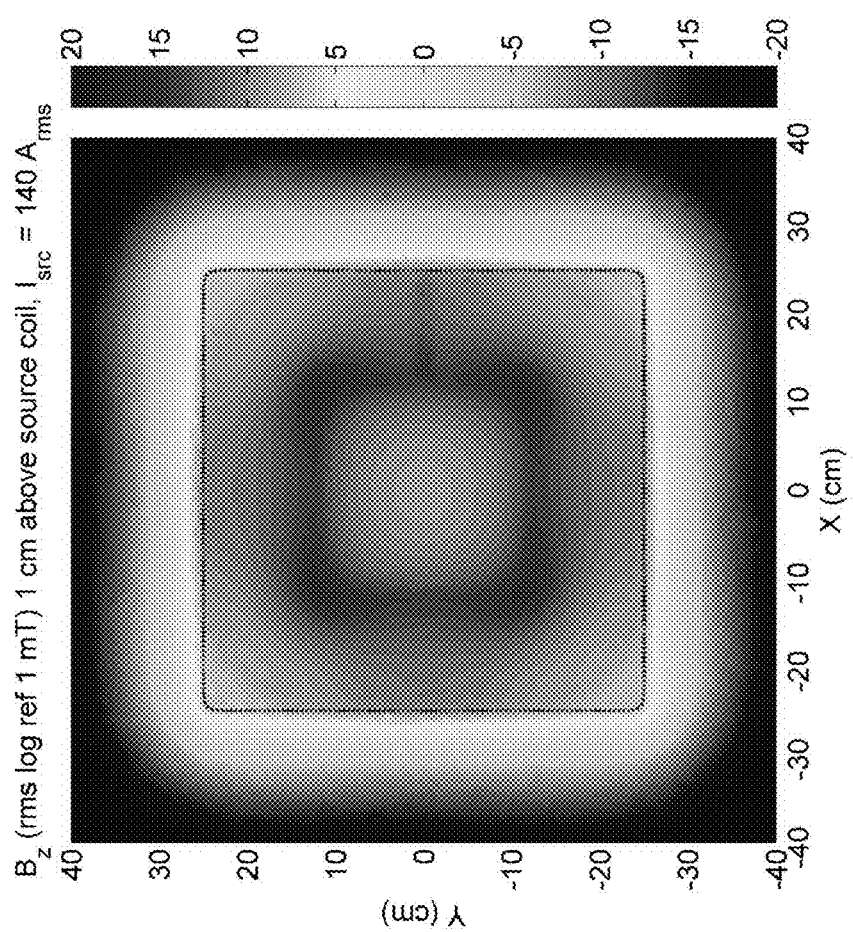
FIG. 55 is a plot of the magnetic field of FIGS. 54A and 54B on a logarithmic scale.

FIGS. 54A and 54B are plots showing the magnetic field at a distance of 1 cm above a source resonator having the configuration shown in FIG. 47A. FIG. 55 is a plot showing the magnetic field at a distance of 1 cm above a source resonator having the configuration shown in FIG. 47A, plotted on a logarithmic scale.

Figure 56:
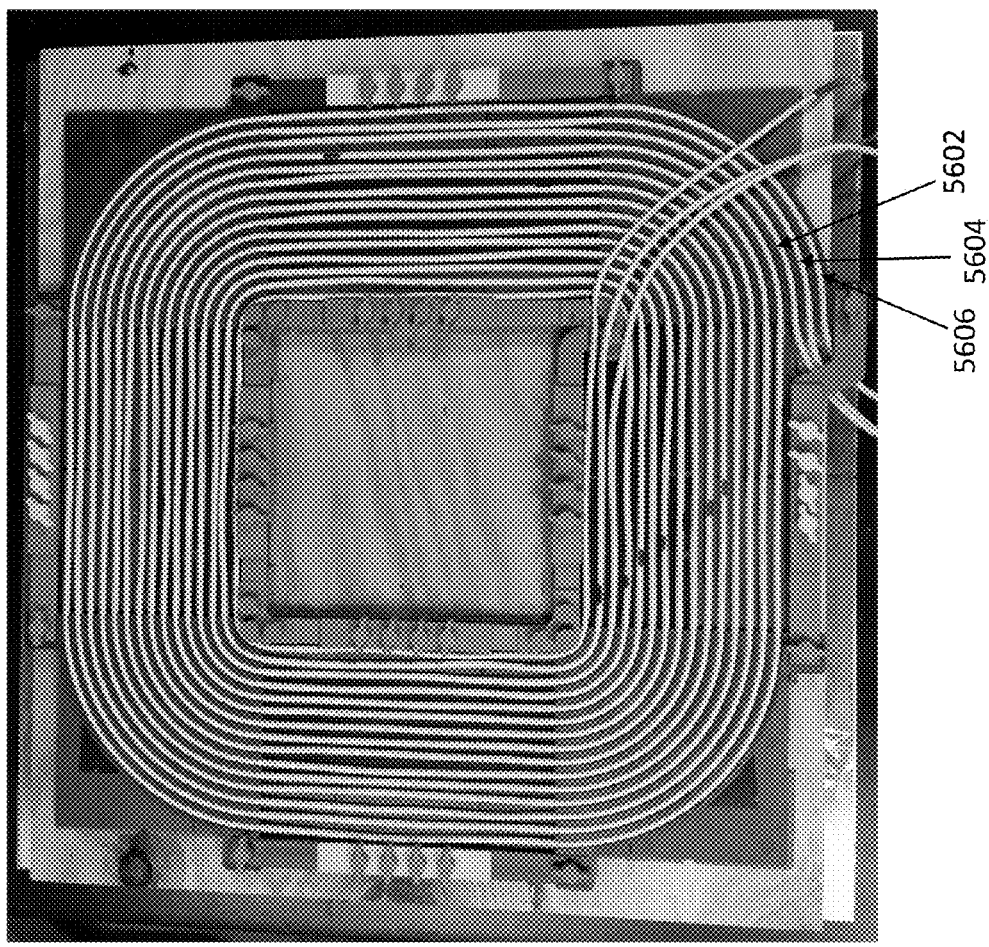
FIG. 56 is an image of a coil with parallel windings.

As discussed above, in some embodiments, currents in parallel windings that form a resonator coil can be balanced by crossing the windings (e.g., using twists) at points along the length of the windings. Other methods can also be used to balance currents in multiple parallel coil windings. In particular, referring to FIG. 56 for example, the currents in each of the parallel windings 5602, 5604, 5606 can be balanced using one or more inductors. FIGS. 57A and 57B show schematic circuit diagrams of a set of inductors 5702, 5704, 5706 connected in series and used to balance currents in a resonator coil with parallel windings 5602, 5604, and 5606. In some embodiments, as shown in FIG. 57B, one or more (or even all) of inductors 5702, 5704, 5706 can be tunable. In general, the series connected inductors add inductance to the respective windings to which they are connected. By adding suitable amounts of inductance to some or all of the windings, the effective inductance of each winding can be adjusted to achieve a predetermined or target current distribution among the various windings of a coil.

To balance currents in the parallel windings 5602, 5604, and 5606 (henceforth referred to as windings 1, 2 and 3, respectively, or as the innermost, middle, and outermost windings, respectively), the inductances of each of the parallel windings can be measured, and inductors 5702, 5704, and 5706 can be adjusted based on the measured inductances to balance currents in the parallel windings. Inductors 5702, 5704, are 5706 may be referred to as $L_1^\Delta$, $L_2^\Delta$ and $L_3^\Delta$, respectively, in the following discussion. In general, a variety of adjustable inductors can be used for inductors 5702, 5704, and 5706. Suitable adjustable inductors are disclosed, for example, in U.S. Patent Application Publication No. 2015/0051750, the entire contents of which are incorporated herein by reference.

The methods discussed below can be performed during the manufacturing phase of a resonator, so that inductors with suitable inductance values can be included in a resonator at time of fabrication. That is, the methods can be performed with the goal of selecting and/or adjusting inductors connected in series with parallel coil windings so that when manufacturing of the resonator is complete, the inductances of the coil windings have been adjusted to achieve a particular predetermined partitioning of the total coil current among the windings. As discussed above, the partitioning can correspond to a nominally equal distribution of current among the windings, but can also correspond to an unequal distribution of current.

The methods can also be performed post-manufacture by an electronic processor that is part of, or connected to, the resonator. The electronic processor can be configured to determine suitable inductance values of adjustable inductors once in a single optimization sequence. Alternatively, the processor can be configured to repeat the steps discussed below multiple times (e.g., at predetermined time intervals and/or in response to a user signal) for purposes such as calibration and re-calibration, in response to changes in the operating environment and/or parameters of a resonator. The discussion below describes various steps that an electronic processor can perform. It should be appreciated that these steps can be performed pre- and/or post-fabrication of a resonator coil, and also that certain steps can be performed during the design phase by a human.

Figure 74:
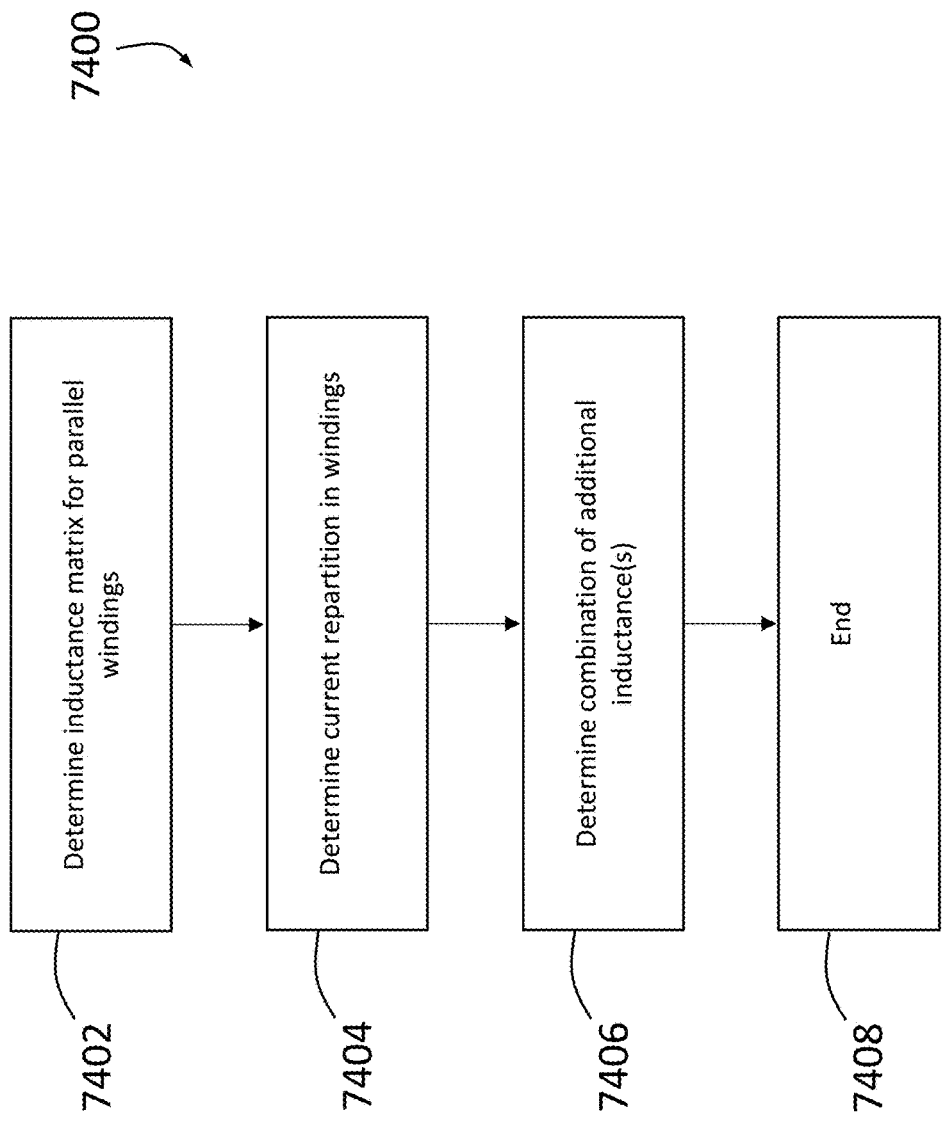
FIG. 74 is a flow chart that includes a series of steps for current partitioning and balancing among parallel windings of a coil.

In wireless power transfer systems, current balancing steps and methods can be performed by one or more electronic processors (e.g., processor 105 and/or 111) during operation of the system. FIG. 74 is a flow chart 7400 that includes a series of steps for balancing currents in parallel windings of a resonator coil. In the discussion of FIG. 74 that follows, the three parallel windings 1, 2, and 3 above are referenced. More generally, however, it should be understood that the methods disclosed herein can be used to balance currents in any number of parallel windings that form a resonator coil.

In a first step 7402, the electronic processor determines the inductance matrix L of the three connected windings, represented by inductance values $L_1$, $L_2$ and $L_3$. In some embodiments, $L_1 < L_2 < L_3$ to accommodate parallel windings in which $L_1$ is the innermost winding, $L_2$ is the middle winding, and $L_3$ is the outermost winding. The components of the inductance matrix L can be obtained directly by measuring the coupling between the windings (e.g., using an inductance sensor connected to the electronic processor, not shown in FIG. 56). The electronic processor is configured to receive coupling (i.e., inductance) measurements from the sensor, and to determine values of the diagonal elements in matrix L based on the measurements. Specifically, the diagonal elements in L correspond to each winding's inductance measured when the other windings are open-circuited by the electronic processor. The other elements $L_{i,j} = L_{j,i}$ are obtained by measuring the inductance $I_{i,j}$ of a connected winding i while short-circuiting connected winding j, since $$l_{i,j} = L_i - \frac{L_{i,j}^2}{L_j} \rightarrow L_{i,j} = \sqrt{L_j(L_i - l_{i,j})}.$$

When a sinusoidal voltage of amplitude V, oscillating at the angular frequency ω, is applied to the windings connected in parallel, the amplitude of the currents flowing in the three windings is determined by:

$$[I_1 \quad I_2 \quad I_3] = \frac{L^{-1}}{\omega} \begin{bmatrix} V \\ V \\ V \end{bmatrix}$$

For example, for $L_1=21.9$ µH, $L_2=23.0$ µH, $L_3=23.7$ µH, $I_{1,2}=5.24$ µH, $I_{1,3}=6.35$ µH and $I_{2,3}=5.61$ µH. In this example, the inductance measurements received by the electronic processor are used by the processor to determine the following inductance matrix:

$$L = \begin{pmatrix} 21.9 & 19.6 & 19.2 \\ 19.6 & 23.0 & 20.3 \\ 19.2 & 20.3 & 23.7 \end{pmatrix} \mu H.$$

The corresponding current repartition in the presence of a shared voltage V across windings 1, 2, and 3 connected in parallel is:

$$[I_1 \quad I_1 \quad I_3] = (2.35, 1.23, 1.27)\frac{10^4 V}{\omega}$$

This current repartition corresponds to the following relative repartition of the total current among the three windings: (48.45%, 25.36%, 26.19%). Thus, without balancing currents in such a coil, current $I_1$ is nearly twice as large as $I_2$ or $I_3$.

In step 7404, the electronic processor determines the desired or target current repartition among the windings. The target current repartition can be a set of stored values retrieved from a memory or data storage unit, a set of values supplied by a user, or a hard-coded or fixed implementation in circuitry. The target current repartition represents the performance condition that the electronic processor attempts to achieve by adjusting individual inductances coupled to the coil windings. As discussed above, in some embodiments the target repartition corresponds to an equal division of the total current among the windings. This example will be discussed in more detail below. More generally, however, the methods and systems disclosed herein can achieve any target repartition of the total current among the windings.

The electronic processor then determines, in step 7406, the correcting inductances $L_1^\Delta$ and $L_2^\Delta$ to be added in series with respectively $L_1$ and $L_2$ to achieve, e.g., an evenly split current repartition (i.e. $I_1=I_2=I_3$) with the minimum amount of added inductance, before the process ends at step 7408. $L_1^\Delta$ and $L_2^\Delta$ are given by:

$$L_1^\Delta = L_3 - L_1 + L_{2,3} - L_{1,2}$$

$$L_2^\Delta = L_3 - L_2 + L_{1,3} - L_{1,2}$$

In the previous example, this yields $L_1^\Delta = 2.5$ µH and $L_2^\Delta = 0.3$ µH, and the corrected current repartition becomes:

$$[I_1^\Delta \quad I_2^\Delta \quad I_3^\Delta] = \frac{1}{\omega}\left[L + \begin{bmatrix} L_1^\Delta & 0 & 0 \\ 0 & L_2^\Delta & 0 \\ 0 & 0 & 0 \end{bmatrix}\right]^{-1} \begin{bmatrix} V \\ V \\ V \end{bmatrix} = (1.58, 1.58, 1.58)\frac{10^4 V}{\omega}$$

As explained previously, the foregoing discussion of flow chart 7400 involved three windings 1, 2, and 3 and an even current repartition by way of example. More generally, however, the methods for current balancing shown in flow chart 7400 can be applied to coils with any number n of parallel windings, and to target a desired current repartition between these windings. Thus, for a coil with n parallel windings electrically connected in parallel, the following steps can be performed by the electronic processor to balance currents in each of the windings.

First, in step 7402, the electronic processor determines the inductance matrix L of the n windings. The components of L can be obtained directly by measuring the coupling (i.e., inductances) between the windings. The diagonal elements in matrix L are each connected winding's inductance measured when the other windings are open-circuited. The off-diagonal matrix elements $L_{i,j}=L_{j,i}$ are determined by the electronic processor by measuring the inductance $I_{i,j}$ of each winding i while short-circuiting winding j, since $$L_{i,j} = L_i - \frac{L_{i,j}^2}{L_j} \rightarrow L_{i,j} = \sqrt{L_j(L_i - l_{i,j})}.$$

Then, in step 7404, the electronic processor determines the desired or target repartition of the total current among the coil windings. Next, in step 7406, the electronic processor determines appropriate inductance values of the inductors to effect the target current repartition in the n windings from any combination of $L_i^\Delta, \ldots L_n^\Delta$ (i–1 to n) added in series with respect to winding 1 through n. The added inductances $L_i^\Delta$ can be implemented so that they do not couple magnetically with any of the n windings nor with one another. Because there is no cross-coupling, the inductances $L_i^\Delta$ are added along the diagonal of the L matrix, leaving the other elements of L unchanged. The repartition is determined by the electronic processor by computing the inverse matrix:

$$M^\Delta = \left[L + \begin{bmatrix} L_1^\Delta & \cdots & 0 \\ \vdots & \ddots & \vdots \\ 0 & \cdots & L_n^\Delta \end{bmatrix}\right]^{-1}$$

which yields the corresponding current amplitude $I_i^\Delta$ repartition:

$$[I_1^\Delta \quad \ldots \quad I_n^\Delta] = \frac{M^\Delta}{\omega}\begin{bmatrix} V \\ \vdots \\ V \end{bmatrix}$$

where V is the shared voltage across the windings connected in parallel.

The electronic processor determines the combination of inductances $L_1^\Delta, \ldots, L_n^\Delta$ that minimizes the figure of merit:

$$\sum_{i=1}^{n}\left(\frac{I_i^\Delta}{\Sigma I} - \frac{1}{n}\right)^2$$

where $\Sigma I = I_i^\Delta$ for i=1 to n and where n equals the number of connected coils.

In some embodiments, combinations of inductances $L_i^\Delta, \ldots, L_n^\Delta$ that yield approximately equal current repartition in the n windings may be more easily found with the addition of large inductor values. In the absence of other constraints, some large values of $L_i^\Delta, \ldots, L_n^\Delta$ may naturally minimize the figure of merit:

$$\sum_{i=1}^{n}\left(\frac{I_i^\Delta}{\Sigma I}-\frac{1}{n}\right)^2.$$

For example, in certain embodiments, the added inductances $L_1^\Delta, \ldots, L_n^\Delta$ can be much larger than the inductances of the windings. As an example, $L_1^\Delta = \ldots = L_n^\Delta = \infty$ would yield an ideal current repartition among the windings. Similarly, if the added inductances $L_1^\Delta, \ldots, L_n^\Delta$ are much larger than the most inductive winding, a near-perfect current splitting can result. However, this may not be useful from a practical standpoint. For practical reasons, considerations such as space constraints, limiting additional losses, limiting the additional amount of magnetic material, limiting unwanted additional overall inductance, and limiting additional complexity in wireless power transfer systems can be taken into account by the electronic processor during the optimization. For example, the number of windings n may be limited due to the space constraints placed on the overall size of the source resonator coil. In some embodiments, the range of values for $L_1^\Delta, \ldots, L_n^\Delta$ may be constrained to be less than or equal to the scaled inductance of the windings:

$$L_i^\Delta \leq \alpha L_i$$

where $\alpha$ is a scalar between zero and the difference between the maximum inductance of a winding and the minimum inductance of a winding.

In certain embodiments, the number of windings m to which additional inductance is added can be determined by the electronic processor. The number of windings to which additional inductance is added may be limited to be less than or equal to the total number of windings n. In some embodiments, the number of windings m to which additional inductance is added can be determined before optimizing the current distribution over the n windings. In certain embodiments, different combinations of the number of windings m to which additional inductance is added can be iteratively selected during the current distribution optimization.

In some embodiments, if m=n−1, the one winding where no inductor is added is the one that has the largest inductance. Conversely, if m<n−1, inductors can be added to the winding that have the lowest inductance and leave the n−m windings with the largest inductance without additional inductors for current balancing. In certain embodiments, an electronic processor can control the adding of inductors based on changes to the order of inductance of the windings depending on external factors (presence of a device, presence of lossy materials, etc.).

For example, for n=3 windings and m=1, three different optimizations can be performed by the electronic processor, in each optimization setting two of the three inductance values of the additional inductors to zero, as follows:

$L_2^\Delta = L_3^\Delta = 0$ (optimization 1)

$L_1^\Delta = L_3^\Delta = 0$ (optimization 2)

$L_1^\Delta = L_2^\Delta = 0$ (optimization 3)

The electronic processor can optimize the combination of additional inductances ($L_1^\Delta, L_2^\Delta, L_3^\Delta$) that minimizes:

$$\left(\frac{I_1^\Delta}{\Sigma I}-\frac{1}{3}\right)^2+\left(\frac{I_2^\Delta}{\Sigma I}-\frac{1}{3}\right)^2+\left(\frac{I_3^\Delta}{\Sigma I}-\frac{1}{3}\right)^2$$

where $\Sigma I = I_1^\Delta + I_2^\Delta + I_3^\Delta$. This yields three optimized configurations and corresponding current distributions in the three windings. The electronic processor can then compare the three configurations to determine which additional inductor, $L_1^\Delta$, $L_2^\Delta$, or $L_3^\Delta$, yields the best results in terms of current distribution (or another metric).

In some embodiments, as shown in FIG. 57C, a single inductor 5702 can be used to yield approximately equal current repartition among multiple parallel coil windings. For example, a single inductor $L_1^\Delta = 2.18$ μH (i.e. $L_2^\Delta = L_3^\Delta = 0$) connected to winding 5602 (the innermost winding) can significantly improve current repartition, with an approximately 33.5%-34.6%-31.9% predicted distribution. These results are within 5% of a target of approximately equal current distribution (e.g., 33.3%) in each winding. In some embodiments, the optimization can be performed iteratively by the electronic processor until the current distribution in each of the windings is within 20% (e.g., within 15%, within 10%, within 5%) of a target current distribution, which can be (but need not be) an equal current distribution among the windings. The process shown in flow chart 7400 then ends at step 7408.

In certain embodiments, a slightly reduced current in outermost winding 5606 (winding 3) can be advantageous, since the longer length of winding 5606 yields a resistance that can be about 8% higher than the resistance of the other windings. In some embodiments, a specific current distribution may be desired and the electronic processor can minimize a more general figure-of-merit $$\sum_{i=1}^{n}\left(\frac{I_i^\Delta}{\Sigma I}-s_i\right)^2$$

where $s_i$ is the targeted fraction of the total current flowing in winding i (thus $\Sigma_{i=1}^n s_i = 1$). For example, one of the windings may be less effectively cooled compared to other windings and thus, current repartition may be changed accordingly. In another example, some windings may have a different than expected resistance or inductance at the time of manufacture and an electronic processor may be able to compensate for these differences.

In some embodiments, inductor $L_1^\Delta$ can include a pair of cores formed from magnetic material. For example, an inductor with a planar E-core formed of ferrite can be used. For an inductor with a 2 mm gap and 4 turns of 4200/44 Litz wire, the inductor $L_1^\Delta$ can dissipate approximately 3.2 W at a source current value $I_s = 140$ $A_{RMS}$. Inductor $L_1^\Delta$ can be wound with the same Litz wire as the innermost winding (winding 5602) and can therefore simplify the connection. In certain embodiments, with the addition of inductor $L_1^\Delta$, the overall inductance measurements yield:

$$L = \begin{pmatrix} 24.2 & 19.6 & 19.2 \\ 19.6 & 23.0 & 20.3 \\ 19.2 & 20.3 & 23.7 \end{pmatrix} \mu H.$$

When a voltage V is applied across the three windings connected in parallel, the following relationship is the result:

$$(I_1, I_2, I_3) = (1.56, 1.68, 1.52)\frac{10^4 V}{\omega}.$$

The current repartition among the windings can be calculated by summing the elements in the above vector (1.56+1.68+1.52=4.76) and dividing each element by the sum. This shows that the innermost winding can carry 32.8% of the current, while the middle winding carries 35.2% of the current and the outermost winding carries 32.0% of the current. For example, for a wireless power transfer system that is tested at 2.5 kW output with 27.8 $A_{RMS}$ total current in the source coil (with three parallel windings), the following current repartition is achieved:

innermost winding: 8.4 $A_{RMS}$ (30.2%), middle winding: 9.9 $A_{RMS}$ (35.7%), outermost winding: 9.5 $A_{RMS}$ (34.1%).

This current repartition is close to the expected current repartition based on low-power measurements.

Figure 58A:
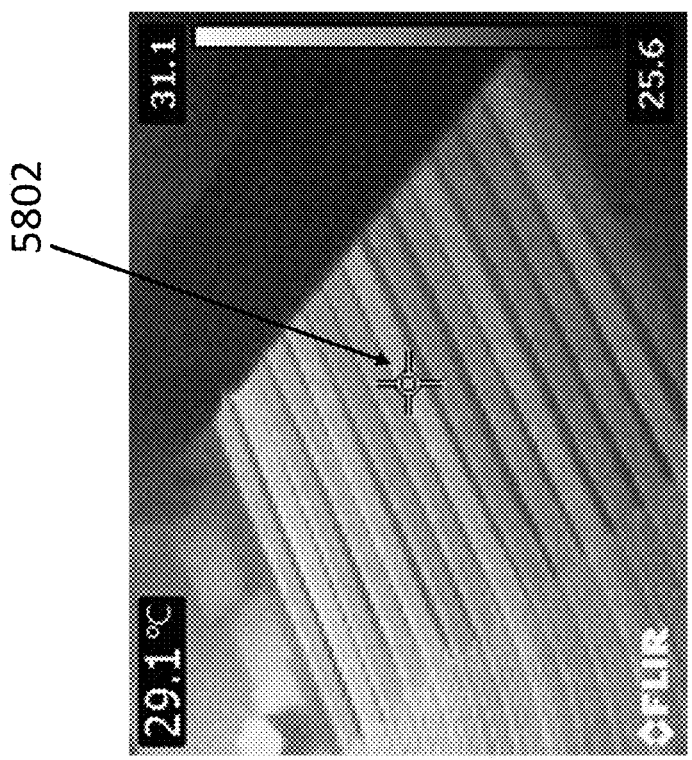
FIGS. 58A and 58B are images showing temperature measurements for parallel windings in a coil.
Figure 58B:
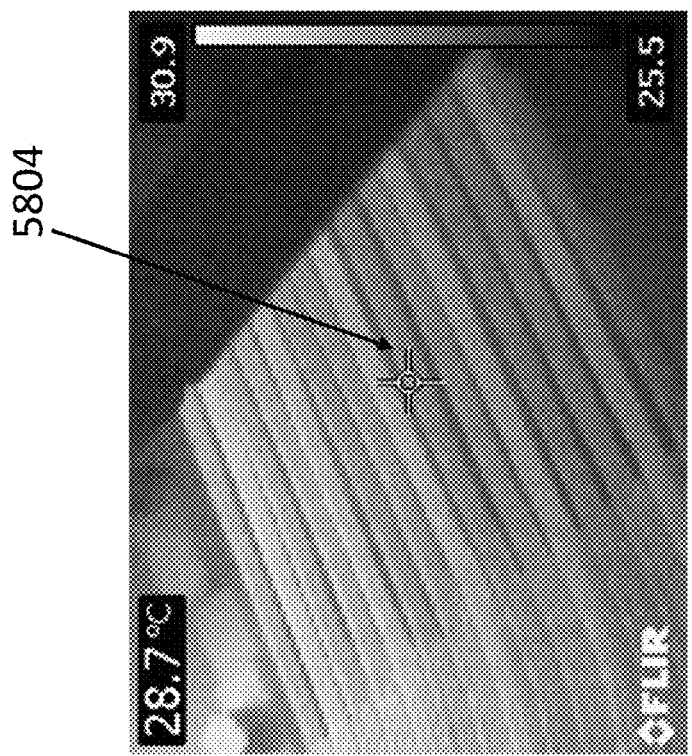
Figure 59:
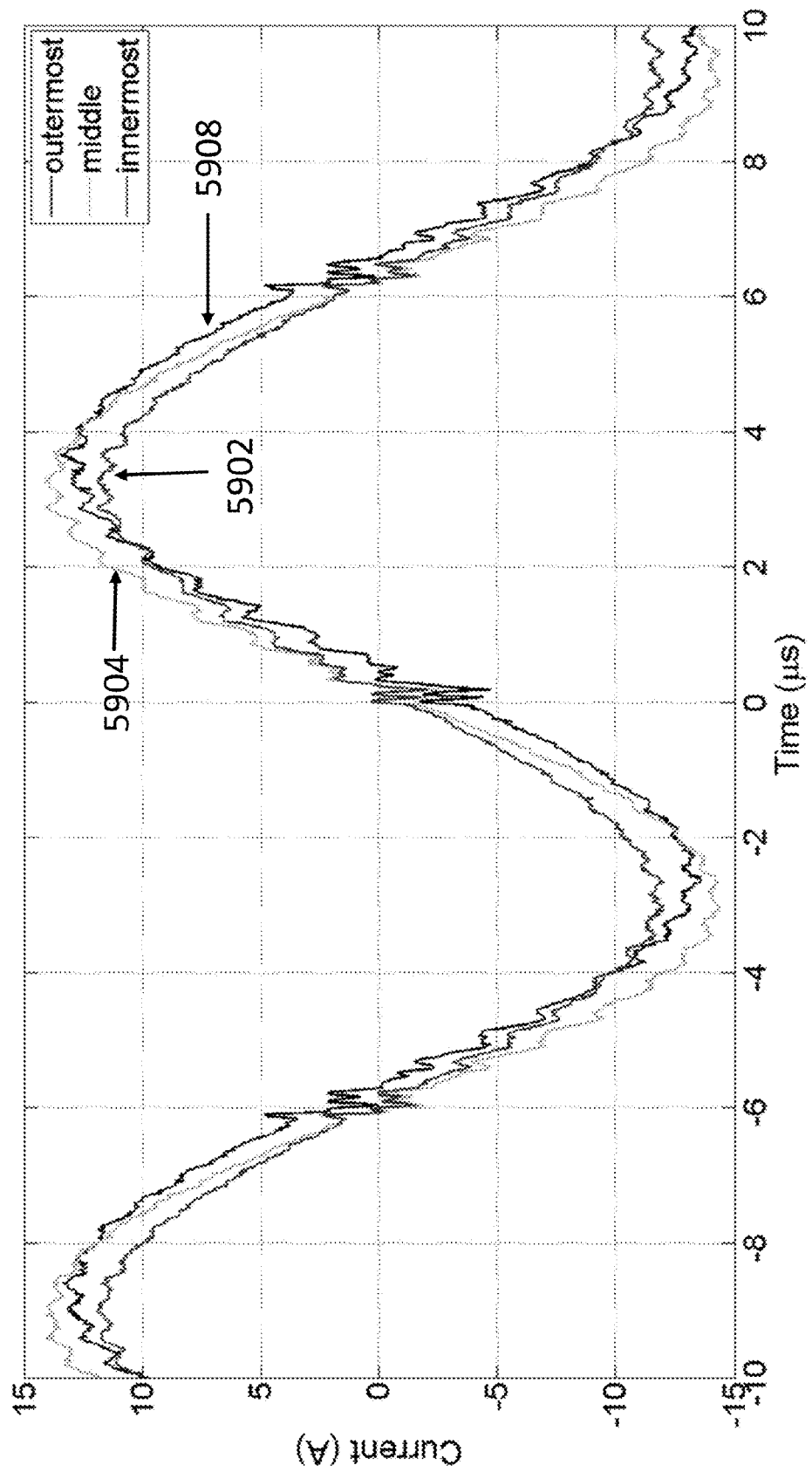
FIG. 59 is a plot showing the current carried in each of the parallel windings of a coil as a function of time.

In current embodiments, windings that carry larger currents can reach higher operating temperatures and/or dissipate the most power. FIGS. 58A and 58B are images showing temperature measurements for windings in a coil carrying a total of 10 A of current during operation. The middle winding 5604 heats up to a temperature that is slightly larger (see FIG. 58A, measurement at location 5802) than the temperature of innermost winding 5602 and outermost winding 5606 (see FIG. 58B, measurement at location 5804), consistent with the predictions above. FIG. 59 is a plot showing the current carried in each of windings 5602 (curve 5902), 5604 (curve 5904), and 5606 (curve 5906) as a function of time. As shown in the figure, the current carried in the middle winding (winding 5604) is larger than the currents carried in the innermost and outermost windings, accounting for the greater heating of the middle winding.

Hardware and Software Implementation

Figure 75:
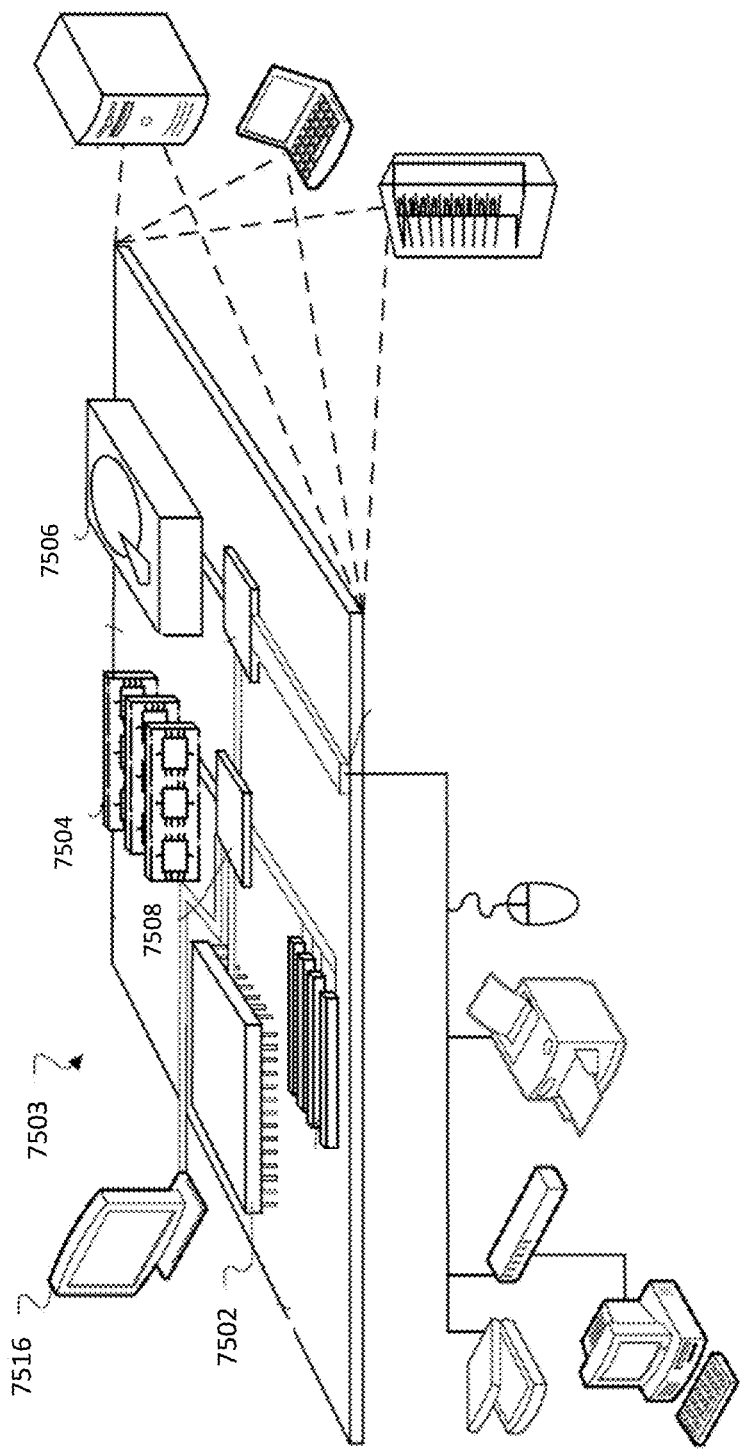
FIG. 75 is a schematic diagram of an electronic controller.

FIG. 75 shows an example of an electronic controller 7503, which may be used with the systems and methods described herein. As mentioned earlier, the electronic controller (and more specifically, an electronic processor thereof such as processor 105 and/or 111) can be used to perform any of the control and/or computation functions disclosed herein, including controlling power transfer of a wireless power transfer system, for example, by changing power output of a power source, adjusting operation and/or resonant frequencies and adjusting impedance matching networks. The electronic controller 7503 can be used to control the current directions, magnitudes and phases of different coils relative to other coils. In some embodiments, the electronic controller 7503 can be directly connected to, or wirelessly communicate with, various elements of the system.

Electronic controller 7503 can include a processor 7502 (e.g., corresponding to processor 105 and/or 111), memory 7504, a storage device 7506 and interfaces 7508 for interconnection. The processor 7502 can process instructions for execution within the electronic controller 7503, including instructions stored in the memory 7504 or on the storage device 7506. For example, the instructions can instruct the processor 7502 to determine parameters of the system such as efficiency of power transfer, operating frequency, resonant frequencies of resonators and impedance matching conditions. The electronic controller 7503 can determine type, size and alignment of a power receiving apparatus based on detection signals from one or more sensors. In certain embodiments, the processor 7502 is configured to send out control signals to various elements (e.g., power source, power transmitting apparatus, power receiving apparatus, power repeating apparatus, impedance matching networks) to adjust the determined parameters. For example, control signals can be used to tune capacitance values of capacitors in an impedance matching network. In certain embodiments, control signals can be used to adjust operation frequency of a power source. Control signals can change capacitance value of a capacitor in a resonator to tune its resonant frequency, and/or change inductance values of tunable inductors to repartition currents among parallel windings in a resonator coil.

The memory 7504 can store information about optimized parameters of the system. For example, the information can include optimized impedance matching conditions for various levels of power output from the power source. In certain embodiments, the memory 7504 can store information such as resonant frequencies of resonator and magnetic properties (e.g., magnetic permeability depending on power levels) of magnetic components in the system, which can be used by the processor 7502 for determining signals to be sent out to control various elements in the system. The memory can also store a set of values corresponding to a target current repartition.

The storage device 7506 can be a computer-readable medium, such as a floppy disk device, a hard disk device, an optical disk device, or a tape device, a flash memory or other similar solid state memory device, or an array of devices, including devices in a storage area network or other configurations. The storage device 7506 can store instructions that can be executed by processor 7502 described above. In certain embodiments, the storage device 7506 can store information described in relation to memory 7504.

In some embodiments, electronic controller 7503 can include a graphics processing unit to display graphical information (e.g., using a GUI or text interface) on an external input/output device, such as display 7516. The graphical information can be displayed by a display device (e.g., a CRT (cathode ray tube) or LCD (liquid crystal display) monitor) for displaying information. A user can use input devices (e.g., keyboard, pointing device, touch screen, speech recognition device) to provide input to the electronic controller 7503. In some embodiments, the user can monitor the display 7516 to analyze the power transfer conditions of the system. For example, when the power transfer is not in optimum condition, the user can adjust parameters (e.g., power transfer level, capacitor values in impedance matching networks, operation frequency of power source, resonant frequencies of resonators) by inputting information through the input devices. Based on the receive input, the electronic controller 7503 can control the system as described above.

In some embodiments, the electronic controller 7503 can monitor hazardous conditions of the system. For example, the electronic controller 7503 can detect over-heating in the system and provide an alert (e.g., visual and/or audible alert) to the user through its graphical display or audio device.

In certain embodiments, electronic controller 7503 can be used to control magnitudes and phases of currents flowing in one or more coils of the wireless power transfer system. For example, processor 7502 can calculate and determine the magnitudes and phase of currents to be supplied to coils in a power transmitting apparatus. The determination can be based on the monitored power transfer efficiency and information stored in memory 7504 or storage unit 7506.

A feedback signal can be received and processed by the electronic controller 7503. For example, the electronic controller 7503 can include a wireless communication device (e.g., radio-frequency, Bluetooth receiver) to receive information from either or both of a power transmitting apparatus and a power receiving apparatus (which can have its own wireless communication device). In some embodiments, the received information can be processed by processor 7502, which can further send out control signals to adjust parameters of the system as described above. For example, the control signals can be used to adjust the magnitudes and phases of currents flowing in one or more coils of resonators in the system to increase the power transfer efficiency.

Various embodiments of the systems and techniques described here can be realized by one or more computer programs that are executable and/or interpretable on the electronic controller 7503. These computer programs (also known as programs, software, software applications or code) include machine instructions for a programmable processor, and can be implemented in a high-level procedural and/or object-oriented programming language, and/or in assembly/machine language. For example, computer programs can contain the instructions that can be stored in memory 7504 and storage unit 7506 and executed by processor 7502 as described above. As used herein, the terms "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

Generally, electronic controller 7503 can be implemented in a computing system to implement the operations described above. For example, the computing system can include a back end component (e.g., as a data server), or a middleware component (e.g., an application server), or a front end component (e.g., a client computer having a graphical user-interface), or any combination therefor, to allow a user to utilized the operations of the electronic controller 7503.

The electronic controller 7503 or one or more of its elements can be integrated in a vehicle. The electronic controller 7503 can be utilized to control and/or monitor wireless power charging of a battery installed in the vehicle. In some embodiments, the display 7516 can be installed adjacent to the driving wheel of the vehicle so that a user may monitor conditions of the power charging and/or control parameters of the power charging as described in relation to FIG. 75. The display 7516 can also visualize information traffic information and road maps based on Global Positioning System (GPS) information. Any of the elements such as the processor 7502, memory 7504 and storage device 7506 can be installed in the space behind the display 7516, which can visualize the data process by those elements.

Other Embodiments

While this disclosure contains many specific implementation details, these should not be construed as limitations on the scope of the disclosure, but rather as descriptions of features in connection with embodiments. Features that are described in the context of separate embodiments can also generally be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can generally be excised from the combination, and the claimed combination may be directed to a sub-combination or variation of a sub-combination.

In addition to the embodiments expressly disclosed herein, other embodiments are within the scope of the disclosure.

What is claimed is:

1. A system for wireless power transfer, comprising:
a resonator comprising a coil with at least two windings, each of the at least two windings comprising a plurality of loops formed by a conductive material and extending in a plane, wherein corresponding portions of each of the at least two windings are oriented in parallel, wherein at least one of the windings has a length that differs from a length of another one of the windings, and wherein the at least two windings are electrically connected in parallel; and
at least one inductor having an inductance value, wherein the at least one inductor is connected in series to at least one of the windings,
wherein the inductance value is selected so that when the coil carries a current during operation of the system, the at least one inductor maintains a distribution of current flows among the at least two windings such that for each of the at least two windings, an actual current flow in the winding differs from a target current flow for the winding by 10% or less.

2. The system of claim 1, wherein the at least one inductor comprises an adjustable inductance value.

3. The system of claim 1, wherein corresponding portions of each of the at least two windings are oriented in parallel along at least 80% of a length of at least one of the windings.

4. The system of claim 1, wherein the loops of each winding are interleaved.

5. The system of claim 1, wherein the loops of each winding are concentric and form a spiral.

6. The system of claim 1, further comprising an electronic processor coupled to the at least two windings and configured to control electrical currents in each of the windings based on the target current flows for the at least two windings.

7. The system of claim 6, wherein the electronic processor is configured to control electrical currents in each of the windings by:
determining a target inductance value for the at least one inductor based on a figure of merit related to the target current flows; and
adjusting the inductance value of the at least one inductor to match the target inductance value.

8. The system of claim 7, wherein the electronic processor is configured to determine the target inductance value by:
(i) for each one of the windings:
determining a self-inductance value of the one winding based on a measurement of inductance of the one winding when it is electrically disconnected from all other windings; and
determining a plurality of cross-inductance values of the one winding, wherein each cross-inductance value is based on a measurement of inductance of the one winding when it is electrically disconnected from another one of the windings;
(ii) determining the target current flows for each of the windings based on the self-inductance values and the cross-inductance values; and
(iii) determining the target inductance value based on the target current flows for each of the windings.

9. The system of claim 8, wherein the electronic processor is configured to determine the target current flows by:

constructing an inductance matrix based on the self-inductance values and the cross-inductance values of each of the windings;

calculating an adjusted inductance matrix by adding to the inductance matrix an inductance modification matrix comprising elements that correspond to changes in inductance of each of the windings due to the at least one inductor;

calculating an inverse matrix of the adjusted inductance matrix; and determining the target current flows based on the inverse matrix.

10. The system of claim 9, wherein the inductance modification matrix is a diagonal matrix, and wherein diagonal elements of the inductance modification matrix are inductance values of respective members of the at least one inductor connected to the windings.

* * * * *